United States Patent
Liu et al.

(10) Patent No.: US 11,136,910 B2
(45) Date of Patent: Oct. 5, 2021

(54) SYSTEMS AND METHODS FOR MIXING EXHAUST GASES AND REDUCTANT IN AN AFTERTREATMENT SYSTEM

(71) Applicant: CUMMINS EMISSION SOLUTIONS INC., Columbus, IN (US)

(72) Inventors: Z. Gerald Liu, Madison, WI (US); Apoorv Kalyankar, Madison, WI (US); Achuth Munnannur, Madison, WI (US); Niklas M. Schmidt, Madison, WI (US); Roy W. Detra, Stoughton, WI (US); Mihai Chiruta, Madison, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/618,716

(22) PCT Filed: Jun. 5, 2018

(86) PCT No.: PCT/US2018/035959
§ 371 (c)(1),
(2) Date: Dec. 2, 2019

(87) PCT Pub. No.: WO2018/226626
PCT Pub. Date: Dec. 13, 2018

(65) Prior Publication Data
US 2020/0123955 A1    Apr. 23, 2020

Related U.S. Application Data

(60) Provisional application No. 62/515,743, filed on Jun. 6, 2017.

(51) Int. Cl.
*F01N 3/20* (2006.01)
*F01N 3/28* (2006.01)

(52) U.S. Cl.
CPC .......... *F01N 3/2803* (2013.01); *F01N 3/208* (2013.01); *F01N 2470/30* (2013.01); *F01N 2610/02* (2013.01); *F01N 2610/146* (2013.01)

(58) Field of Classification Search
CPC ........ F01N 3/106; F01N 3/2066; F01N 3/208; F01N 3/2803; F01N 3/2892; F01N 9/00;
(Continued)

(56) References Cited

U.S. PATENT DOCUMENTS

| 4,424,777 A | 1/1984 | Klomp |
| 7,581,387 B2 | 9/2009 | Bui et al. |

(Continued)

FOREIGN PATENT DOCUMENTS

| CN | 101815851 | 8/2010 |
| CN | 102242662 | 11/2011 |

(Continued)

OTHER PUBLICATIONS

International Search Report from corresponding PCT Application No. PCT/US2018/035959, dated Oct. 19, 2018, pp. 1-4.

(Continued)

*Primary Examiner* — Audrey B Walter
(74) *Attorney, Agent, or Firm* — Foley & Lardner LLP

(57) ABSTRACT

A multi-stage mixer includes a multi-stage mixer inlet, a multi-stage mixer outlet, a first flow device, and a second flow device. The multi-stage mixer inlet is configured to receive exhaust gas. The multi-stage mixer outlet is configured to provide the exhaust gas to a catalyst. The first flow device is configured to receive the exhaust gas from the multi-stage mixer inlet and to receive reductant such that the reductant is partially mixed with the exhaust gas within the first flow device. The first flow device includes a plurality of main vanes and a plurality of main vane apertures. The plurality of main vane apertures is interspaced between the (Continued)

plurality of main vanes. The plurality of main vane apertures is configured to receive the exhaust gas and to cooperate with the plurality of main vanes to provide the exhaust gas from the first flow device with a swirl flow.

20 Claims, 32 Drawing Sheets

(58) Field of Classification Search
CPC ............ F01N 2240/20; F01N 2240/40; F01N 2470/30; F01N 2610/02; F01N 2610/1433; F01N 2610/1453; F01N 2610/146; B01F 3/04049; B01F 5/0473; B01F 5/0485; B01F 5/0608; B01F 5/0619; B01F 5/0659; B01F 5/0688
USPC .......................................................... 60/324
See application file for complete search history.

(56) References Cited

U.S. PATENT DOCUMENTS

| | | | |
|---|---|---|---|
| 8,230,678 | B2 | 7/2012 | Aneja et al. |
| 8,615,984 | B2 | 12/2013 | Kornherr et al. |
| 9,248,404 | B2 | 2/2016 | Brunel et al. |
| 9,346,017 | B2 | 5/2016 | Greber |
| 9,352,276 | B2 | 5/2016 | Sampath |
| 9,453,444 | B2* | 9/2016 | Fischer ................. F01N 3/10 |
| 9,605,573 | B2* | 3/2017 | Solbrig ................. B01F 5/0612 |
| 10,247,081 | B2 | 4/2019 | Niaz |
| 10,273,853 | B2 | 4/2019 | Golin |
| 10,422,268 | B2 | 9/2019 | Niaz |
| 10,612,443 | B2 | 4/2020 | Li et al. |
| 2005/0262843 | A1 | 12/2005 | Monty |
| 2006/0150614 | A1* | 7/2006 | Cummings ............. F01N 1/088 60/275 |
| 2006/0191254 | A1 | 8/2006 | Bui et al. |
| 2007/0283683 | A1 | 12/2007 | Bellinger |
| 2008/0087013 | A1* | 4/2008 | Crawley ................. F01N 3/206 60/320 |
| 2009/0000283 | A1 | 1/2009 | Endicott et al. |
| 2009/0019843 | A1 | 1/2009 | Levin et al. |
| 2009/0084094 | A1 | 4/2009 | Goss et al. |
| 2010/0187383 | A1 | 7/2010 | Olsen et al. |
| 2010/0251719 | A1 | 10/2010 | Mancini et al. |
| 2011/0005232 | A1 | 1/2011 | Williams et al. |
| 2012/0204541 | A1* | 8/2012 | Li ...................... B01F 13/1027 60/274 |
| 2012/0204542 | A1 | 8/2012 | Norris et al. |
| 2012/0204544 | A1 | 8/2012 | Uhrich et al. |
| 2013/0333363 | A1 | 12/2013 | Joshi et al. |
| 2014/0033686 | A1* | 2/2014 | Fischer ................... F01N 13/08 60/286 |
| 2015/0016214 | A1 | 1/2015 | Mueller |
| 2015/0110681 | A1* | 4/2015 | Ferront ................. F01N 3/2892 422/168 |
| 2015/0218996 | A1 | 8/2015 | Brandl et al. |
| 2015/0360176 | A1 | 12/2015 | Bui et al. |
| 2016/0090887 | A1 | 3/2016 | Mitchell et al. |
| 2016/0138454 | A1 | 5/2016 | Alano et al. |
| 2016/0158714 | A1 | 6/2016 | Li et al. |
| 2016/0175784 | A1* | 6/2016 | Harmon ............... B01F 3/04049 366/167.1 |
| 2016/0243510 | A1* | 8/2016 | Denton ................. B01F 5/0615 |
| 2017/0067387 | A1 | 3/2017 | Khaled |
| 2017/0107882 | A1 | 4/2017 | Chiruta et al. |
| 2017/0152778 | A1 | 6/2017 | Li et al. |
| 2018/0078912 | A1 | 3/2018 | Yadav et al. |
| 2018/0087428 | A1 | 3/2018 | Barr |
| 2018/0142604 | A1 | 5/2018 | Niaz |
| 2018/0266300 | A1 | 9/2018 | Liu et al. |
| 2018/0306083 | A1 | 10/2018 | Sampath et al. |

FOREIGN PATENT DOCUMENTS

| | | |
|---|---|---|
| CN | 103429864 | 12/2013 |
| CN | 106377919 A | 2/2017 |
| CN | 209179849 U | 7/2019 |
| CN | 210858906 U | 6/2020 |
| DE | 10 2004 043 931 | 3/2006 |
| EP | 1 716 917 A1 | 11/2006 |
| EP | 2 769 762 A1 | 8/2014 |
| JP | 2013-133774 A | 7/2013 |

OTHER PUBLICATIONS

Written Opinion from corresponding PCT Application No. PCT/US2018/035959, dated Oct. 19, 2018, pp. 1-8.
International Search Report and Written Opinion issued for PCT Application No. PCT/IB2019/054988 dated Jan. 29, 2020, 12 pages.
First Examination Report in Indian Patent Application No. 201947050068, dated Jan. 13, 2021.
First Office Action issued in Chinese Patent Application No. 201880001223.6, dated Dec. 17, 2020, 9 pages.
Search Report issued for UK Patent Application No. GB 2101393.3, dated Feb. 22, 2021.
Search Report Letter issued for UK Patent Application No. GB 2101393.3, dated Feb. 22, 2021.
International Search Report and Written Opinion issued in PCT Application No. PCT/US2021/017551 dated Apr. 28, 2021, 8 pages.

* cited by examiner

FIG. 8

SYSTEMS AND METHODS FOR MIXING EXHAUST GASES AND REDUCTANT IN AN AFTERTREATMENT SYSTEM

CROSS-REFERENCE TO RELATED PATENT APPLICATION

The present application is a U.S. national stage of PCT Application No. PCT/US2018/035959, filed Jun. 5, 2018, which claims the benefit of, and priority to, U.S. Provisional Patent Application No. 62/515,743, filed Jun. 6, 2017, the contents of which are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen or water, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid (DEF), or aqueous urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

In an embodiment, a multi-stage mixer includes a multi-stage mixer inlet, a multi-stage mixer outlet, a first flow device, and a second flow device. The multi-stage mixer inlet is configured to receive exhaust gas. The multi-stage mixer outlet is configured to provide the exhaust gas to a catalyst. The first flow device is configured to receive the exhaust gas from the multi-stage mixer inlet and to receive reductant such that the reductant is partially mixed with the exhaust gas within the first flow device. The first flow device includes a plurality of main vanes and a plurality of main vane apertures. The plurality of main vane apertures is interspaced between the plurality of main vanes. The plurality of main vane apertures is configured to receive the exhaust gas and to cooperate with the plurality of main vanes to provide the exhaust gas from the first flow device with a swirl flow that facilitates mixing of the reductant and the exhaust gas. The second flow device is configured to receive the exhaust gas and the reductant from the first flow device. The second flow device includes a plurality of second flow device apertures configured to provide the exhaust gas and the reductant from the second flow device to the catalyst via the multi-stage mixer outlet.

In another embodiment, a multi-stage mixer includes a multi-stage mixer inlet, a multi-stage mixer outlet, and a first flow device. The multi-stage mixer inlet is configured to receive exhaust gas. The multi-stage mixer outlet is configured to provide the exhaust gas to a catalyst. The first flow device is configured to receive the exhaust gas from the multi-stage mixer inlet and configured to receive reductant such that the reductant is partially mixed with the exhaust gas within the first flow device. The first flow device includes a Venturi body, a plurality of main vanes, a plurality of main vane apertures, a plurality of auxiliary vanes, and a plurality of auxiliary vane apertures. The Venturi body is defined by a body inlet proximate the multi-stage mixer inlet and a body outlet proximate the multi-stage mixer outlet. The plurality of main vanes is positioned within the Venturi body and proximate the body outlet. The plurality of main vane apertures is interspaced between the plurality of main vanes. The plurality of main vane apertures is configured to receive the exhaust gas and cooperate with the plurality of main vanes to provide the exhaust gas from the first flow device with a swirl flow that facilitates mixing of the reductant and the exhaust gas. The plurality of auxiliary vanes is positioned within the Venturi body and proximate the body inlet. The plurality of auxiliary vane apertures is interspaced between the plurality of auxiliary vanes. The plurality of auxiliary vane apertures is configured to receive the exhaust gas and cooperate with the plurality of auxiliary vanes to provide the exhaust gas into the Venturi body with a swirl flow that facilitates mixing of the reductant and the exhaust gas.

In yet another embodiment, a multi-stage mixer includes a multi-stage mixer inlet, a multi-stage mixer outlet, and a first flow device. The multi-stage mixer inlet is configured to receive exhaust gas. The multi-stage mixer outlet is configured to provide the exhaust gas to a catalyst. The first flow device is configured to receive the exhaust gas from the multi-stage mixer inlet and receive reductant such that the reductant is partially mixed with the exhaust gas within the first flow device. The first flow device includes a Venturi body, a plurality of main vanes, a plurality of main vane apertures, and an exhaust gas guide. The Venturi body is defined by a body inlet proximate the multi-stage mixer inlet and a body outlet proximate the multi-stage mixer outlet. The Venturi body includes an exhaust gas guide aperture disposed along the Venturi body between the body inlet and the body outlet. The plurality of main vanes is positioned within the Venturi body and proximate the body outlet. The plurality of main vane apertures is interspaced between the plurality of main vanes. The plurality of main vane apertures is configured to receive the exhaust gas and cooperate with the plurality of main vanes to provide the exhaust gas from the first flow device with a swirl flow that facilitates mixing of the reductant and the exhaust gas. The exhaust gas guide is coupled to the Venturi body about the exhaust gas guide aperture. The exhaust gas guide is configured to separately receive exhaust gas and reductant from outside of the Venturi body, mix the exhaust gas and reductant received from outside of the Venturi body in the exhaust gas guide, and provide the mixed exhaust gas and reductant into the Venturi body.

In yet another embodiment, a multi-stage mixer includes a multi-stage mixer inlet, a multi-stage mixer outlet, and a first flow device. The multi-stage mixer inlet is configured to receive exhaust gas. The multi-stage mixer outlet is configured to provide the exhaust gas to a catalyst. The first flow device is configured to receive the exhaust gas from the multi-stage mixer inlet and receive reductant such that the reductant is partially mixed with the exhaust gas within the first flow device. The first flow device includes a Venturi body, a plurality of conduit straight vanes, and an exhaust gas guide. The Venturi body is defined by a body inlet proximate the multi-stage mixer inlet and a body outlet proximate the multi-stage mixer outlet. The Venturi body includes an exhaust gas guide aperture disposed along the Venturi body between the body inlet and the body outlet. The plurality of conduit straight vanes is positioned within the Venturi body and proximate the body outlet. The plurality of conduit straight vanes is configured to interface with the exhaust gas and provide the exhaust gas from the first flow device with a swirl flow that facilitates mixing of the reductant and the exhaust gas. The exhaust gas guide is coupled to the Venturi body about the exhaust gas guide aperture. The exhaust gas guide is configured to separately receive exhaust gas and reductant from outside of the Venturi body, mix the exhaust gas and reductant received from outside of the Venturi body in the exhaust gas guide, and provide the mixed exhaust gas and reductant into the Venturi body.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 8 is a representation of a reductant droplet distribution within a multi-stage mixer;

Figure 1:
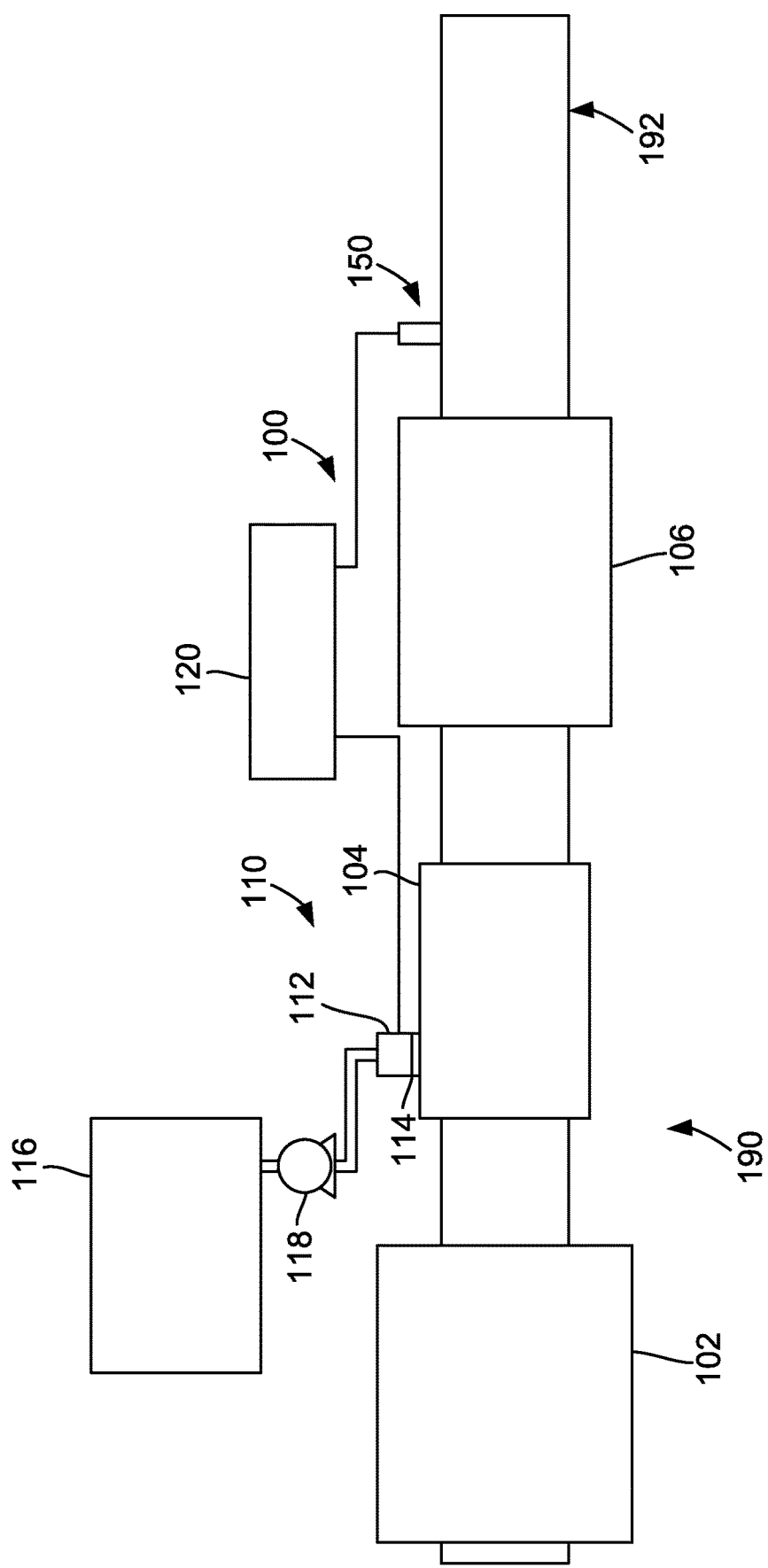
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for flow distribution in an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an aftertreatment system. This treatment often includes passing the exhaust gases through a catalyst. By providing the catalyst with a uniform flow of the exhaust gases, the efficiency of the catalyst, and therefore of the aftertreatment system, may be increased. Various components, such as baffles, may be included within an aftertreatment system to change the flow of the exhaust gases into the catalyst. Conventional aftertreatment systems implement components that are difficult to scale (e.g., for different applications, etc.) in a radial direction (e.g., various diameters, etc.) and in an axial direction (e.g., various lengths, various numbers of components, various configurations of components, etc.). For example, baffles may have complicated shapes that require advanced manufacturing techniques, and therefore substantial cost, to produce. As a result, conventional aftertreatment systems do not offer the flexibility necessary to be easily implemented in applications with varying engine ratings and/or operating conditions. Further, conventional aftertreatment systems typically utilize complicated components that are expensive and require difficult and time intensive manufacturing.

Implementations described herein relate to a multi-stage mixer that includes a plurality of flow devices that cooperate to provide a catalyst with a substantially uniform flow of exhaust gases and reductant, facilitate substantially uniform reductant distribution in the exhaust gases downstream of the multi-stage mixer, and provide a relatively low pressure drop (e.g., the pressure of the exhaust gases at the inlet of the multi-stage mixer less the pressure of the exhaust gases at the outlet of the multi-stage mixer, etc.), all in a relatively compact space, compared to conventional aftertreatment systems. The flow devices are mostly symmetrical and relatively easy to manufacture compared to the complicated devices currently used in aftertreatment systems. As a result, the multi-stage mixer can be easily and readily scaled for various applications while consuming less physical space than devices currently used in aftertreatment systems. The multi-stage mixer may be configured to dose the exhaust gases with reductant, to cause an internal swirl flow that mixes the reductant within the exhaust gases, and to create a uniform dispersion of the reductant within the uniform flow of the exhaust gases that flows into the catalyst. The multi-stage mixer may minimize spray impingement on wall surfaces due to swirl flow and relatively high shear stresses produced by the multi-stage mixer, thereby mitigating deposit formation and accumulation within the multi-stage mixer and associated exhaust components.

In some implementations, the multi-stage mixer includes an exhaust gas guide that directs exhaust gases towards reductant ejected from a reductant guide. The exhaust gases flow into the exhaust gas guide via apertures that are disposed on at least part of the exhaust gas guide. The exhaust gases then assist the reductant in traveling into a flow device whereby the reductant and the exhaust gases may be subsequently mixed via a swirl flow. The mixing may improve decomposition by utilizing the low pressure created by swirl flow and/or Venturi flow, enhance ordinary and turbulent diffusion, and elongate a mixing trajectory of the exhaust gases and the reductant. Swirl flow refers to flow that swirls about a center axis of the multi-stage mixer and/or a center axis of a flow device. Venturi flow refers to flow which occurs due to a low pressure region resulting from a reduction of cross-sectional area and a local flow acceleration.

In some implementations, a flow device of the multi-stage mixer includes internal plates that are positioned under the reductant guide. As the reductant flows into the flow device, the reductant contacts the internal plates which facilitate mixing of the reductant within the exhaust gases by reducing the Stokes number of the reductant (e.g., reductant droplets, etc.) via splashing.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor 104, a SCR catalyst 106, and a sensor 150. In some embodiments, the SCR catalyst 106 includes an ammonia oxidation catalyst (ASC).

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a doser or dosing module 112 configured to dose the reductant into the decomposition chamber 104 (for example, via an injector such as the injector described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116. In some implementations, a pump 118 may be used to pressurize the reductant from the reductant sources 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen and water. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., upstream of the SCR catalyst 106 or the DPF 102) to oxidize hydrocarbons and carbon monoxide in the exhaust gas.

In some implementations, the DPF 102 may be positioned downstream of the decomposition chamber or reactor 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Multi-Stage Mixer

Figure 2:
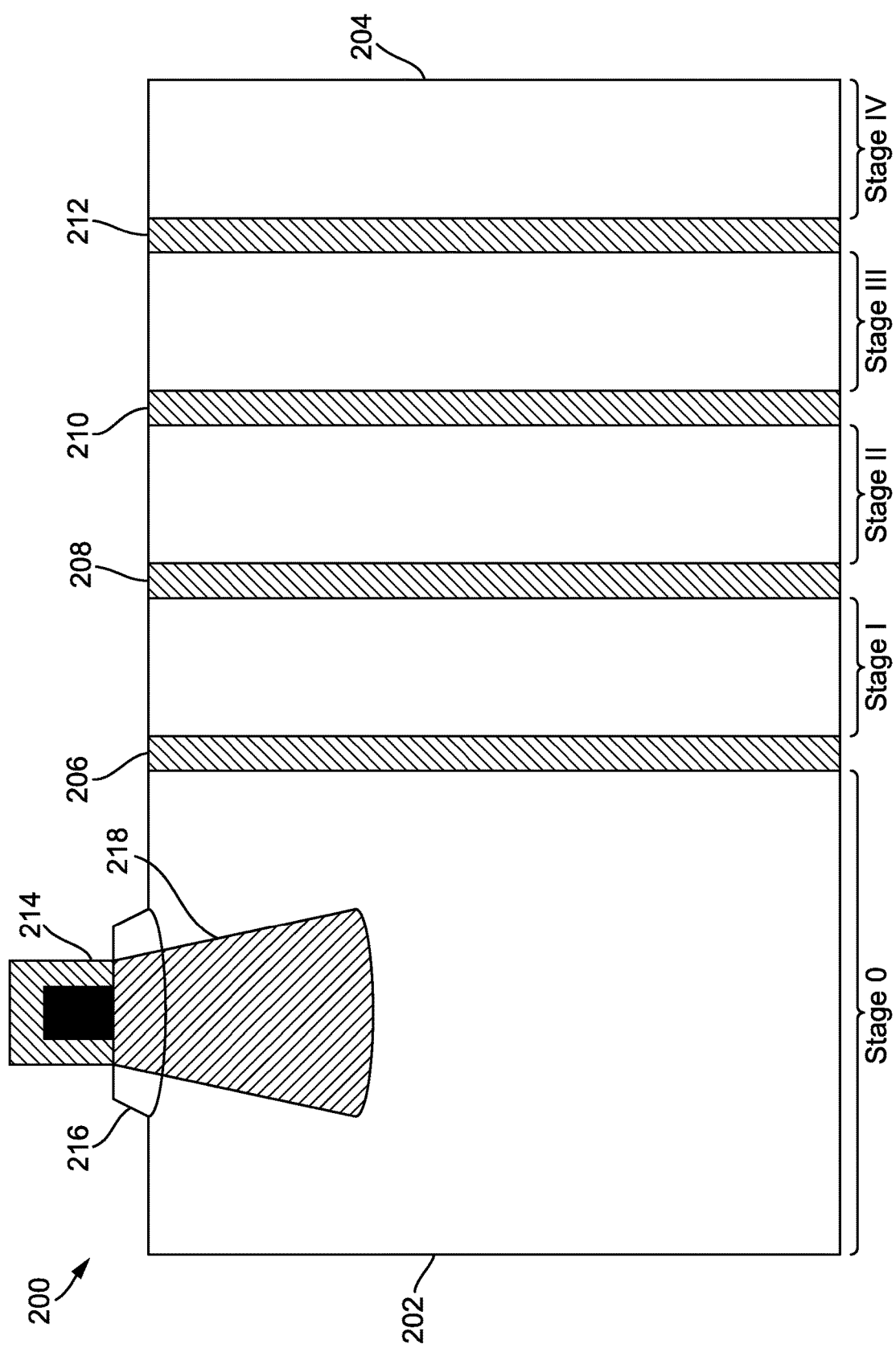
FIG. 2 is a cross-sectional view of an example multi-stage mixer.

FIG. 2 depicts a multi-stage mixer 200 according to an example embodiment. While a multi-stage mixer 200 is described in this particular embodiment, it is understood that the relevant structure in this and similar embodiments may constitute other aftertreatment components such as a SCR catalyst, a perforated tube, a pipe, a manifold, a decomposition chamber or reactor, a doser, a dosing module, and others. The multi-stage mixer 200 is configured to receive exhaust gases (e.g., combustion gases from an internal combustion engine, etc.) and to provide the exhaust gases downstream with a substantially uniform flow distribution (e.g., flow profile, etc.). According to an example embodiment, the multi-stage mixer 200 is additionally configured to selectively dose the exhaust gases with a reductant (e.g., urea, diesel exhaust fluid (DEF), AdBlue®, etc.). Because the multi-stage mixer 200 provides a substantially uniform flow distribution of the exhaust gases and promotes mixing between exhaust gases and reductant, the multi-stage mixer 200 may also provide the exhaust gases downstream with a substantially uniform reductant distribution (e.g., reductant profile, etc.).

The multi-stage mixer 200 includes an multi-stage mixer inlet 202 that receives the exhaust gases into the multi-stage mixer 200 and an multi-stage mixer outlet 204 that provides the exhaust gases from the multi-stage mixer 200. According to various embodiments, the multi-stage mixer inlet 202 receives the exhaust gases from a diesel particulate filter (e.g., the DPF 102, etc.) and the multi-stage mixer outlet 204 provides the exhaust gases to the SCR catalyst 106.

Flows of fluid can be defined by a Reynolds number, which is related to a flow pattern of the fluid, and a Stokes number, which is related to the behavior of particles suspended within the fluid. Depending on the Reynolds number, the flow may be, for example, turbulent or laminar. The flow of the exhaust gases into the multi-stage mixer inlet 202 can be defined by a Reynolds number that is greater than $10^4$, indicating that the flow of the exhaust gases is turbulent. Because the flow of the exhaust gases into the multi-stage mixer inlet 202 is turbulent, self-similarity exists. Depending on the Stokes number, particles may be more or less likely to follow the flow of fluid. The flow of reductant can be defined by a Stokes number that is on the order of one indicating that the reductant is unlikely to follow the flow of exhaust gases which poses a problem in conventional mixing devices. Advantageously, the multi-stage mixer 200 incorporates various components and devices herein which cause the reductant to be mixed with the exhaust gases (e.g., by reducing the Stokes number of the reductant, etc.) such that the reductant is propelled through the multi-stage mixer 200 along with the exhaust gases. In this way, the multi-stage mixer 200 improves reductant mixing and reduces a risk associated with formation of deposits within the multi-stage mixer 200. In various embodiments, the multi-stage mixer 200 is static and does not have components which move in response to the passage of exhaust gases through the multi-stage mixer 200. In this way, the multi-stage mixer 200 may be less complex to manufacture and less expensive, and therefore more desirable, than aftertreatment components with moving components.

The multi-stage mixer 200 includes a plurality of flow devices that segment the multi-stage mixer 200 into a plurality of stages. Each of the plurality of flow devices is structured to alter the flow of the exhaust gases and reductant so that the plurality of flow devices cumulatively causes the exhaust gases to obtain a target flow distribution and reductant the reductant to obtain a target uniformity index (e.g., uniformity distribution, etc.) at the multi-stage mixer outlet 204. Obtaining certain flow distributions and reductant uniformities indices is important in the operation of an aftertreatment system. For example, it is desirable to obtain a uniform flow distribution and reductant uniformity index at an inlet of an SCR catalyst because such a flow distribution allows the SCR catalyst to obtain a relatively high conversion efficiency.

As shown in FIG. 2, the multi-stage mixer 200 includes a first flow device 206, a second flow device 208, a third flow device 210, and a fourth flow device 212. It is understood that the multi-stage mixer 200 may include any combination of the first flow device 206, the second flow device 208, the third flow device 210, and the fourth flow device 212, including combinations with multiple first flow devices 206, multiple second flow devices 208, multiple third flow devices 210, and/or multiple fourth flow devices 212 and combinations without a first flow device 206, a second flow device 208, a third flow device 210, and/or a fourth flow device 212.

As the exhaust gases enter through the multi-stage mixer inlet 202, prior to the encountering the first flow device 206, the exhaust gases are in stage zero. In stage zero, the exhaust gases have yet to be impacted by any of the flow devices. The exhaust gases then flow through the first flow device 206. The first flow device 206 includes a number of apertures $N_I$ defining an open area $A_I$ through which the exhaust gases flow into stage one. The apertures of the first flow device 206 are defined by an average area $A_{AI}$. The first flow device 206 may be configured to produce a Venturi, swirl, or mixing effect. The swirl effect may cause a majority of the flow of the exhaust gases to be biased towards a periphery of the multi-stage mixer 200. The first flow device 206 may create a low pressure region in stage one. This low pressure region may facilitate enhanced reductant decomposition (e.g., via evaporation, via thermolysis, etc.), ordinary and turbulent diffusion, and mixing of reductant droplets. The low pressure region may also draw exhaust flow and reductant from a periphery of the first flow device 206 into the first flow device 206.

The exhaust gases then flow through the second flow device 208. The second flow device 208 includes a number of apertures $N_{II}$ defining an open area $A_{II}$ through which the exhaust gases flow into stage two. The apertures of the second flow device 208 are defined by an average area $A_{AII}$. The exhaust gases then flow through the third flow device 210. The third flow device 210 includes a number of apertures $N_{III}$ defining an open area $A_{III}$ through which the exhaust gases flow into stage three. The apertures of the third flow device 210 are defined by an average area $A_{AIII}$. The exhaust gases then flow through the fourth flow device 212. The fourth flow device 212 includes a number of apertures $N_{IV}$ defining an open area $A_{IV}$ through which the exhaust gases flow into stage four. The apertures of the fourth flow device 212 are defined by an average area $A_{AIV}$. The fourth flow device 212 may include a uniform or otherwise patterned perforated plate, where $A_{AIV}$ is relatively small. In this way, the fourth flow device 212 can be configured to provide the exhaust gases to stage four with a uniform flow and distribution of reductant. From stage four, the exhaust gases flow out of the multi-stage mixer outlet 204 of the multi-stage mixer 200.

According to an example embodiment, the multi-stage mixer 200 is configured such that:

$$A_I \approx A_{II} \approx A_{III} \approx A_{IV} \tag{1}$$

$$A_{AI} \neq A_{AII} \neq A_{AIII} \neq A_{AIV} \tag{2}$$

$$N_I \neq N_{II} \neq N_{III} \neq N_{IV} \tag{3}$$

which allows a dynamic pressure of the exhaust gases to remain substantially the same within each of stage zero, stage one, stage two, stage three, and stage four. In various embodiments, the first flow device 206, the second flow device 208, the third flow device 210, and the fourth flow device 212 are configured such that:

$$A_{AI} > A_{AII} > A_{AIII} > A_{AIV} \tag{4}$$

$$N_I < N_{II} < N_{III} < N_{IV} \tag{5}$$

which facilitates a gradual change in the flow of the exhaust gases by minimizing the pressure drops of the exhaust gases. The pressure drop of the exhaust gases are computed (e.g., determined) by subtracting the pressure of the exhaust gases at the multi-stage mixer outlet 204 from the pressure of the exhaust gases at the multi-stage mixer inlet 202. In various embodiments, the multi-stage mixer 200 is configured to decrease the pressure drop when the associated internal combustion engine is operating at a transient cycle (e.g., the Federal Test Procedure, World Harmonized Transient Cycle, Nonroad Transient Cycle, etc.), a steady-state cycle (e.g., the World Harmonized Stationary Cycle, etc.), or a combination thereof, compared to a conventional aftertreatment system.

The multi-stage mixer 200 includes a doser 214 and a port 216 through which reductant (e.g., reductant droplets, etc.) from the doser 214 is selectively introduced into the multi-stage mixer 200. According to an example embodiment, the doser 214 is positioned within stage zero. The multi-stage mixer 200 disperses the reductant uniformly within the exhaust gases that flow from the multi-stage mixer outlet 204 of the multi-stage mixer 200. The port 216 is configured to guide, or assist in guiding, the reductant towards a center (e.g., a center axis, center of domain, etc.) of the multi-stage mixer 200 regardless of the conditions (e.g., flow rate, temperature, etc.) of the exhaust gases. For example, the port 216 may have various shapes and/or thicknesses in order to guide the reductant towards the center of the multi-stage mixer 200.

In some embodiments, the multi-stage mixer 200 also includes a reductant guide 218 (e.g., nozzle, perforated tube, etc.) that at least partially shields the reductant from the flow of the exhaust gases from the multi-stage mixer inlet 202 to facilitate guiding of the reductant to the center of the multi-stage mixer 200. The reductant guide 218 extends from the port 216, receives the reductant from the doser 214, and provides the reductant into the multi-stage mixer 200 (e.g., at a center of the multi-stage mixer 200, etc.). In various embodiments, the reductant guide 218 is frustoconical.

In an example embodiment, the first flow device 206, the second flow device 208, the third flow device 210, and the fourth flow device 212 are each symmetrical. Accordingly, manufacturing of the first flow device 206, the second flow device 208, the third flow device 210, and the fourth flow device 212 is simplified and sizes of the first flow device 206, the second flow device 208, the third flow device 210, and the fourth flow device 212 can be easily altered for various applications. In contrast, conventional aftertreatment devices typically incorporate an asymmetrical component that contacts flow. As a result, the multi-stage mixer 200 is more desirable than conventional aftertreatment devices. Additionally, any of the first flow device 206, the second flow device 208, the third flow device 210, and the fourth flow device 212 may easily be replaced with another flow device such that the multi-stage mixer 200 is tailored for a target application.

Due to the specific configuration and construction of the multi-stage mixer 200, the multi-stage mixer 200 is scalable and easily configurable while maintaining the ability to provide exhaust gases having a highly uniform flow and reductant profile while minimizing a pressure drop experienced by the exhaust gases as well as minimizing the likelihood of deposit (e.g., urea deposit, etc.) formation. As a result, the multi-stage mixer 200 is capable of being configured for a target application at a lower cost than other mixers which are not readily adaptable (i.e., due to the scalability and modularity of the multi-stage mixer 200, etc.). The multi-stage mixer 200 and components thereof are scalable in the axial direction (e.g., in length, etc.) and the radial direction (e.g., in diameter, etc.). For example, the multi-stage mixer 200 may be scaled to include additional or fewer flow devices. In one example, the multi-stage mixer 200 may be scaled by including additional flow devices.

By being scalable, the multi-stage mixer 200 can be utilized in various applications where different lengths and/or diameters of the multi-stage mixer 200 are desired. For example, the multi-stage mixer may be produced for use with an aftertreatment system of a maritime vessel in one size and produced for use with an aftertreatment system of a diesel commercial vehicle in another size.

Because of the flexibility of the multi-stage mixer 200, the multi-stage mixer 200 is capable of being manufactured at a lower cost than conventional aftertreatment devices and of being easily tailored to many specific applications, thereby making the multi-stage mixer 200 more desirable than conventional aftertreatment devices. Further, the multi-stage mixer 200 may be configured for retrofit or drop-in applications.

While the multi-stage mixer 200 is shown as including the first flow device 206, the second flow device 208, the third flow device 210, and the fourth flow device 212, it is understood that the multi-stage mixer 200 may include more or less flow devices such that the multi-stage mixer 200 is tailored for a target application. Further, the number, shape, and size of the apertures in any of the first flow device 206, the second flow device 208, the third flow device 210, and the fourth flow device 212 may be varied such that the multi-stage mixer 200 is tailored for a target application. In some applications, the number of flow devices, and the configurations thereof, may be tailored to improve reductant decomposition, exhaust gas distribution, reductant distribution within the exhaust gases, and minimization of pressure drop of the exhaust gases.

Figure 3:
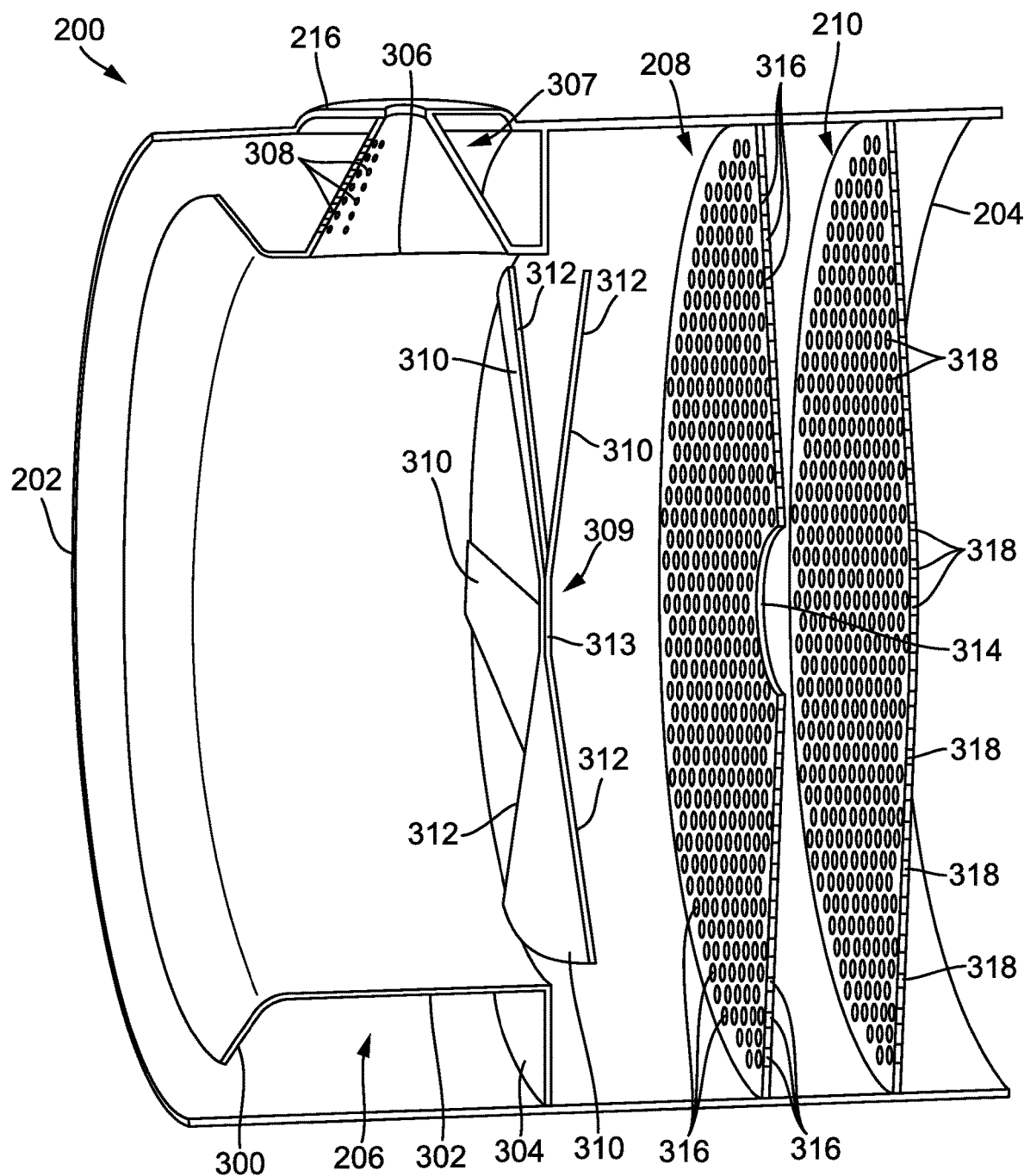
FIG. 3 is a cross-sectional view of another multi-stage mixer.

FIG. 3 illustrates the multi-stage mixer 200 according to one embodiment. The multi-stage mixer 200 includes the first flow device 206, the second flow device 208, and the third flow device 210. The first flow device 206 is shown to include a funneling edge 300, a Venturi body 302, and a first support flange 304 (e.g., downstream support flange, etc.). The funneling edge 300 is contiguous with the Venturi body 302 which is contiguous with the first support flange 304. The funneling edge 300 is configured to direct a majority of the exhaust gases from the multi-stage mixer inlet 202 into the Venturi body 302. However, the funneling edge 300 permits a portion of the exhaust gases to initially circumvent the Venturi body 302 and enter a region between the first flow device 206 and the multi-stage mixer 200. The funneling edge 300 may have various angles relative to the center axis of the multi-stage mixer 200 (e.g., ninety degrees, forty-five degrees, thirty degrees, fifteen degrees, etc.). Additionally, the funneling edge 300 may have various heights, as will be explained in more detail herein, relative to an outer edge of the body (e.g., relative to an outer diameter of the body, etc.). By adjusting the height of the funneling edge 300, more or less of the exhaust gases can be directed into the first flow device 206 and more or less of the exhaust gases can be directed around the first flow device 206 (e.g., in a circumvented flow, etc.).

The Venturi body 302 may be circular, conical, frustoconical, aerodynamic, or other similar shapes. The first support flange 304 functions to couple the first flow device 206 to the multi-stage mixer 200. In various embodiments, the first support flange 304 provides a seal between the Venturi body 302 and the multi-stage mixer 200 such that no exhaust gases may pass through or circumvent the first support flange 304. As a result, the exhaust gases are redirected from the first support flange 304 upstream for entry into the Venturi body 302. However, as explained in more detail herein, the first support flange 304 in some embodiments has apertures through which the exhaust gases may pass to pass through the first flow device 206.

As shown in FIG. 3, the first flow device 206 includes an exhaust gas guide aperture 306 and an exhaust gas guide 307 which is coupled to the port 216. The exhaust gas guide 307 may be frustoconical. The exhaust gas guide 307 receives reductant from the doser 214 (not shown in FIG. 3), through the port 216, and causes the reductant to flow into the Venturi body 302. The exhaust gas guide 307 is coupled to, or integrated within, the Venturi body 302 of the first flow device 206 around the exhaust gas guide aperture 306 such that the exhaust gases cannot flow between the exhaust gas guide 307 and the Venturi body 302. Instead, the exhaust gas guide 307 includes a plurality of apertures 308 that each receive the exhaust gases and direct the exhaust gases into the exhaust gas guide 307. The exhaust gases are then mixed with reductant from the doser 214 within the Venturi body 302 and/or the exhaust gas guide 307. The flow of the exhaust gases into the exhaust gas guide 307 causes the reductant from the doser 214 to flow, along with the exhaust gases, into the Venturi body 302 and towards the center of the multi-stage mixer 200. In this way, the flow of reductant is assisted by the flow of the exhaust gases.

According to various embodiments, the reductant guide 218 is positioned within the exhaust gas guide 307. In these embodiments, the reductant is separated from the exhaust gases until the reductant leaves the reductant guide 218 at which point the exhaust gases cause the reductant to travel towards the center of the multi-stage mixer 200. By initially separating the reductant and the exhaust gases, build-up of reductant within the multi-stage mixer 200 may be minimized by minimizing impingement on a spray wall of the multi-stage mixer 200.

According to various embodiments, the diameter of the Venturi body 302 is:

$$0.25D_0 \leq D_C \leq 0.9D_0 \qquad (6)$$

where the Venturi body 302 is defined by a diameter $D_C$ and the Multi-Stage Mixer 200 is defined by an inner diameter $D_0$ greater than $D_C$. The static pressure measured at the Venturi body 302 is given by $$P_C = P_0 - \left(\left(\frac{D_0}{D_C}\right)^4 - 1\right) * \frac{1}{2}\rho v_0^2 \qquad (7)$$

where $P_C$ is the absolute static pressure at the Venturi body 302, where $P_0$ is the absolute static pressure upstream of the Venturi body 302 (e.g., as measured by a pressure transducer, as measured by a sensor, etc.), where $\rho$ is the density of the exhaust gases, and where $v_0$ is the flow velocity upstream of the Venturi body 302 (e.g., as measured by a sensor, etc.). Due to the difference is diameter between the Venturi body 302 and the multi-stage mixer 200, the Venturi body 302 creates a low pressure region. The low pressure region enhances (e.g., increases, expedites, etc.) decomposition of reductant (e.g., via evaporation, via thermolysis, etc.), ordinary and turbulent diffusion, and mixing of reductant droplets.

In some embodiments, the first flow device 206 also includes a main mixer 309 having a plurality of main vanes 310 and a plurality of main vane apertures 312 interspaced therebetween to provide a swirl flow thereby creating additional low pressure regions and facilitating mixing by elongating a mixing trajectory of the first flow device 206. The main vanes 310 are attached to and conform to the Venturi body 302 such that the exhaust gases can only exit the Venturi body 302 through the main vane apertures 312. The main vanes 310 are also attached to and conform to a main vane central hub 313 that is centered about the center axis of the Venturi body 302.

The main vanes 310 are static and do not move within the Venturi body 302. In this way, the main mixer 309 may be less complex to manufacture and less expensive, and therefore more desirable, than aftertreatment components with complicated components that are expensive and require difficult and time intensive manufacturing. Rather than confining the flow of exhaust gases into a single path to create a swirl flow, the main vanes 310 provide several openings between adjacent main vanes 310, such that each of the main vanes 310 independently swirls the exhaust gases and such that the main vanes 310 collectively form the swirl flow in the exhaust gases.

The main vanes 310 are positioned (e.g., curved, angled, bent, etc.) to cause a swirl (e.g., mixing, etc.) flow of the exhaust gases and the reductant to form a mixture. In various embodiments, the main vanes 310 are substantially straight (e.g., substantially disposed along a plane, having a substantially constant slope along the main vane 310, etc.). In other embodiments, the main vanes 310 are curved (e.g., not substantially disposed along a plane, having different slopes along the main vane 310, having edges which are curved relative to the remainder of the main vane 310, etc.). In still other embodiments, adjacent main vanes 310 are positioned so as to extend over one another. In these embodiments, the main vanes 310 may be straight and/or curved. In embodiments with multiple main vanes 310, each main vane 310 may be independently configured so that the main vanes 310 are individually tailored to achieve a target configuration of the first flow device 206 such that the multi-stage mixer 200 is tailored for a target application.

Each of the main vanes 310 is defined by a vane angle (e.g., relative to a center axis of the multi-stage mixer 200, etc.) that is related to the swirl produced by that main vane 310. The vane angle for each of the main vanes 310 may be different from the vane angle for any of the others of the main vanes 310. According to various embodiments, the first flow device 206 includes main vanes 310 that have a vane angle of between thirty degrees and eighty degrees. However, the main vanes 310 may have other suitable vane angles. Similarly, the first flow device 206 may include any number of the main vanes 310. In some embodiments, the first flow device 206 includes between four and twelve main vanes 310.

The main vane apertures 312 collectively define the open area $A_I$. However, the size of the main vane apertures 312 is related to, in part, the diameter of the main vane central hub 313. According to various embodiments, the diameter of the main vane central hub 313 is given by $$0.05 D_C \leq D_H \leq 0.25 D_C \quad (8)$$

where $D_H$ is the diameter of the main vane central hub 313. In application, any of the number of the main vanes 310, the vane angles of the main vanes 310, and the diameter of the main vane central hub 313 may be varied to optimize improvements in the flow of the exhaust gases and the reductant, the improvements in the mixing of the reductant, and the improvements in minimizing pressure drop. The main mixer 309 may be configured such that the main vanes 310 are symmetrically or asymmetrically disposed about the main vane central hub 313.

The second flow device 208 shown in FIG. 3 includes a second flow device center aperture 314 and a plurality of second flow device apertures 316. The second flow device center aperture 314 is aligned with the center of the first flow device 206 and/or with the center of the multi-stage mixer 200 and is surrounded by the plurality of second flow device apertures 316. In operation, the exhaust gases, along with the reductant, flow through the main vane apertures 312 and into stage one, and then flow through the second flow device center aperture 314 and the second flow device apertures 316, and into stage two. The second flow device center aperture 314 and the second flow device apertures 316 collectively define the open area $A_{II}$.

The swirl flow produced by the main vanes 310 may cause a majority of the flow of the exhaust gases and the reductant to be biased towards a periphery of the multi-stage mixer 200. The second flow device center aperture 314 and the second flow device apertures 316 may counter this bias by creating a relatively lower flow restriction at the center, via the second flow device center aperture 314, and a relatively greater flow restriction near the periphery of the multi-stage mixer 200, via the second flow device apertures 316. This interaction between the first flow device 206 and the second flow device 208 improves flow and uniformity of the exhaust gases and the reductant while continuing to minimize pressure drop.

The third flow device 210 shown in FIG. 3 includes a plurality of third flow device apertures 318. The plurality of third flow device apertures 318 may be substantially similar to the second flow device apertures 316. In operation, the exhaust gases, along with the reductant, flow through the second flow device center aperture 314 and the second flow device apertures 316 and into stage two, and then flow through the third flow device apertures 318, and into stage three. The third flow device apertures 318 collectively define the open area $A_{III}$. From stage three, the exhaust gases, along with the reductant, flow out of the multi-stage mixer 200 through the multi-stage mixer outlet 204.

The third flow device apertures 318 may be identical to one another and uniformly spaced along the third flow device 210. In this way, the third flow device 210 can provide a substantially uniform flow and distribution of the exhaust gases and the reductant. In this way, the third flow device 210 may reduce or eliminate shear experienced downstream of the multi-stage mixer 200, such as at the inlet of the SCR catalyst 106, which minimizes erosion, such as that typically experienced by catalyst material due to contact with hard aerosol particles entrained in swirling flow of exhaust gases.

Figure 4:
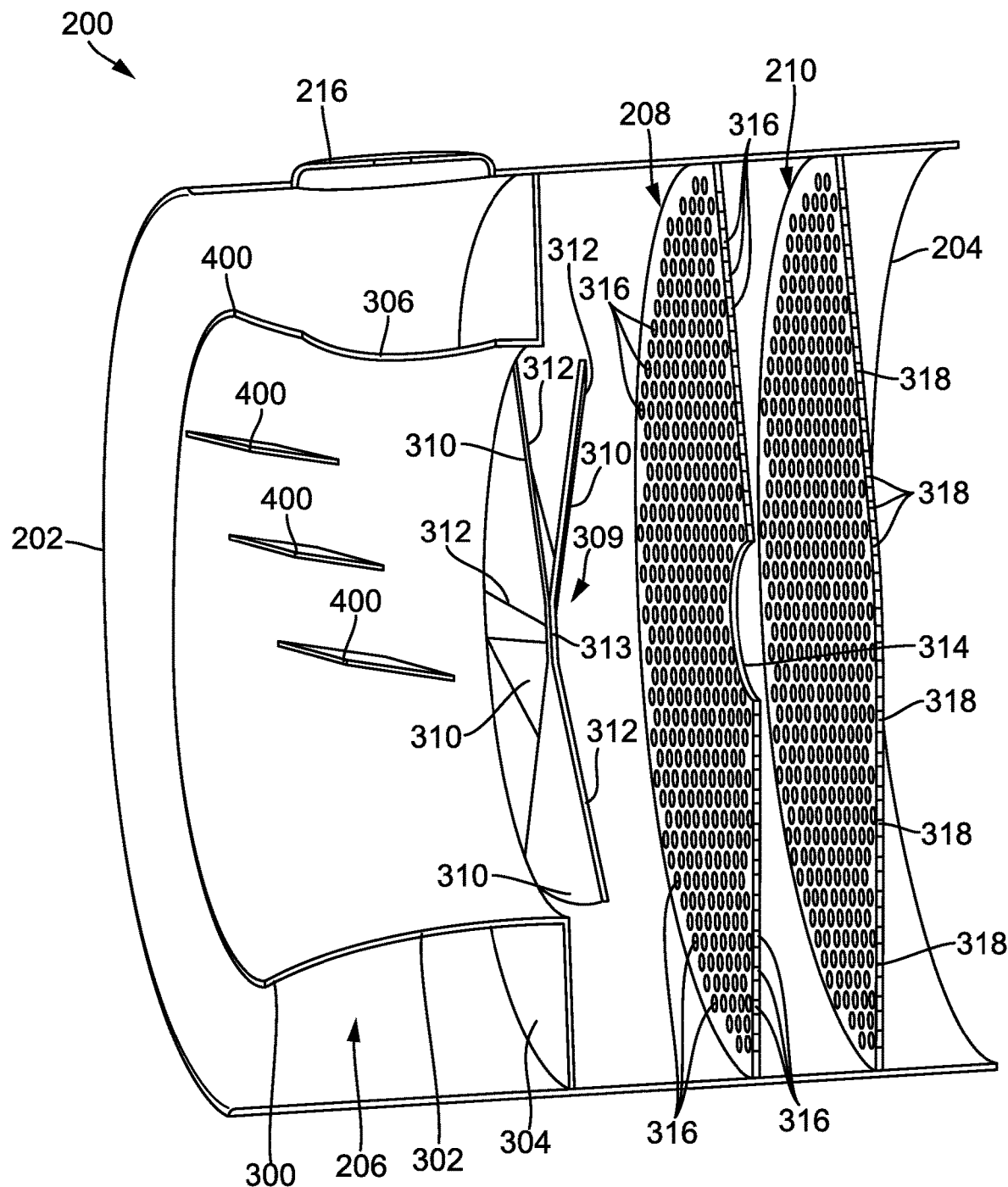
FIG. 4 is a cross-sectional view of yet another multi-stage mixer.

FIG. 4 illustrates the multi-stage mixer 200 according to another embodiment. As shown in FIG. 4, the funneling edge 300 of the first flow device 206 is less angled than the funneling edge 300 shown in FIG. 3. As a result, a larger amount of the exhaust gases may flow between the Venturi body 302 and the multi-stage mixer 200 in the multi-stage mixer 200 shown in FIG. 4 than in the multi-stage mixer 200 shown in FIG. 3. Further, the multi-stage mixer 200 shown in FIG. 4 does not include the exhaust gas guide 307 as shown in the multi-stage mixer 200 shown in FIG. 3 or the reductant guide 218. Rather, the reductant is output from the doser 214 (not shown in FIG. 4) through the port 216 and into the Venturi body 302 through the exhaust gas guide aperture 306. The reductant guide 218 may be coupled to the Venturi body 302 around the exhaust gas guide aperture 306 so that no exhaust gas flows between the cylindrical body and the reductant guide 218. In this way, the reductant mixes with the exhaust gases within the Venturi body 302. Alternatively, a gap may exist between the reductant guide 218 and the Venturi body 302 such that the reductant flows into the region between the Venturi body 302 and the multi-stage mixer 200 and mixes with the exhaust gases there. From there, the exhaust gases and reductant may flow through the exhaust gas guide aperture 306 into the Venturi body 302.

As shown in FIG. 4, the first flow device 206 further includes a plurality of internal plates 400 disposed along the Venturi body 302. After reductant enters the Venturi body 302 via the exhaust gas guide aperture 306, the reductant falls into the Venturi body 302 and may contact any of the internal plates 400. Contact between the internal plates 400 and the reductant helps to guide the reductant along a target trajectory prior to reaching the main mixer 309, the second flow device 208, the third flow device 210, or any other downstream component or feature of the multi-stage mixer 200. In this way, the internal plates 400 provide a suitable degree of pre-mixing, thereby improving a uniformity index (e.g., a spatial distribution of the reductant relative to the $NO_x$ in the exhaust gases, etc.) of the exhaust gases. Additionally, the internal plates 400 may help reduce a droplet size of the reductant, thereby reducing the Stokes number of the reductant which increases the ability of the reductant to mix with the exhaust gases. In this way, the internal plates facilitate improved scalability of the multi-stage mixer 200. The number, shape, size, angle (e.g., vane angle, etc.), and configuration of the internal plates 400 may be varied such that the multi-stage mixer 200 obtains a relatively uniform flow of the exhaust gases and the reductant and a relatively uniform distribution of the reductant within the exhaust gases while minimizing spray impingement on the walls of the multi-stage mixer.

While the plurality of internal plates 400 have only been shown in FIG. 4 herein, it is understood that all embodiments of the multi-stage mixer 200 may include the plurality of internal plates 400 in any of the first flow device 206, the second flow device 208, the third flow device 210, and the fourth flow device 212 described herein.

Figure 5:
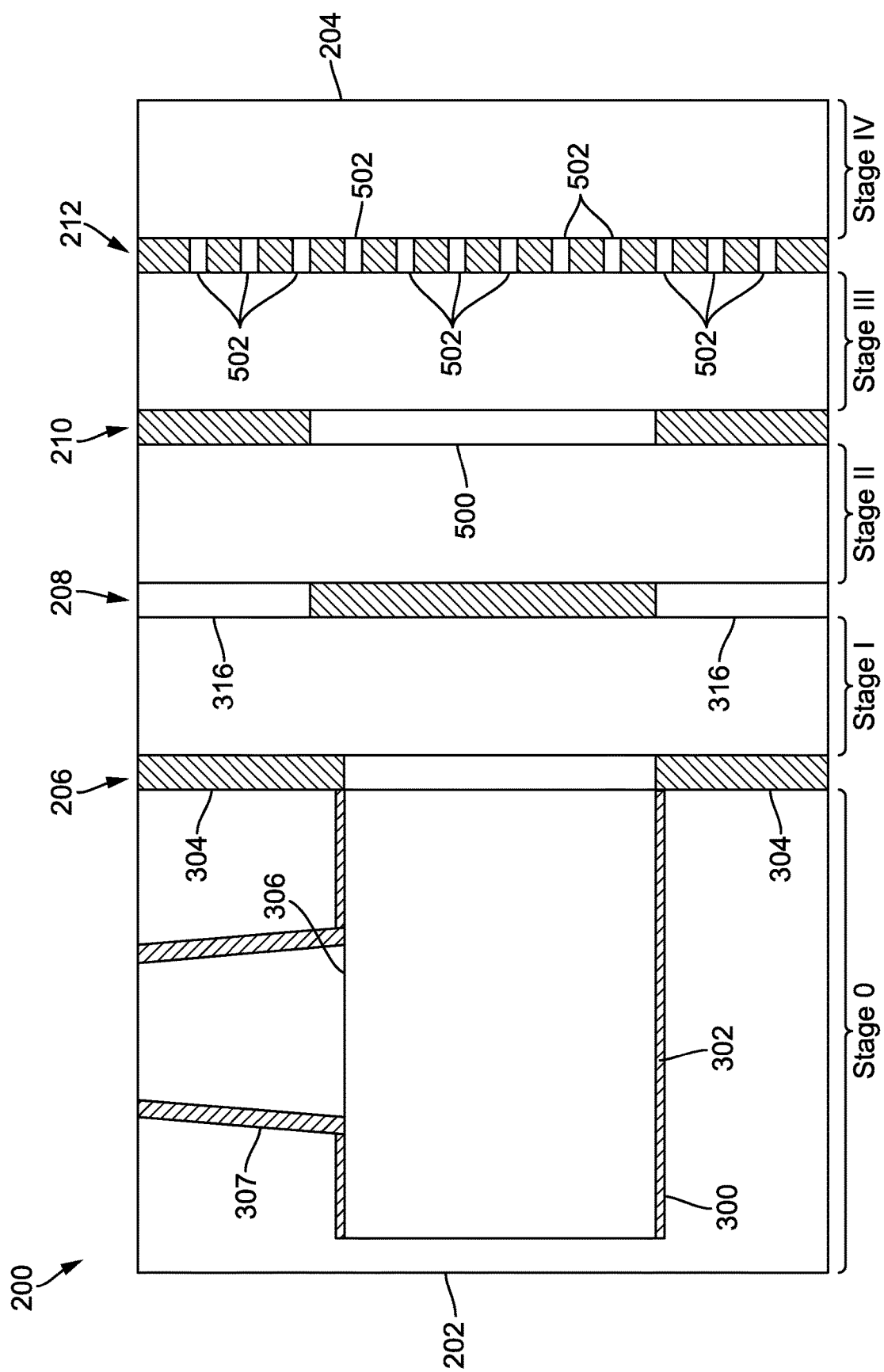
FIG. 5 is a cross-sectional view of yet another multi-stage mixer.

FIG. 5 illustrates the multi-stage mixer 200 according to another embodiment. As shown in FIG. 5, the exhaust gases flow into the Venturi body 302 of the first flow device 206 and the reductant is introduced into the Venturi body 302 via the exhaust gas guide aperture 306 and the reductant guide 218 (not shown) which extends into the exhaust gas guide 307. In some embodiments, the exhaust gas guide 307 is coupled to, or integrated within, the multi-stage mixer 200. In other embodiments, the exhaust gas guide 307 is spaced from the multi-stage mixer 200 such that the exhaust gases can flow between the exhaust gas guide 307 and the wall of the multi-stage mixer 200. The first flow device 206 shown in FIG. 5 does not include the main mixer 309 shown in FIGS. 3 and 4. Instead, the exhaust gases and the reductant flow directly from inside the Venturi body 302 into stage one and then through the second flow device apertures 316 in the second flow device 208. In this way, the Venturi body 302 defines the open area $A_I$.

While the second flow device 208 does not include the second flow device center aperture 314 shown in FIG. 3, the second flow device apertures 316 shown in FIG. 5 are larger than the second flow device apertures 316 shown in FIG. 1. Therefore, the second flow device apertures 316 shown in FIG. 5 define the open area $A_{II}$ which is substantially equal to the open area $A_I$ of the first flow device 206. As shown in FIG. 5, the third flow device 210 includes a third flow device center aperture 500. The exhaust gases and the reductant flow from the second flow device apertures 316 in the second flow device 208, into stage two, and through the third flow device 210 through the third flow device center aperture 500, and into stage three. The third flow device center aperture 500 defines the open area $A_{III}$. From stage three, the exhaust and the reductant flow through a plurality of fourth flow device apertures 502 in the fourth flow device 212. The fourth flow device apertures 502 may be a plurality of perforations. The fourth flow device apertures 502 define the open area $A_{VI}$. From stage four, the exhaust gases and the reductant flow out of the multi-stage mixer 200 via the multi-stage mixer outlet 204.

Figure 6A:
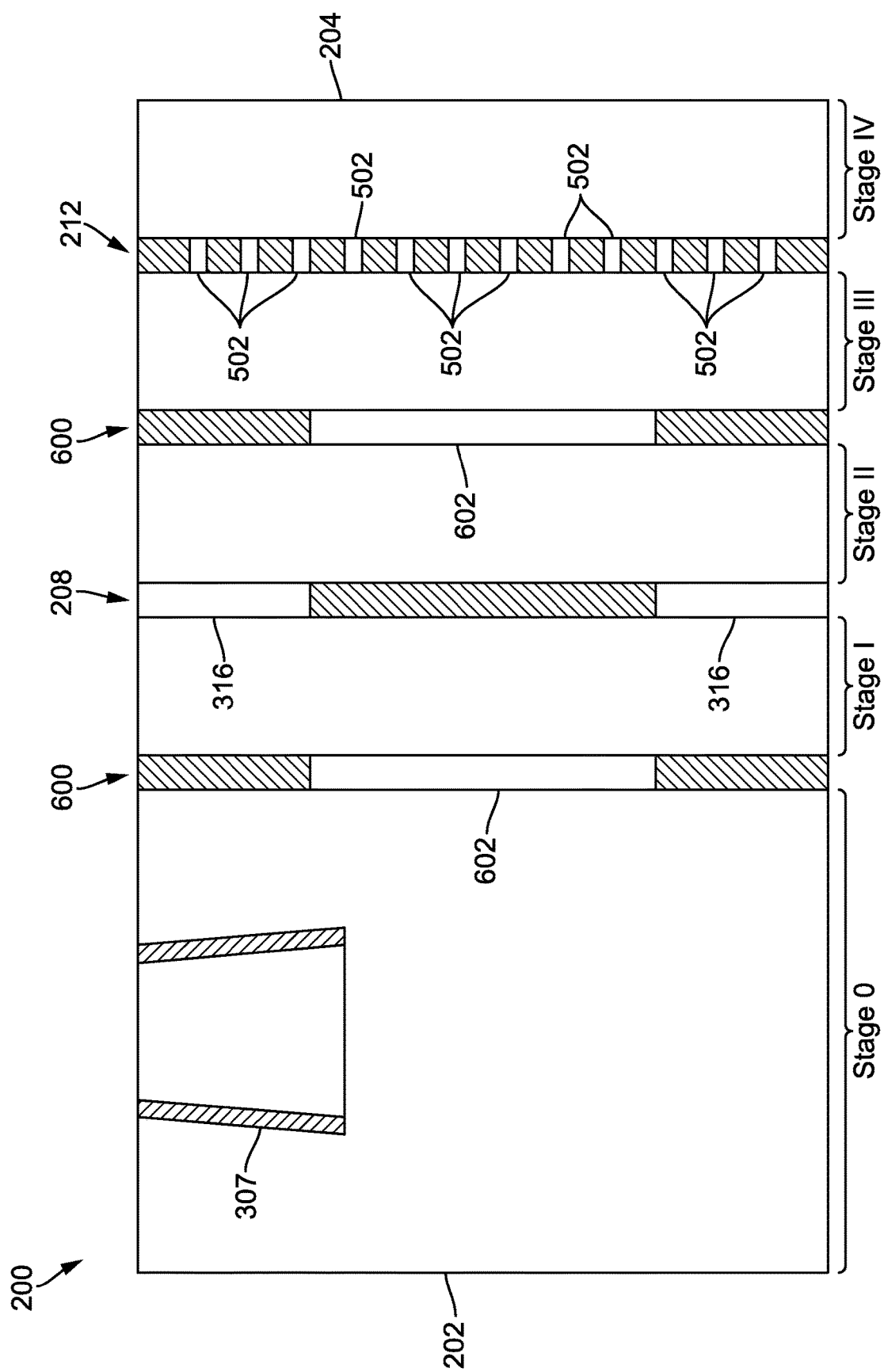
FIG. 6A is a cross-sectional view of yet another multi-stage mixer.
Figure 6B:
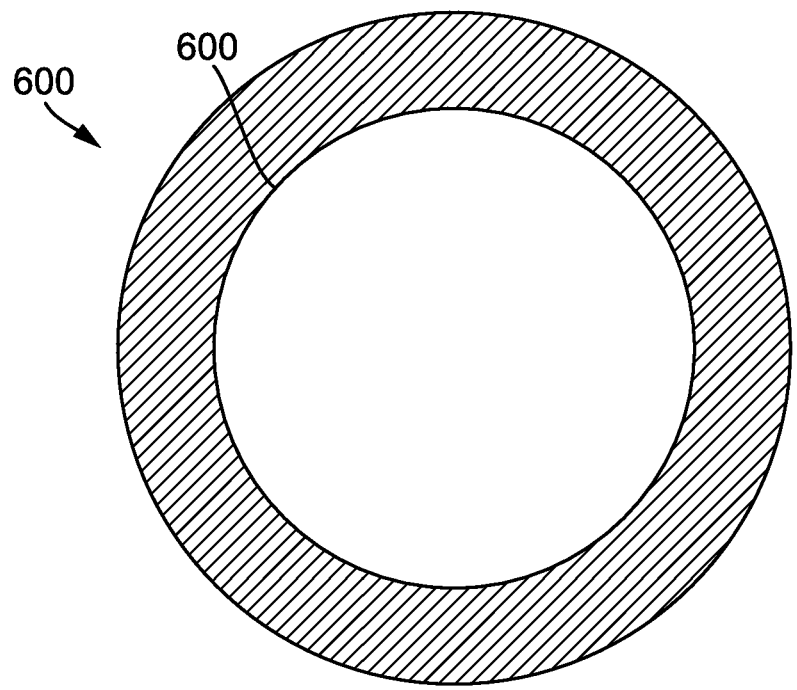
FIG. 6B is front view of a flow device for the multi-stage mixer shown in FIG. 6A.
Figure 6C:
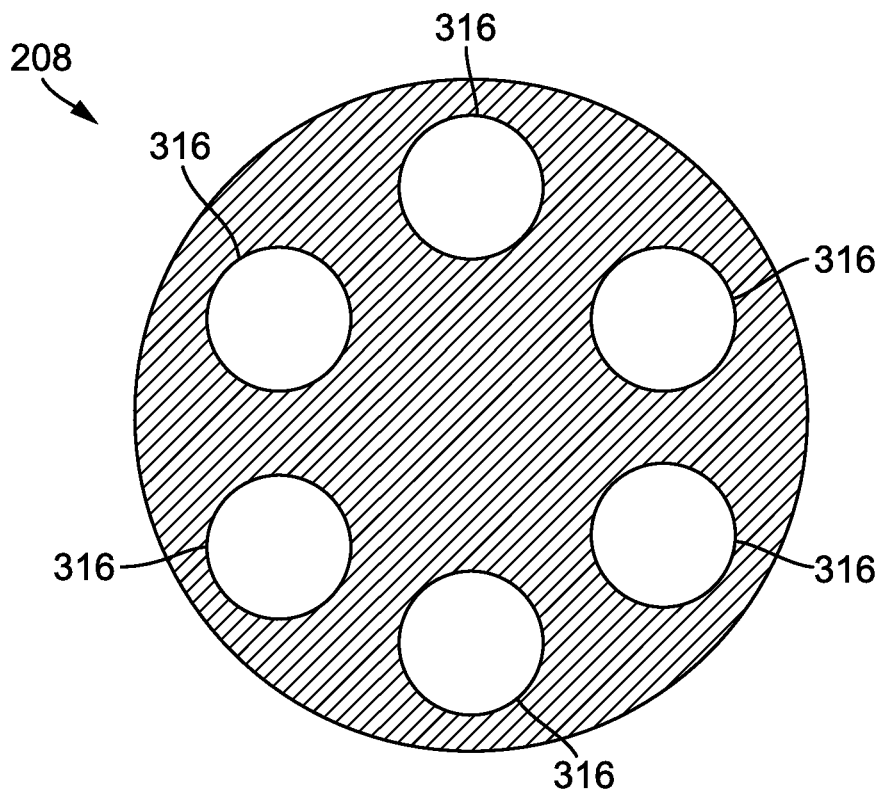
FIG. 6C is a front view of another flow device for the multi-stage mixer shown in FIG. 6A.

FIGS. 6A-6C illustrate the multi-stage mixer 200 and components thereof according to another embodiment. As shown in FIG. 6A, the first flow device 206 and the third flow device 210 are each replaced with a fifth flow device 600. The fifth flow device 600 includes a fifth flow device center aperture 602. Further, the fifth flow device 600 does not include the funneling edge 300, the Venturi body 302, or the exhaust gas guide aperture 306. The exhaust gases flow into the multi-stage mixer 200 and the reductant is introduced to the exhaust gases via the exhaust gas guide 307. The exhaust gases and the reductant together flow through the fifth flow device center aperture 602 in the fifth flow device 600 and into stage one. As shown in FIG. 6B, the fifth flow device center aperture 602 may be centrally disposed within the fifth flow device 600. In this way, the fifth flow device center aperture 602 defines the open area $A_I$. From stage one, the exhaust gases and the reductant flow from stage one through the second flow device apertures 316 in the second flow device 208 and into stage two. As shown in FIG. 6C, the second flow device apertures 316 may be identical and uniformly circumferentially disposed about the center axis of the second flow device 208. From stage two, the exhaust gases and the reductant flow from stage two through the fifth flow device center aperture 602 in the fifth flow device 600 and into stage three. In this way, the fifth flow device center aperture 602 defines the open area $A_{111}$ which is equal to the open area $A_I$. From stage three, the exhaust gases and the reductant flow from stage three through the fourth flow device apertures 502 and into stage four.

Figure 7:
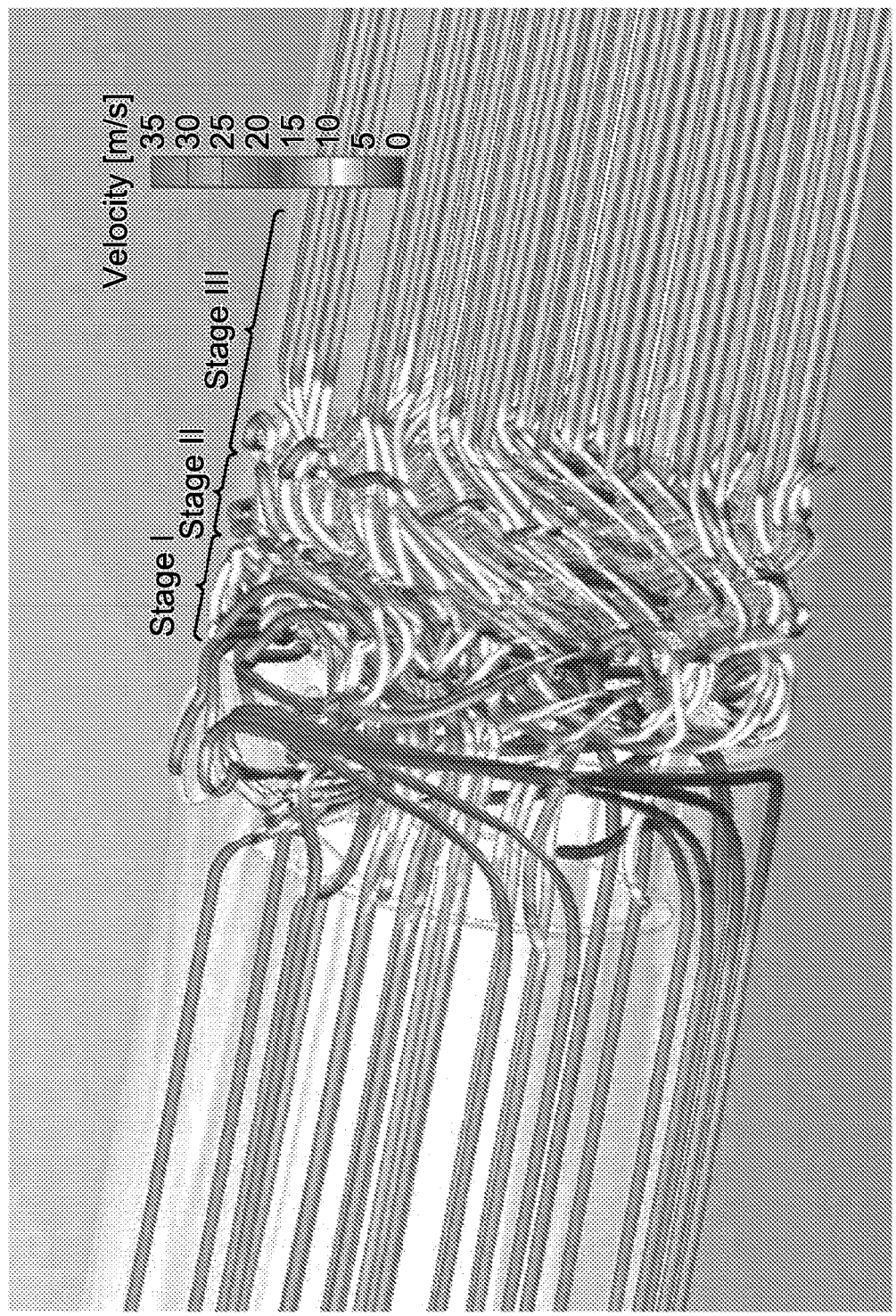
FIG. 7 is a representation of velocity flow lines of exhaust gases within a multi-stage mixer.

FIG. 7 illustrates velocity of flows lines of the exhaust gases, and potentially the reductant, within the multi-stage mixer 200 that includes the first flow device 206, the second flow device 208, and the third flow device 210. FIG. 7 was generated using a simulation which had a change in absolute pressure of five-hundred and twenty-one Pascals at a mass flow rate of 8.5 kilograms per minute and at three-hundred and thirty-five degrees Celsius. As shown in FIG. 7, the flow lines enter the multi-stage mixer 200 relatively straight, are imparted a swirl flow by the first flow device 206, and are subsequently straightened by the second flow device 208 and the third flow device 210 until the flow lines are relatively straight before exiting the multi-stage mixer 200.

Figure 8:
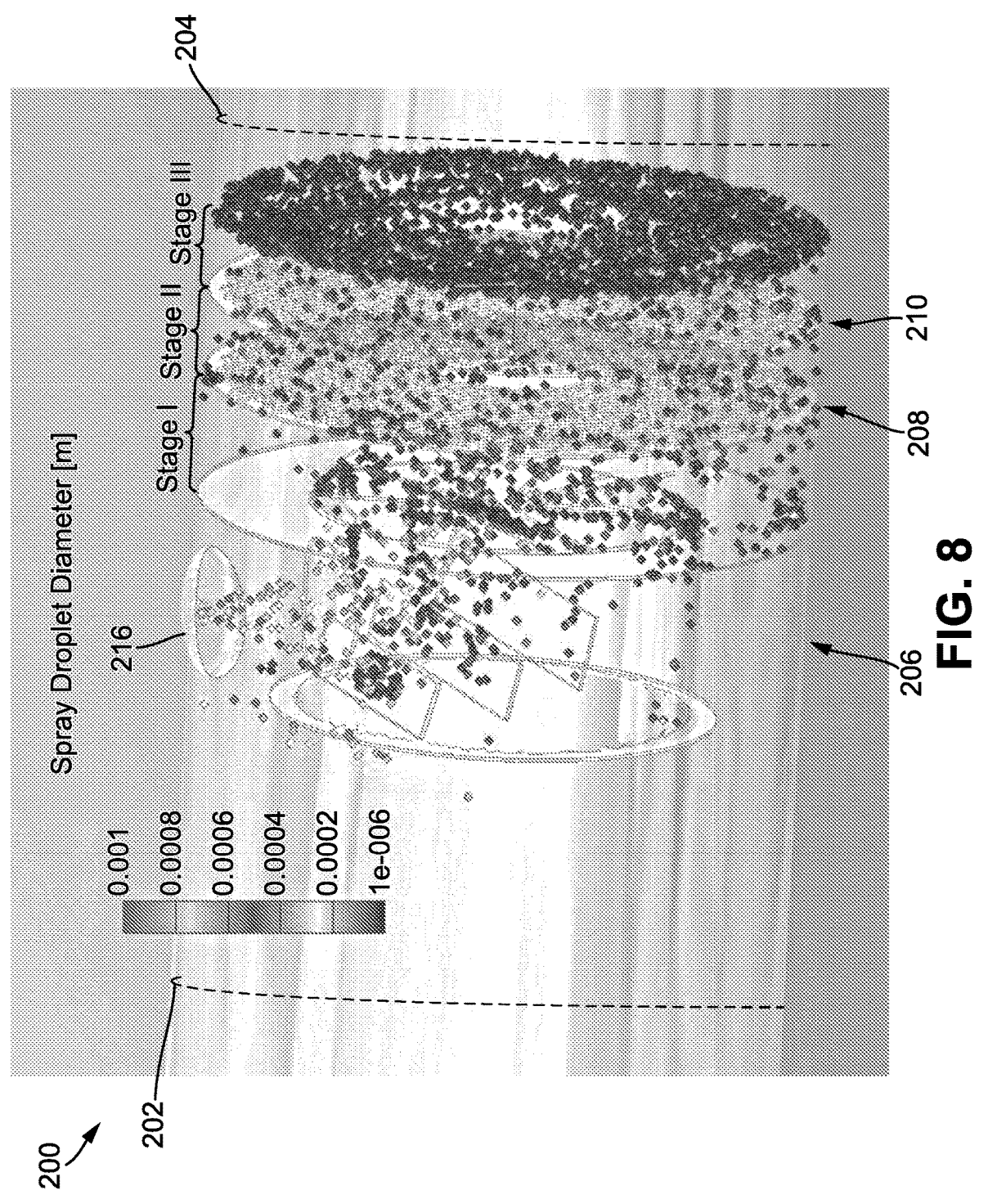

FIG. 8 illustrates locations of reductant droplets and their corresponding sizes within the multi-stage mixer 200 that includes the first flow device 206, the second flow device 208, the third flow device 210, and the port 216. As shown in FIG. 8, the reductant droplets enter the multi-stage mixer 200, are imparted a swirl flow by the first flow device 206, and are subsequently uniformly dispersed by the second flow device 208 and the third flow device 210 until the reductant droplets are relatively uniformly dispersed before exiting the multi-stage mixer 200.

FIGS. 9A-9G illustrate a sixth flow device 900 according to various embodiments. The sixth flow device 900 may be any of the first flow device 206, the second flow device 208, the third flow device 210, the fourth flow device 212, and the fifth flow device 600 as described herein.

The sixth flow device 900 includes a plurality of sixth flow device apertures 902. By increasing the size the sixth flow device apertures 902 within the sixth flow device 900, flow of the exhaust gases and the reductant may become more uniform and distribution of the reductant within the exhaust gases may also become more uniform. These same benefits may be achieved by increasing the density of the sixth flow device apertures 902 proximate to the center of the sixth flow device 900.

Figure 9A:
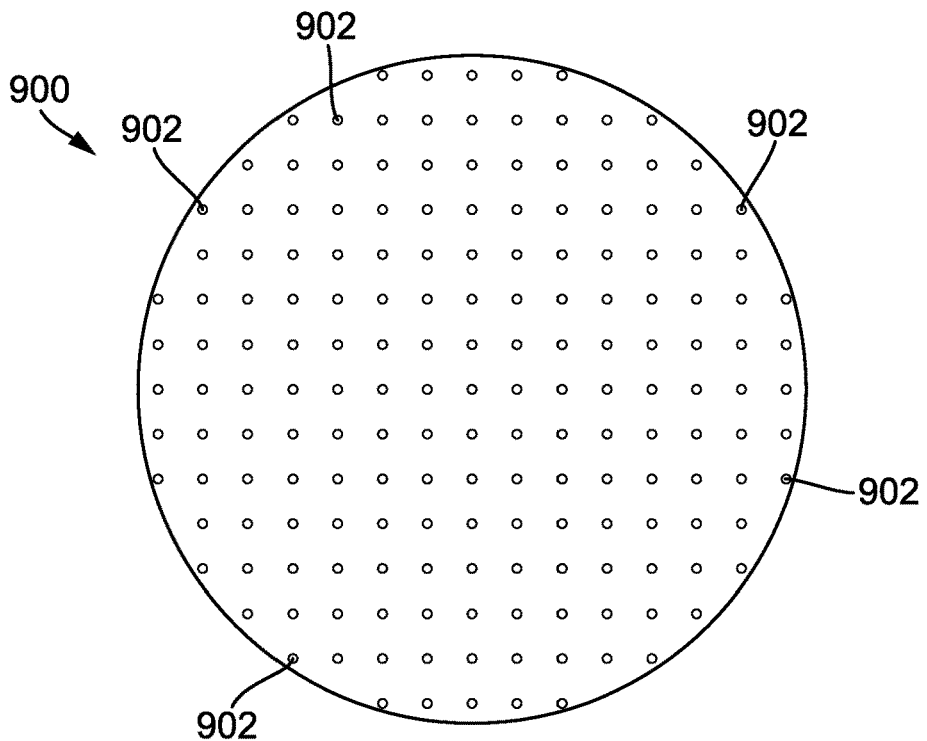
FIG. 9A is a front view of an example flow device for a multi-stage mixer.
Figure 9B:
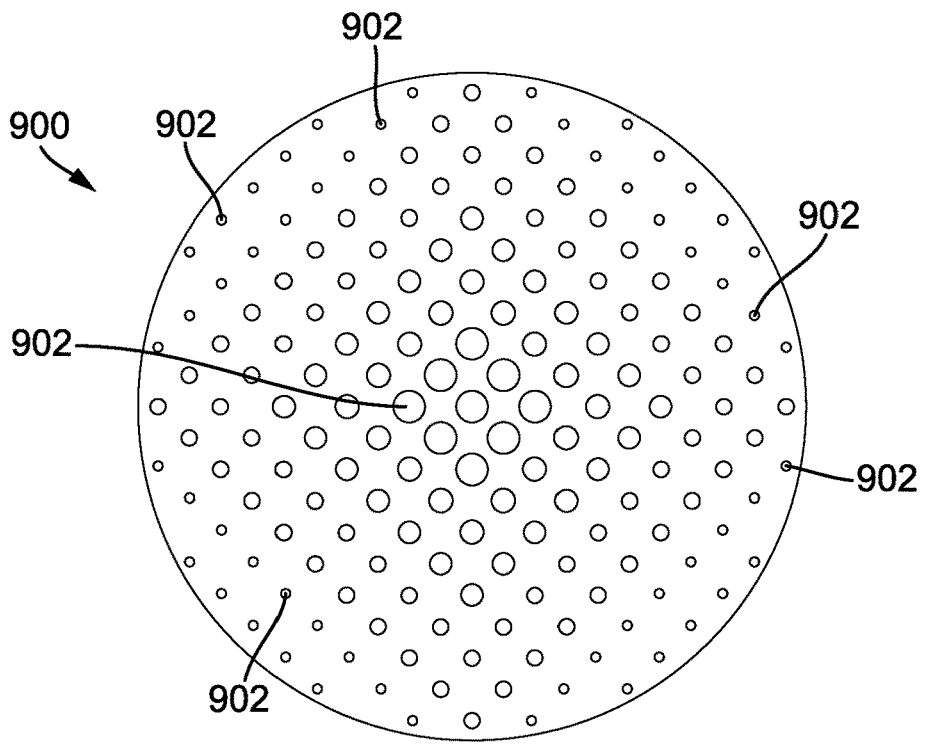
FIG. 9B is a front view of another flow device for a multi-stage mixer.
Figure 9C:
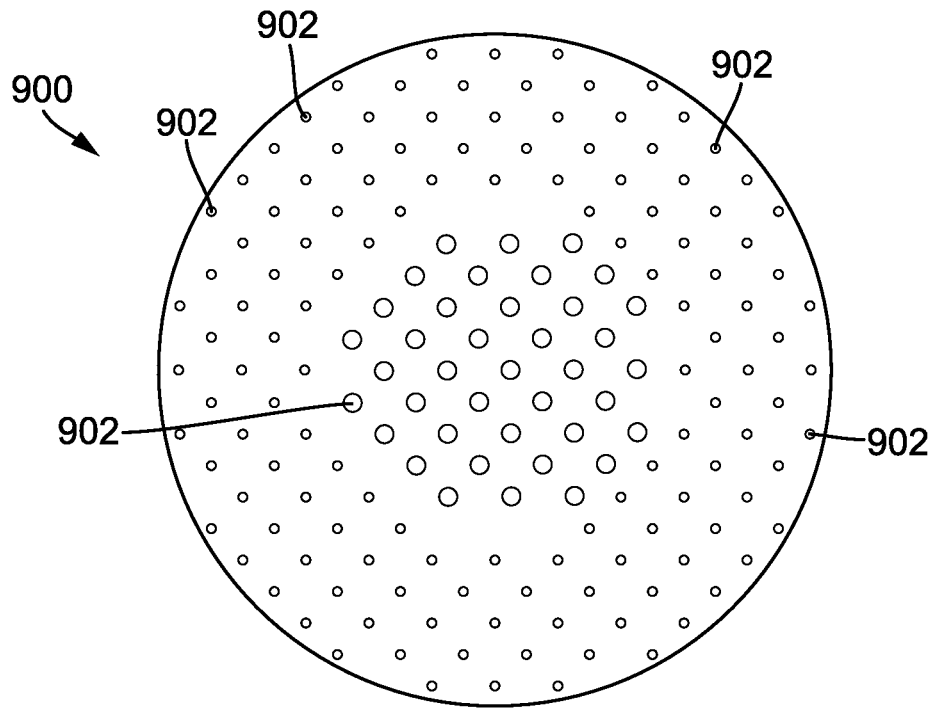
FIG. 9C is a front view of another flow device for a multi-stage mixer.
Figure 9D:
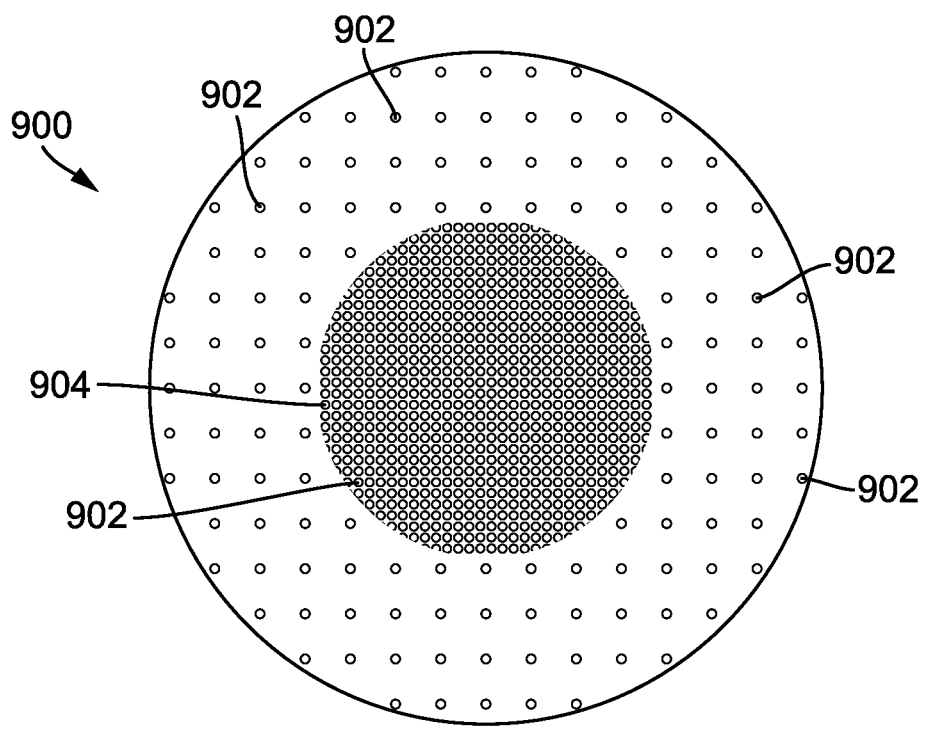
FIG. 9D is a front view of another flow device for a multi-stage mixer.

In other applications, the sixth flow device apertures 902 may be uniformly distributed about a central region 904, as shown in FIG. 9D. The central region 904 may include additional sixth flow device apertures 902 which are uniformly distributed within the central region 904. As shown in FIG. 9D, the sixth flow device 900 is configured such that the sixth flow device apertures 902 that are not disposed within the central region 904 are less heavily concentrated than the sixth flow device apertures 902 that are disposed within the central region 904.

As shown in FIG. 9A, the sixth flow device apertures 902 are uniformly distributed across the sixth flow device 900 and the sixth flow device apertures 902 are identical. In this way, flow produced by the sixth flow device 900 may be substantially uniform. Such an arrangement of the sixth flow device 900 may be implemented proximate to the multi-stage mixer outlet 204 of the multi-stage mixer 200.

However, the sixth flow device apertures 902 may also have different sizes and the sixth flow device apertures 902 may be arranged according to their sizes. As shown in FIGS. 9B and 9C, the sixth flow device apertures 902 are uniformly distributed across the sixth flow device 900 with larger sixth flow device apertures 902 being arranged near the center of the sixth flow device 900 and smaller sixth flow device apertures 902 being arranged near the perimeter of the sixth flow device 900. Such an arrangement of the sixth flow device 900 may be implemented after a swirl has been formed (e.g., after the first flow device 206, etc.).

Figure 9E:
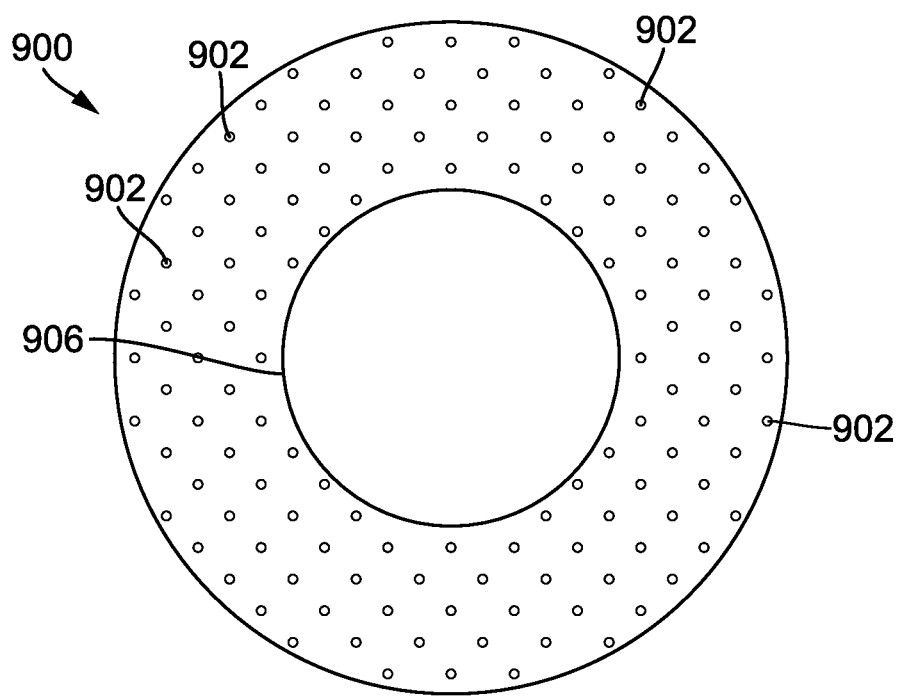
FIG. 9E is a front view of another flow device for a multi-stage mixer.

In other applications, the sixth flow device apertures 902 may be uniformly distributed about a central region 904. The central region 904 may include additional sixth flow device apertures 902 which are uniformly distributed within the central region 904. As shown in FIG. 9D, the sixth flow device 900 is configured such that the sixth flow device apertures 902 that are not disposed within the central region 904 are less heavily concentrated than the sixth flow device apertures 902 that are disposed within the central region 904. In still other applications, the sixth flow device apertures 902 may be uniformly distributed about a central aperture 906. As shown in FIG. 9E, the sixth flow device 900 is configured such that the sixth flow device apertures 902 are uniformly disposed around the central aperture 906.

Figure 9F:
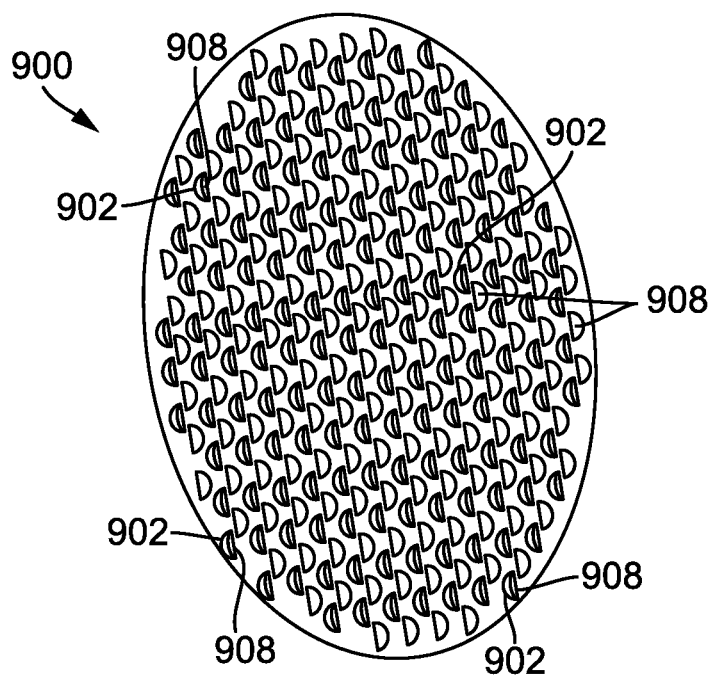
FIG. 9F is a front view of another flow device for a multi-stage mixer.
Figure 9G:
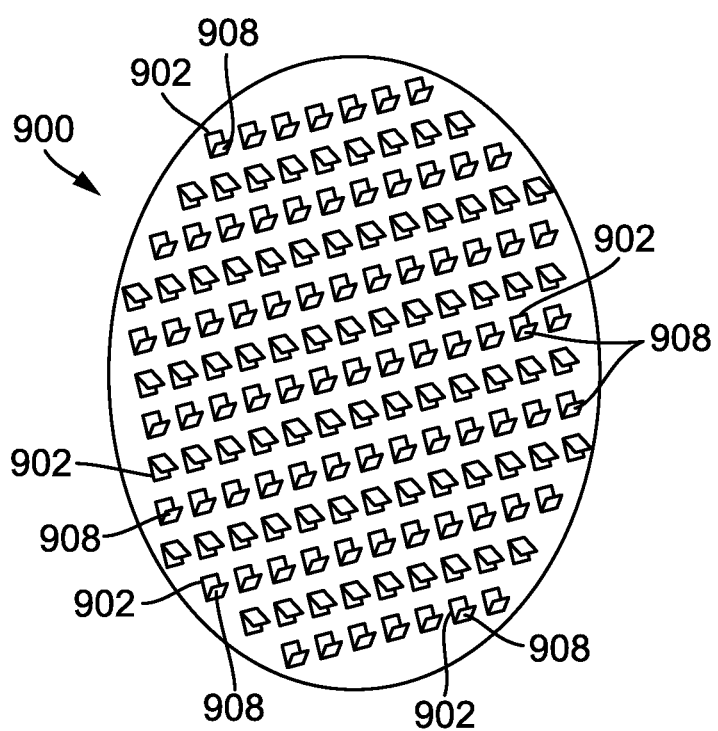
FIG. 9G is a front view of another flow device for a multi-stage mixer.

In some applications, each of the sixth flow device apertures 902 includes a sixth flow device vane 908 that is contiguous with the sixth flow device aperture 902. As shown in FIG. 9F, the sixth flow device apertures 902 are semi-circular and the sixth flow device vanes 908 are semi-circular. As shown in FIG. 9G, the sixth flow device apertures 902 are square and the sixth flow device vanes 908 are square. In manufacture, the sixth flow device apertures 902 and the sixth flow device vanes 908 may be formed simultaneously (e.g., via a punch and die, etc.).

The sixth flow device vanes 908 may be configured to cause the exhaust gases and the reductant to flow in a target direction. The sixth flow device apertures 902 and the sixth flow device vanes 908 may be arranged in a plurality of row and columns across the sixth flow device 900. As shown in FIGS. 9F and 9G, the direction of the sixth flow device vanes 908 may be alternated within a row and be the same within a column. However, other arrangements and configurations of the sixth flow device vanes 908 and the sixth flow device apertures 902 are also possible. For example, the sixth flow device vanes 908 and the sixth flow device apertures 902 may cooperate to create a swirl flow.

FIGS. 10A-10D illustrate the exhaust gas guide 307 in more detail according to various embodiments. It is understood that the exhaust gas guide 307 as shown and described with reference to FIGS. 10A-10D may be included in any of the embodiments of the multi-stage mixer 200 discussed herein.

Figure 10A:
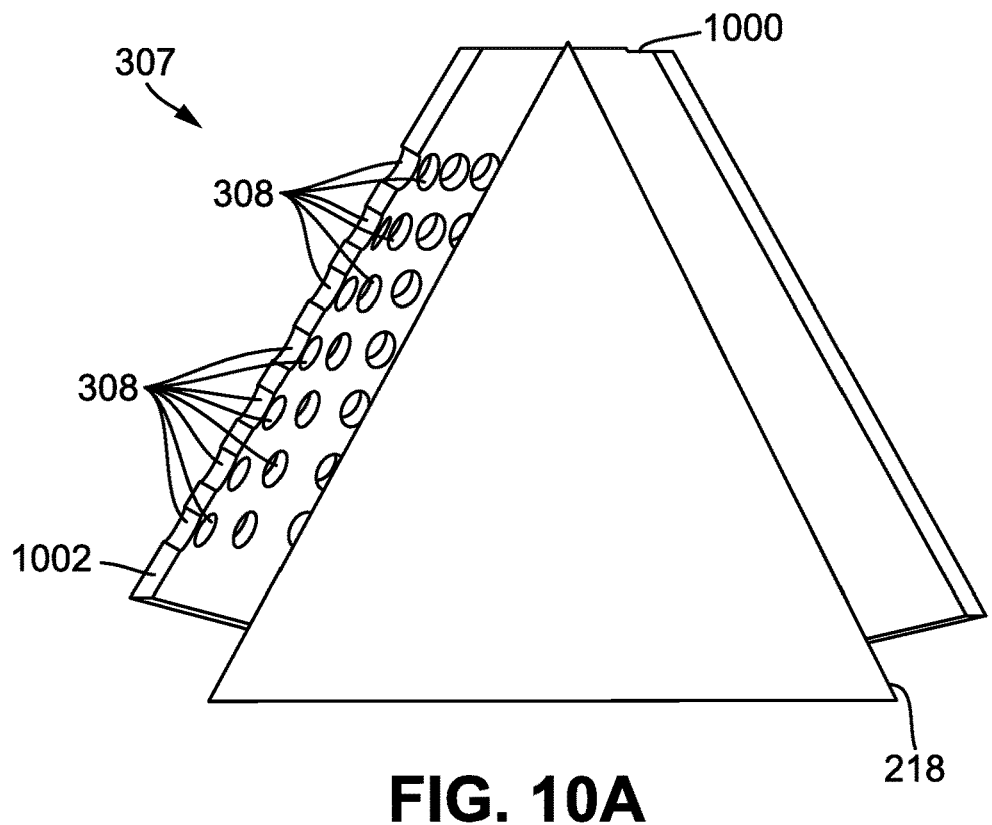
FIG. 10A is a cross-sectional view of an exhaust gas guide and a reductant guide for a multi-stage mixer.
Figure 10B:
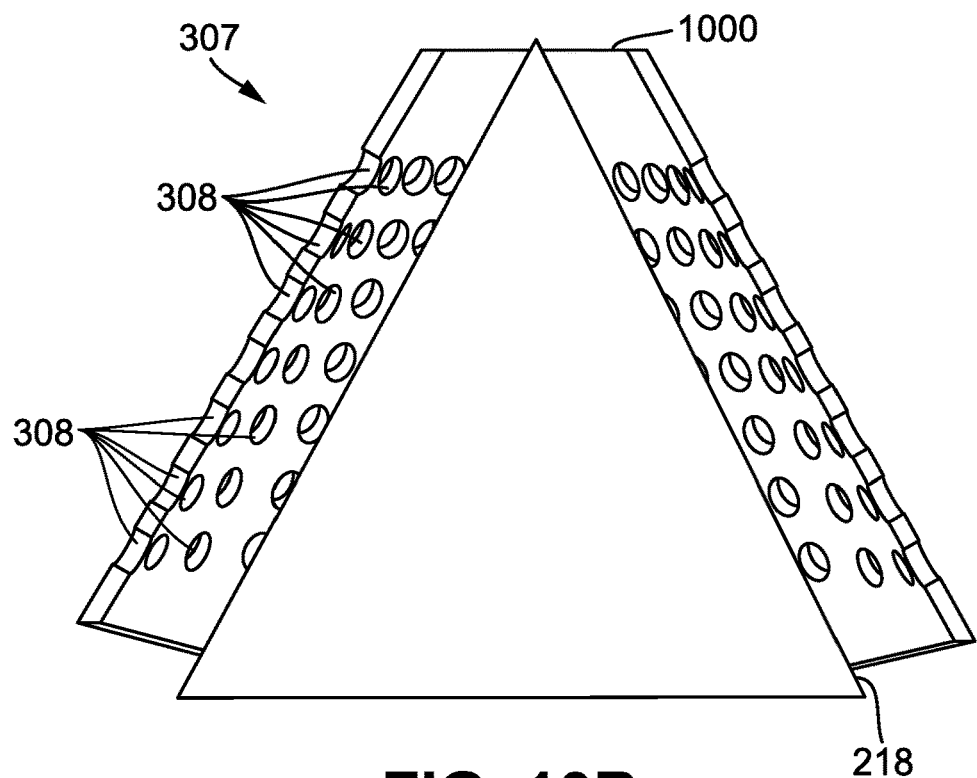
FIG. 10B is a cross-sectional view of another exhaust gas guide and a reductant guide for a multi-stage mixer.

As shown in FIGS. 10A and 10B, the reductant guide 218 is positioned within the exhaust gas guide 307. The reductant guide 218 is configured to dose reductant past the exhaust gas guide 307 and into the multi-stage mixer 200. The exhaust gas guide 307 is defined by a first angle (e.g., at an apex, etc.) and the multi-stage mixer 200 is defined by a second angle (e.g., at an apex, etc.) that is less than the first angle. In this way, the exhaust gas guide 307 and the multi-stage mixer 200 are configured such that spray impingement on the exhaust gas guide 307 is minimized.

The apertures 308 are positioned along the exhaust gas guide 307 and are configured to direct the exhaust gases into a region between the exhaust gas guide 307 and the reductant guide 218 such that the exhaust gases are directed out of a nozzle 1000 of the exhaust gas guide 307. Reductant from the reductant guide 218 may become entrained within the exhaust gases and thereby ejected from the exhaust gas guide 307 along with the exhaust gases. As shown in FIG. 10A, the apertures 308 are disposed along a leading surface 1002 of the exhaust gas guide 307. The leading surface 1002 is adjacent the flow of the exhaust gases from the multi-stage mixer inlet 202 (e.g., upstream, etc.) of the multi-stage mixer 200. The leading surface 1002 may be defined by an angular segment of the exhaust gas guide 307. For example, the leading surface 1002 may be approximately one-hundred and twenty degrees of the exhaust gas guide 307 that is centered on a direction of flow of the exhaust gases into the exhaust gas guide 307.

Figure 10C:
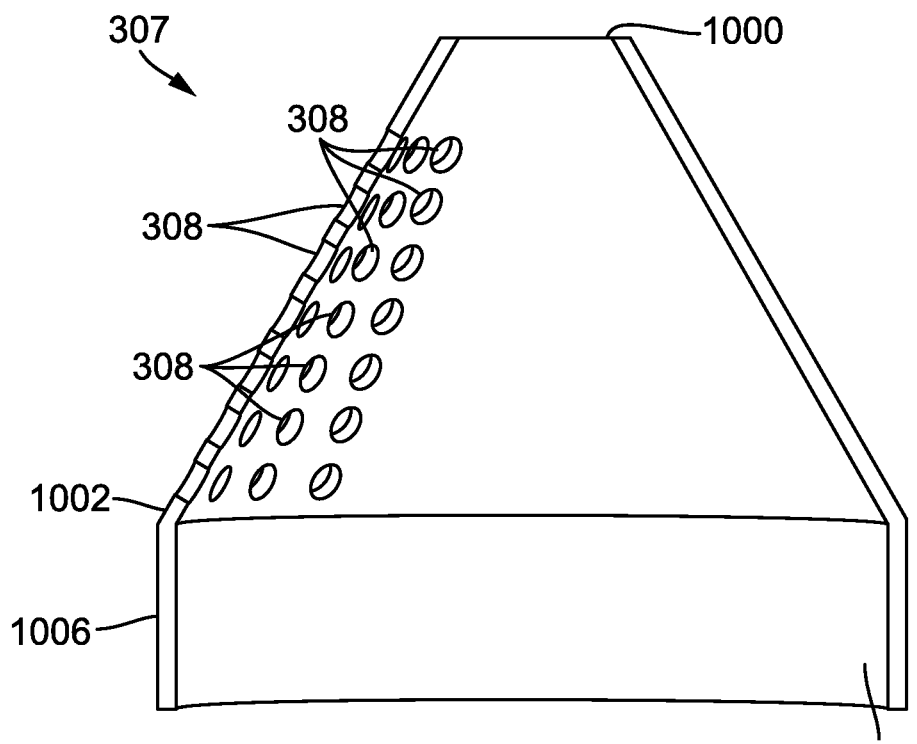
FIG. 10C is a cross-sectional view of yet another exhaust gas guide for a multi-stage mixer.
Figure 10D:
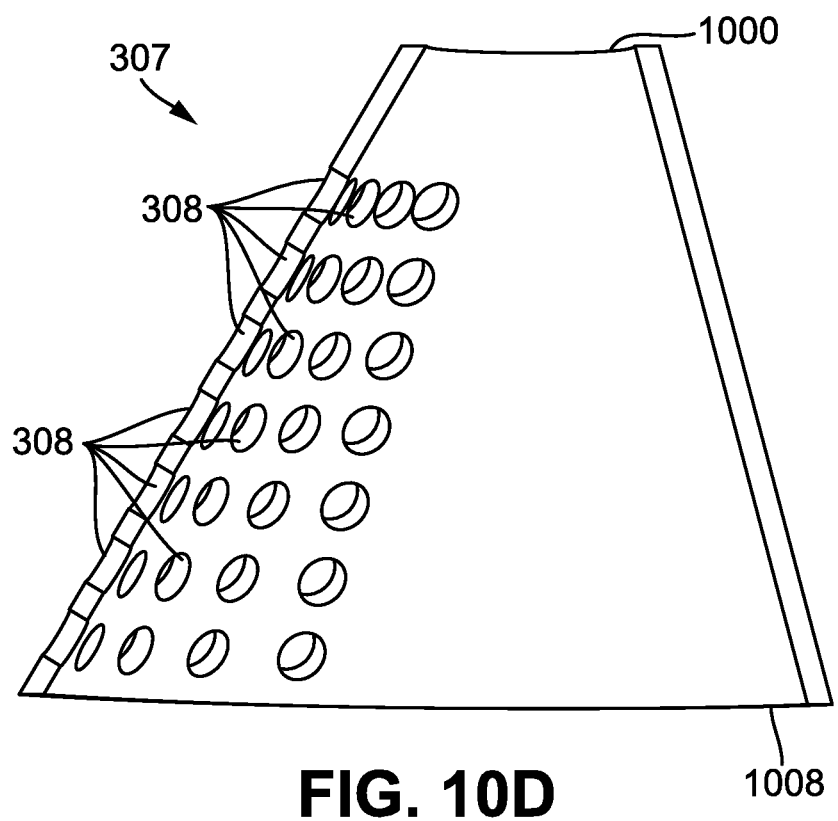
FIG. 10D is a cross-sectional view of yet another exhaust gas guide for a multi-stage mixer.

The apertures 308 may be of varying shapes, sizes, pitches, densities, and configurations. The apertures 308 may be, for example, configured to guide the exhaust gases out of the nozzle 1000 in a vertical direction (e.g., relative to the flow of the exhaust gases into the multi-stage mixer inlet 202. For example, as shown in FIG. 10B, the apertures 308 are disposed uniformly along the exhaust gas guide 307. In another example shown in FIG. 10C, the apertures 308 are disposed along the leading surface 1002. However, as shown in FIG. 10C, the exhaust gas guide 307 includes a cylindrical section 1006 that does not include any apertures 308. The cylindrical section 1006 may facilitate use of the exhaust gas guide 307 in applications where space is limited. Further, in FIG. 10D, the exhaust gas guide 307 includes a deformed section 1008 that also facilitates use of the exhaust gas guide 307 in applications where space is limited.

FIGS. 11A-11E illustrate a portion of the first flow device 206 according to various embodiments. In some embodiments, the main mixer 309 includes a complementary vane 1100 positioned on each of the main vanes 310. It is understood that the complementary vanes 1100 as shown and described with reference to FIGS. 11A-11E may be included in any of the embodiments of the multi-stage mixer 200 discussed herein.

The complementary vanes 1100 define complementary apertures 1102 which are contiguous with the main vane apertures 312. In this way, the complementary vanes 1100 increase the open area, $A_f$, of the first flow device 206. The complementary vanes 1100 may be configured with various angles relative to the main vanes 310 and with various shapes, sizes and configurations. For example, the first flow device 206 may be configured with some of the main vanes 310 including the complementary vanes 1100 and others of the main vanes 310 not including the complementary vanes 1100.

Figure 11A:
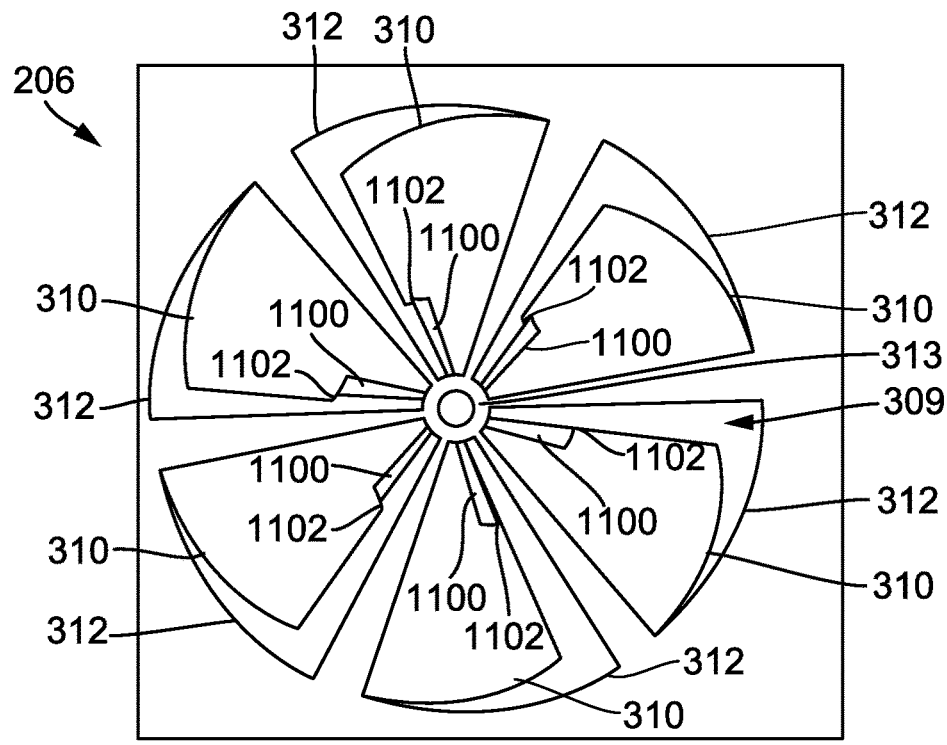
FIG. 11A is a front view of yet another flow device for a multi-stage mixer.
Figure 11B:
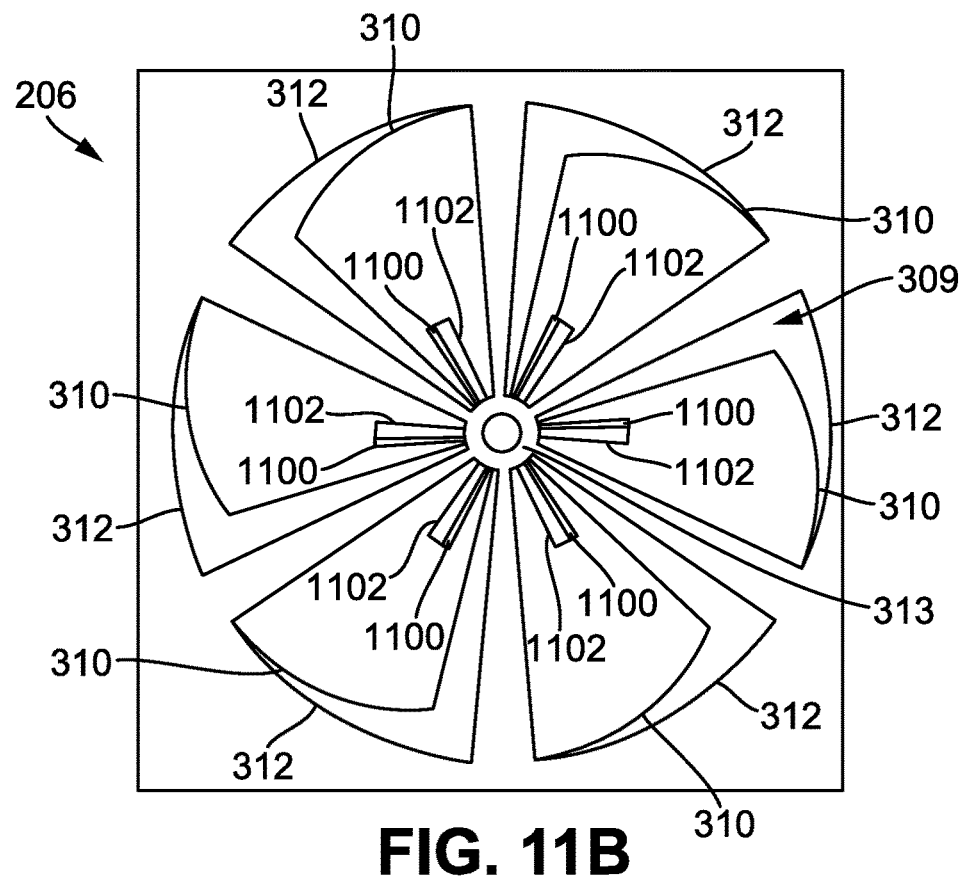
FIG. 11B is a front view of yet another flow device for a multi-stage mixer.
Figure 11C:
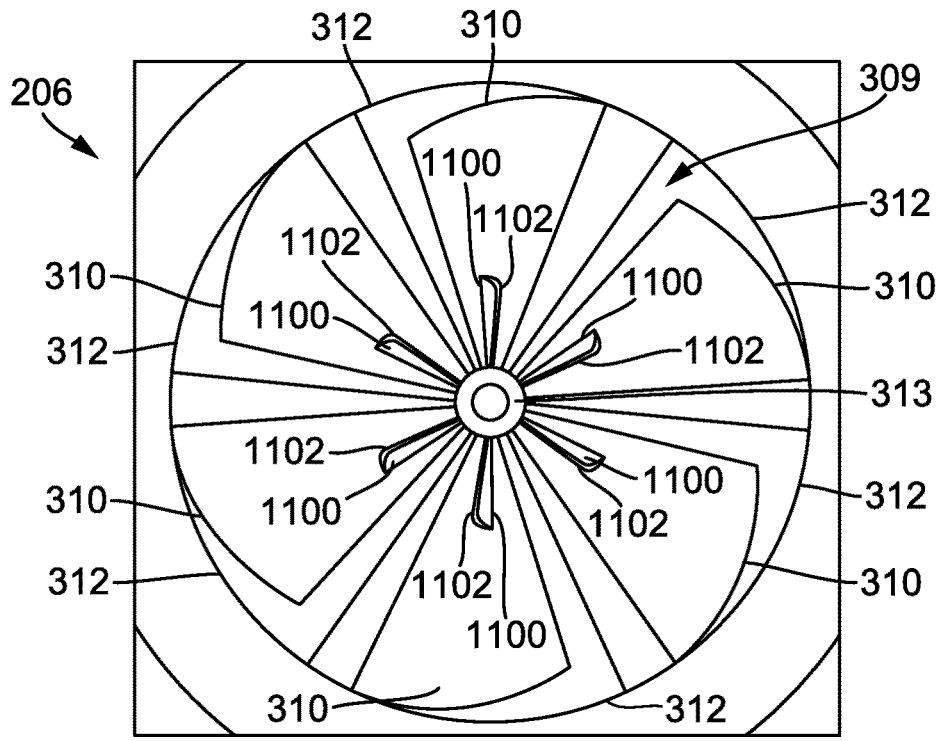
FIG. 11C is a front view of yet another flow device for a multi-stage mixer.
Figure 11D:
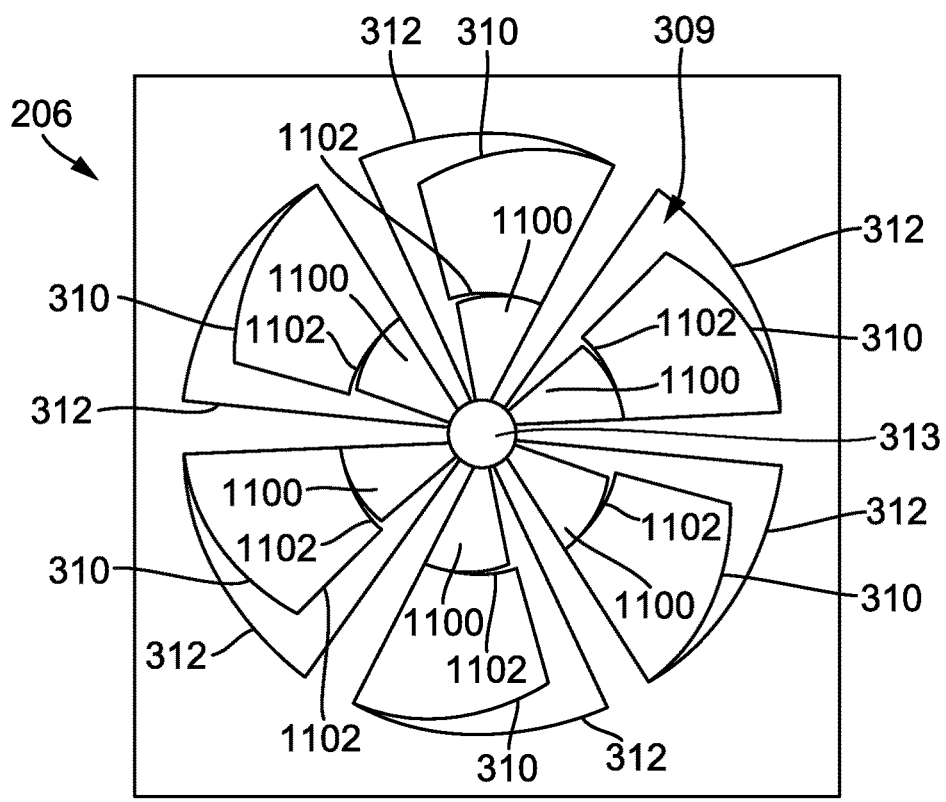
FIG. 11D is a front view of yet another flow device for a multi-stage mixer.

The complementary vanes 1100 may be positioned to be contiguous with an edge of each of the main vanes 310, as shown in FIGS. 11A and 11D, or to be positioned within the main vanes 310, as shown in FIGS. 11B and 11C. Additionally, the complementary vanes 1100 may be configured to create a swirl flow (e.g., co-swirl flow, counter-swirl flow, etc.) that is separate from the swirl flow created by the main vanes 310. In this way, the complementary vanes 1100 can be utilized to increase or decrease the total swirl created by the first flow device 206. In some embodiments, multi-stage mixing can be achieved in an axial direction through the use of two flow devices (e.g., the first flow device 206, the second flow device 208, etc.) that include the complementary vanes 1100.

Figure 11E:
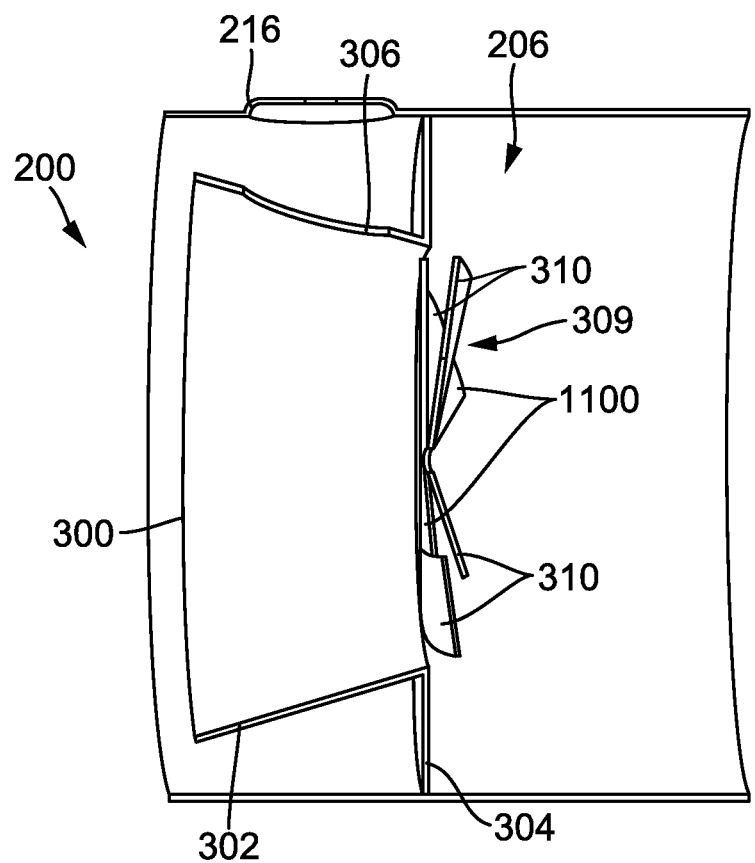
FIG. 11E is a cross-sectional view of yet another multi-stage mixer.

FIG. 11E illustrates a cross-sectional view of the multi-stage mixer 200 having the first flow device 206 including the complementary vanes 1100. In this embodiment, the auxiliary mixer 1106 is eliminated. The auxiliary mixer 1106 may not be needed, and could be eliminated to reduce the cost and manufacturing complexity of the multi-stage mixer 200, in some applications of the multi-stage mixer 200. For example, the auxiliary mixer 1106 may not be included in the multi-stage mixer 200 when the multi-stage mixer 200 is placed downstream of a turbocharger in a close-coupled arrangement (e.g., where the multi-stage mixer 200 is disposed in close proximity to an outlet of the turbocharger, etc.) because the turbocharger produces relatively high swirl velocities at the multi-stage mixer inlet 202.

Figure 12A:
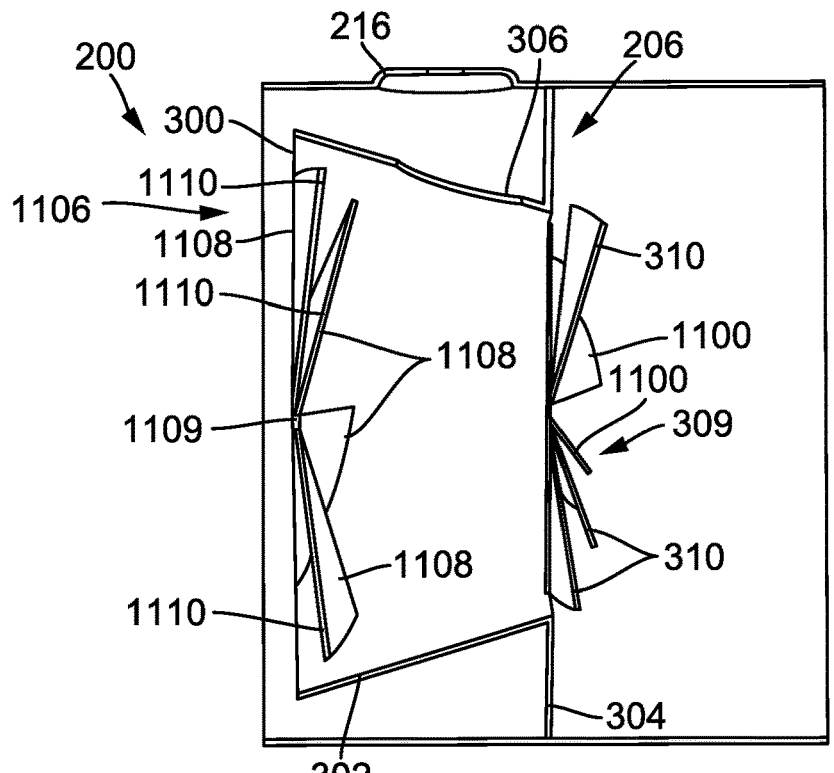
FIG. 12A is a cross-sectional view of yet another multi-stage mixer.

As shown in FIG. 12A, the first flow device 206 includes an auxiliary mixer 1106 that includes auxiliary vanes 1108. It is understood that the auxiliary mixer 1106 as shown and described with reference to FIG. 12A may be included in any of the embodiments of the multi-stage mixer 200 discussed herein.

The auxiliary vanes 1108 are attached to an auxiliary vane central hub 1109 that is centered about the center axis of the multi-stage mixer 200. The auxiliary vane central hub 1109 is coupled to the Venturi body 302 (e.g., via members interspacing adjacent auxiliary vanes 1108, etc.). The auxiliary mixer 1106 is configured to receive the exhaust gases from the multi-stage mixer inlet 202 and to provide the exhaust gases into the Venturi body 302. The auxiliary vanes 1108 may be similar to or different from the main vanes 310.

Tips (e.g., outermost surfaces, etc.) of each of the auxiliary vanes 1108 may be spaced from the Venturi body 302 by an air gap such that the exhaust gases can pass between the tips of each of the auxiliary vanes 1108 and the Venturi body 302.

The auxiliary mixer 1106 includes a plurality of auxiliary vane apertures 1110 interspaced between the plurality of auxiliary vanes 1108. In this way, the plurality of auxiliary vanes and the plurality of auxiliary vane apertures 1110 provide a swirl flow within the first flow device 206. The plurality of auxiliary vane apertures 1110 cooperate with the plurality of auxiliary vanes 1108 to provide the exhaust gases into the first flow device 206 with a swirl flow that facilitates mixing of the reductant and the exhaust gases. The auxiliary vanes 1108 may be configured to create a swirl flow (e.g., co-swirl flow, counter-swirl flow, etc.) that is separate from the swirl flow created by the main vanes 310 and/or the complementary vanes 1100. In this way, the auxiliary vanes 1108 can be utilized to increase or decrease the total swirl created by the first flow device 206. Further, the auxiliary vanes 1108 may increase mixing of the reductant and the exhaust gases within the Venturi body 302.

In the embodiment shown in FIG. 12A, the auxiliary vanes 1108 are located upstream of where the reductant is introduced while the complementary vanes 1100 and the main vanes 310 are located downstream of where the reductant is introduced. In this embodiment, the auxiliary vanes 1108 create a first swirl flow in a first direction and the main vanes 310 and/or the complementary vanes 1100 create a second swirl flow in a second direction that may be the same as the first direction (e.g., co-swirl flow, etc.) or opposite to the first direction (e.g., counter-swirl flow, etc.). Rather than confining the flow of exhaust gases into a single path to create a swirl flow, the auxiliary vanes 1108 provide several openings between adjacent auxiliary vanes 1108, such that each of the auxiliary vanes 1108 independently swirls the exhaust gases and such that the auxiliary vanes 1108 collectively form the swirl flow in the exhaust gases.

The main vanes 310 and/or the auxiliary vanes 1108 may be constructed (e.g., manufactured, made, etc.) using sheet metal (e.g., aluminum sheets, steel sheets, etc.) in various applications. For example, the main vanes 310 and/or the auxiliary vanes 1108 may be constructed through stamping, punching, laser cutting, waterjet cutting, and/or welding operations.

Figure 12B:
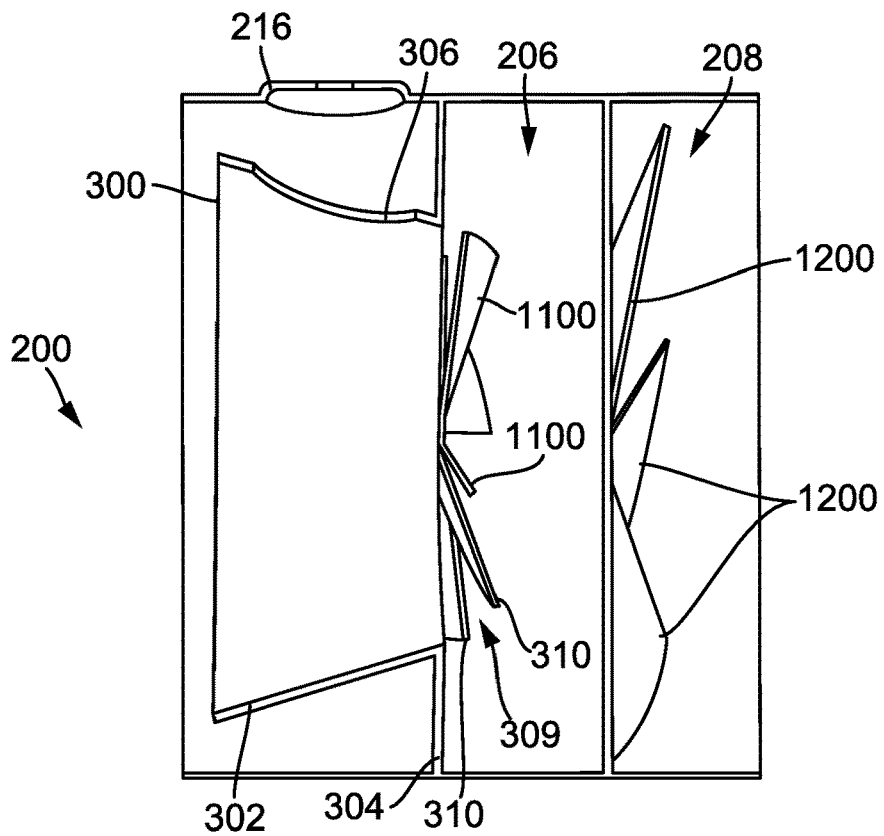
FIG. 12B is a cross-sectional view of yet another multi-stage mixer.

FIG. 12B illustrates a cross-sectional view of the multi-stage mixer 200 having the auxiliary mixer 1106 including the complementary vanes 1100 and the second flow device 208 including a plurality of second flow device vanes 1200. It is understood that the second flow device vanes 1200 as shown and described with reference to FIG. 12B may be included in any of the embodiments of the multi-stage mixer 200 discussed herein.

The second flow device vanes 1200 may be similar to or different from the main vanes 310. Similar to the complementary vanes 1100 and the auxiliary vanes 1108, the second flow device vanes 1200 may be configured to create a swirl flow (e.g., co-swirl flow, counter-swirl flow, etc.) that is separate from the swirl flow created by the main vanes 310, the complementary vanes 1100, and/or the auxiliary vanes 1108. In this way, the second flow device vanes 1200 can be utilized to increase or decrease the total swirl of the exhaust gases and the reductant. In the embodiment shown in FIG. 12B, the complementary vanes 1100 and the second flow device vanes 1200 are located downstream of where the reductant is introduced. In this embodiment, the complementary vanes 1100 create a first swirl flow in a first direction and the second flow device vanes 1200 create a second swirl flow in a second direction that may be the same as the first direction (e.g., co-swirl flow, etc.) or opposite to the first direction (e.g., counter-swirl flow, etc.).

Figure 13:
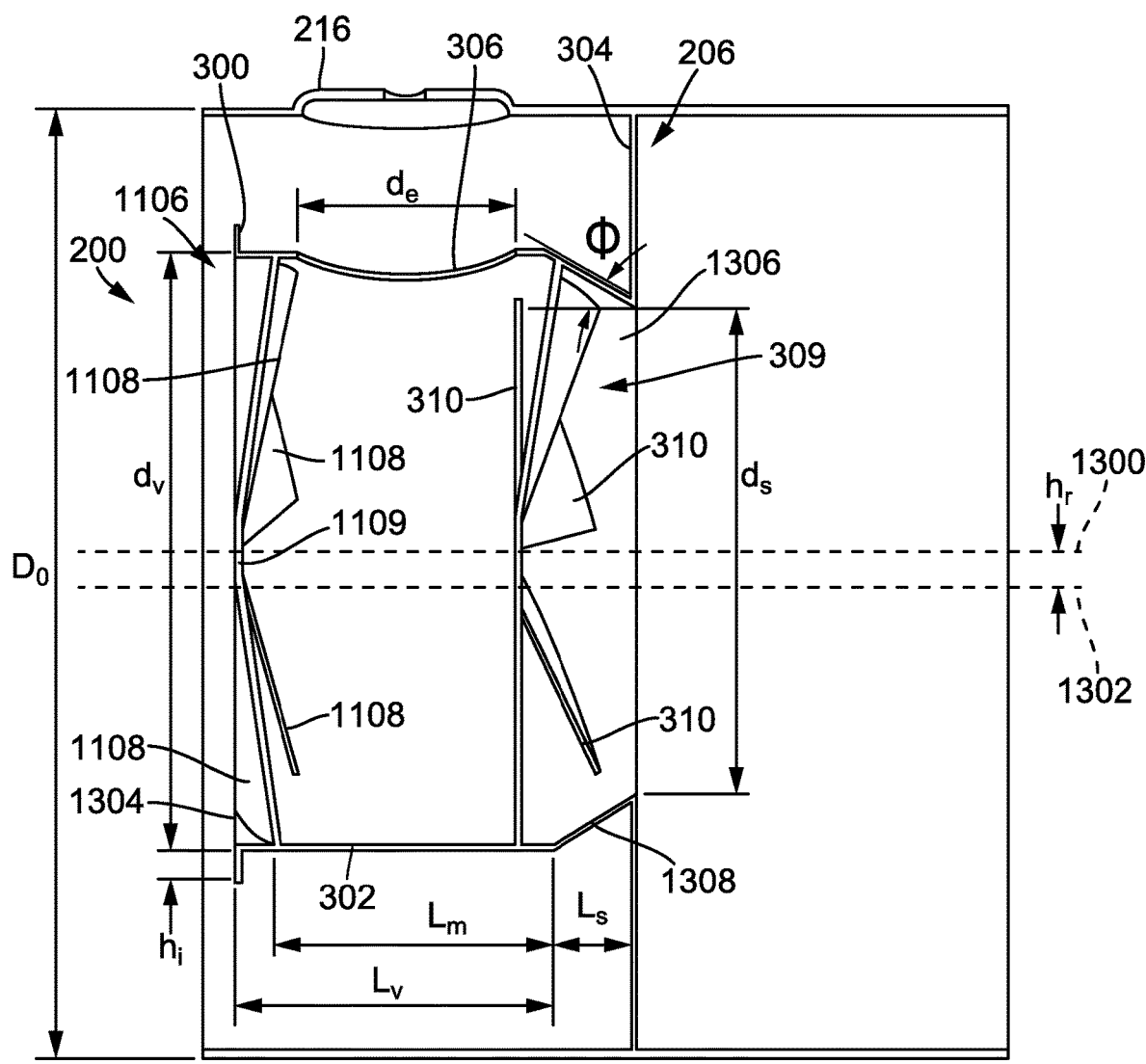
FIG. 13 is a cross-sectional view of yet another multi-stage mixer.

FIG. 13 illustrates a cross-sectional view of the multi-stage mixer 200 having the first flow device 206 and the auxiliary mixer 1106. While not shown in FIG. 13, it is understood that the multi-stage mixer 200 may include the exhaust gas guide 307. The auxiliary mixer 1106 is located upstream of the exhaust gas guide aperture 306 and the first flow device 206 is located downstream of the exhaust gas guide aperture 306. The auxiliary mixer 1106 functions to create a swirl flow of the exhaust gases within the first flow device 206 downstream the auxiliary mixer 1106. The swirl flow created by the auxiliary mixer 1106 facilitates distribution of the reductant in the exhaust gases between the auxiliary mixer 1106 and the main vanes 310 such that the reductant is substantially evenly distributed within the exhaust gases when the exhaust gases encounter the main vanes 310. Additionally, the swirl flow created by the auxiliary mixer 1106 creates a relatively large shear at the Venturi body 302 (e.g., the portion of the Venturi body 302 between the auxiliary vanes 1108 and the main vanes 310, etc.) to reduce the formation of a film, and therefore the accumulation of deposits, along the Venturi body 302. The main vanes 310 function to impart a swirl flow on the exhaust gases and entrained reductant downstream of the first flow device 206. This swirl flow causes the exhaust gases to be relatively uniform (e.g., in terms of reductant composition, etc.) downstream of the first flow device 206, such as at the multi-stage mixer outlet 204 (e.g., proximate an inlet of the SCR catalyst 106, etc.).

The Venturi body 302 is defined by a body center axis 1300. The Venturi body 302 is centered on (e.g., a centroid of the Venturi body 302 is coincident with, etc.) the body center axis 1300. The auxiliary vanes 1108 and the main vanes 310 are also centered on the body center axis 1300. The first support flange 304 is defined by a mixer center axis 1302. In addition to the benefits of the auxiliary vanes 1108 and the main vanes 310 in mixing the reductant in the exhaust gases, the first support flange 304 is configured, such that the body center axis 1300 is offset from the mixer center axis 1302 by a radial offset $h_r$. The radial offset $h_r$ causes any reductant build up on the Venturi body 302 (e.g., non-uniform distribution of the reductant in the exhaust gases within the first flow device 206, etc.) to be substantially redistributed to the exhaust gases downstream of the first flow device 206. While the body center axis 1300 is offset from the mixer center axis 1302 towards the port 216 by the radial offset $h_r$, in FIG. 13, it is understood that the body center axis 1300 may be offset from the mixer center axis 1302 away from the port 216 by the radial offset $h_r$, or offset from the mixer center axis 1302 towards the Venturi body 302 (e.g., orthogonally to the port 216, etc.) by the radial offset $h_r$.

The Venturi body 302 has a body inlet 1304 and a body outlet 1306. The inlet has a diameter $d_v$ and the outlet has a diameter $d_s$ which is less than the diameter $d_v$. The diameter $d_v$ and the diameter $d_s$ are each less than the diameter $D_0$ of the multi-stage mixer 200. In various embodiments, the multi-stage mixer 200 and the first flow device 206 are configured such that $$0.4 D_0 \leq d_v \leq 0.9 D_0 \quad (9)$$

$$0.7 d_v \leq d_s \leq d_v \quad (10)$$

$$0 \leq h_r \leq 0.1 D_0 \quad (11)$$

In various embodiments, the first support flange 304 does not protrude into the Venturi body 302 (e.g., the first support flange 304 defines an aperture contiguous with the Venturi body 302 and having a diameter equal to the diameter $d_s$, etc.).

In various embodiments, the funneling edge 300 radially protrudes from the body inlet 1304 towards the multi-stage mixer 200 a distance $h_f$. In various embodiments, the first flow device 206 is configured such that $$0 \leq h_f \leq 0.1 d_v \quad (12)$$

By varying the distance $h_f$, the flows of the exhaust gas into the first flow device 206 and/or the exhaust gas guide aperture 306 may be optimized.

The reductant flows from the port 216 through the exhaust gas guide aperture 306. The exhaust gas guide aperture 306 is generally circular and defined by a diameter $d_e$. In various embodiments, the first flow device 206 is configured such that $$d_e = (D_0 - d_v - 2h_r) * \tan\left(\frac{\alpha + \delta}{2}\right) \quad (13)$$

where $$5° \leq \delta \leq 20° \quad (14)$$

where $\delta$ is a margin that is selected based on the configuration of the first flow device 206 and where $\alpha$ is a spray angle of the nozzle 1000. In some embodiments the exhaust gas guide aperture 306 is elliptical. In these embodiments, the diameter $d_e$ may be a major axis (e.g., as opposed to a minor axis, etc.) of the exhaust gas guide aperture 306.

The first flow device 206 is also defined by a spacing $L_m$ between a trailing edge of the auxiliary vanes 1108 and a trailing edge of the main vanes 310. In various embodiments, the first flow device 206 is configured such that $$d_e \leq L_m \leq \frac{d_e(D + d_v - 2h_r)}{(D - d_v - 2h_r)} \quad (15)$$

The Venturi body 302 includes a shroud 1308. It is understood that the shroud 1308 as shown and described with reference to FIG. 13 may be included in any of the embodiments of the multi-stage mixer 200 discussed herein.

The shroud 1308 defines a downstream end of the Venturi body 302 and is therefore defined by the diameter $d_s$. In various embodiments, the shroud 1308 is cylindrical or conical (e.g., frustoconical, etc.) in shape. The shroud 1308 may facilitate a reduction in stratification of the exhaust gases that occurs from centrifugal force created by the main mixer 309. Additionally, the shroud 1308 may provide structural support to the main mixer 309, such as when the main vanes 310, in addition to the main vane central hub 313, are attached to the shroud 1308 (e.g., such that the main vanes 310 conform to the shroud 1308, etc.). When the main vanes 310 are attached to the shroud 1308, the main vanes 310 may provide a more directed swirl flow (e.g., along a target trajectory, etc.) by removing leak paths, thereby improving mixing performance (e.g., the ability of the main mixer 309 to mix the reductant and exhaust gases, etc.) and reducing the accumulation of deposits downstream of the main mixer 309 (e.g., in the shroud 1308, in the exhaust component downstream of the multi-stage mixer 200, etc.). Furthermore, the shroud 1308 substantially prevents leakage flow and liquid film accumulation and mitigates the formation of deposits within the first flow device 206 (e.g., on the Venturi body 302, etc.) and/or the multi-stage mixer 200. The shroud 1308 is defined by an angle (relative to an axis parallel to the body center axis 1300 and the mixer center axis 1302. In various embodiments, the first flow device 206 is configured such that $$\Phi \leq 50° \quad (16)$$

In various embodiments, the first flow device 206 is configured such that $$L_s = \frac{d_v - d_s}{2*\tan\Phi} \quad (17)$$

where $L_s$ is the length of the shroud 1308. Where the shroud 1308 is cylindrical, the diameter $d_s$ is equal to the diameter $d_v$ and $$0.02d_v \leq L_s \leq 0.25d_v \quad (18)$$

In some embodiments, at least one of the flow devices of the multi-stage mixer 200 is angled relative to the mixer center axis 1302. For example, the first flow device 206 may be configured such that the body center axis 1300 is tilted up from (e.g., angled at a positive angle relative to, etc.) the mixer center axis 1302 or such that the body center axis 1300 is tilted down from (e.g., angled at a negative angle relative to, etc.) the mixer center axis 1302.

Figure 14:
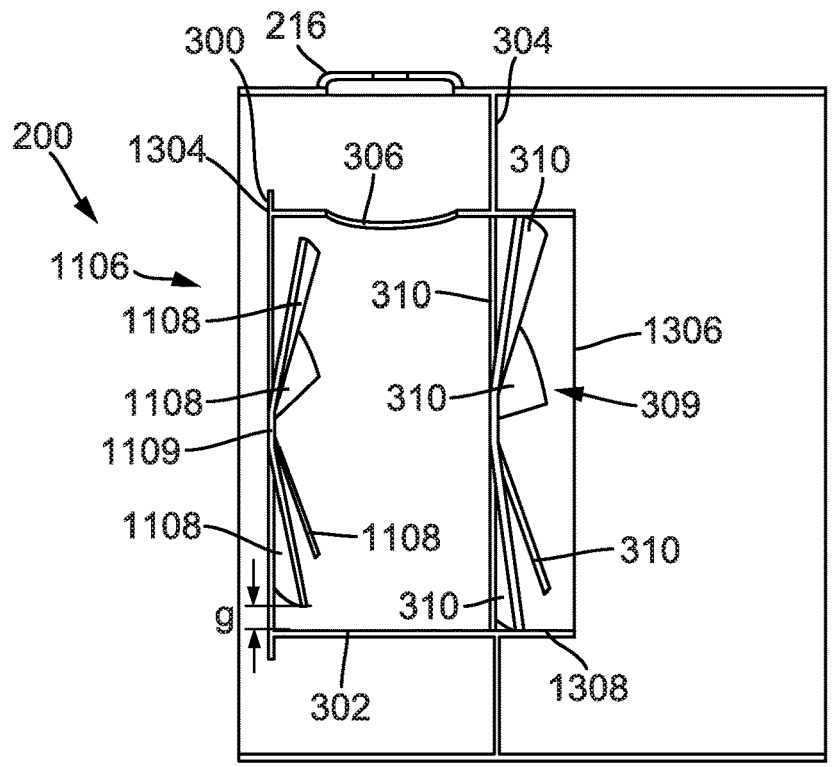
FIG. 14 is a cross-sectional view of yet another multi-stage mixer.

FIG. 14 illustrates a variation of the first flow device 206 shown in FIG. 13. In FIG. 14, the auxiliary vanes 1108 are shown spaced from the Venturi body 302 by a gap g. In various embodiments, the first flow device 206 is configured such that $$0 \leq g \leq 0.15d_v \quad (19)$$

The gap g may mitigate accumulation of reductant deposits on the Venturi body 302. The gap g functions to create a substantially axial flow of exhaust gases directed along the Venturi body 302 (e.g., on the inner surfaces of the Venturi body 302, etc.). In this way, the gap g may balance flow (e.g., a main tangential flow, etc.) of the exhaust gases through the auxiliary vanes 1108 with the aforementioned axial flow and a flow of the exhaust gases around the first flow device 206. Instead of, or in addition to, the gap g, the auxiliary vanes 1108 may include slots (e.g., thin slots) or holes through which the exhaust gases may flow. For example, each of the auxiliary vanes 1108 may include a slot contiguous with an outermost edge of the auxiliary vane 1108. In this example, the exhaust gases may flow through the slot and against the Venturi body 302 proximate the slot, thereby providing benefits similar to those of the gap g.

Also shown in FIG. 14, the main vanes 310 are shown in contact with the shroud 1308 such that no gap exists between at least a portion of each of the main vanes 310 and the shroud 1308. In an example embodiment, the tip (e.g., the most radially outward surface, etc.) of each of the main vanes 310 is welded (e.g., fused, etc.) to the shroud 1308.

In some embodiments, the main vanes 310 may be spaced from the shroud 1308 by a gap $g_v$. In various embodiments, the first flow device 206 is configured such that $$0 \leq g_v \leq 0.15d_v \quad (20)$$

The gap $g_v$ may mitigate accumulation of reductant droplets on the shroud 1308. The gap $g_v$ functions to create a substantially axial flow of exhaust gases directed along the shroud 1308 (e.g., on inner surfaces of the shroud 1308, etc.). Instead of, or in addition to, the gap $g_v$, the main vanes 310 may include slots (e.g., thin slots) or holes through which the exhaust gases may flow. For example, each of the main vanes 310 may include a slot contiguous with an outermost edge of the main vane 310. In this example, the exhaust gases may flow through the slot and against the shroud 1308 proximate the slot, thereby providing benefits similar to those of the gap g.

In an some embodiments, the tip of each of the auxiliary vanes 1108 is attached (e.g., welded, coupled, etc.) to the Venturi body 302 (e.g., such that the auxiliary vanes 1108 conform to the Venturi body 302, etc.). When the auxiliary vanes 1108 are attached to the Venturi body 302, the auxiliary vanes 1108 may provide a more directed swirl flow (e.g., along a target trajectory, etc.) by removing leak paths, thereby improving mixing performance (e.g., the ability of the auxiliary mixer 1106 to mix the reductant and exhaust gases, etc.) and reducing the accumulation of deposits downstream of the auxiliary mixer 1106 (e.g., in the Venturi body 302, on the main mixer 309, in the exhaust component downstream of the multi-stage mixer 200, etc.). In FIG. 13, the auxiliary vanes 1108 are shown in contact with the Venturi body 302 such that no gap exists between at least a portion of each of the auxiliary vanes 1108 and the Venturi body 302.

Each of the auxiliary vanes 1108 is defined by an auxiliary vane angle relative to an auxiliary vane central hub center axis of the auxiliary vane central hub 1109 of the auxiliary vanes 1108. Similarly, the main vane angle for each of the main vanes 310 is defined relative to a main vane central hub center axis of the main vane central hub 313. The auxiliary vane angle for each of the auxiliary vanes 1108 may be different from the auxiliary vane angle for any of the others of the auxiliary vanes 1108. In various embodiments, the auxiliary vane angle for each of the auxiliary vanes 1108 is between forty five degrees and ninety degrees, inclusive, relative to a main vane central hub center axis of the main vane central hub 313 and the main vane angle for each of the main vanes 310 is between forty five degrees and ninety degrees, inclusive. The auxiliary vane angle for each of the auxiliary vanes 1108 may be selected such that the first flow device 206 is tailored for a target application. Similarly, the main vane angle for each of the main vanes 310 may be selected such that the first flow device 206 is tailored for a target application. The auxiliary mixer 1106 may be configured such that the auxiliary vanes 1108 are symmetrically or asymmetrically disposed about the auxiliary vane central hub 1109.

The auxiliary vane angle may be different for each of the auxiliary vanes 1108 and the main vane angle may be different from each of the main vanes 310. Selection of the auxiliary vane angle for each of the auxiliary vanes 1108 and the main vane angle for each of the main vanes 310 may be made so as to create asymmetric swirl of the exhaust gases, to direct flow of the exhaust gases (e.g., towards a target location in the multi-stage mixer 200, etc.), to more uniformly distribute reductant within the exhaust gases, and to reduce deposits within the first flow device 206 (e.g., on the Venturi body 302, etc.) and/or the multi-stage mixer 200.

Figure 15:
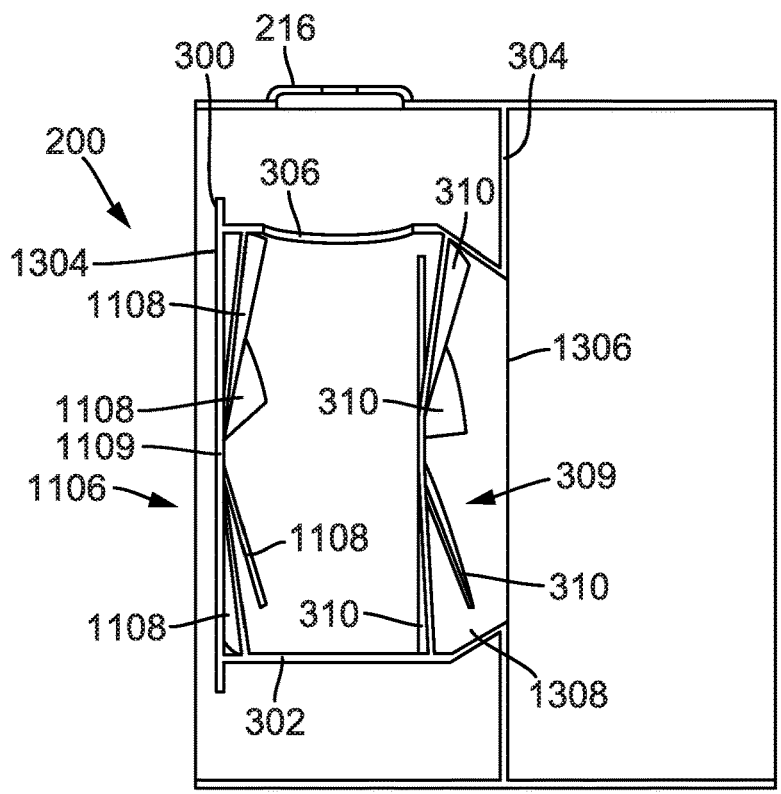
FIG. 15 is a cross-sectional view of yet another multi-stage mixer.
Figure 16:
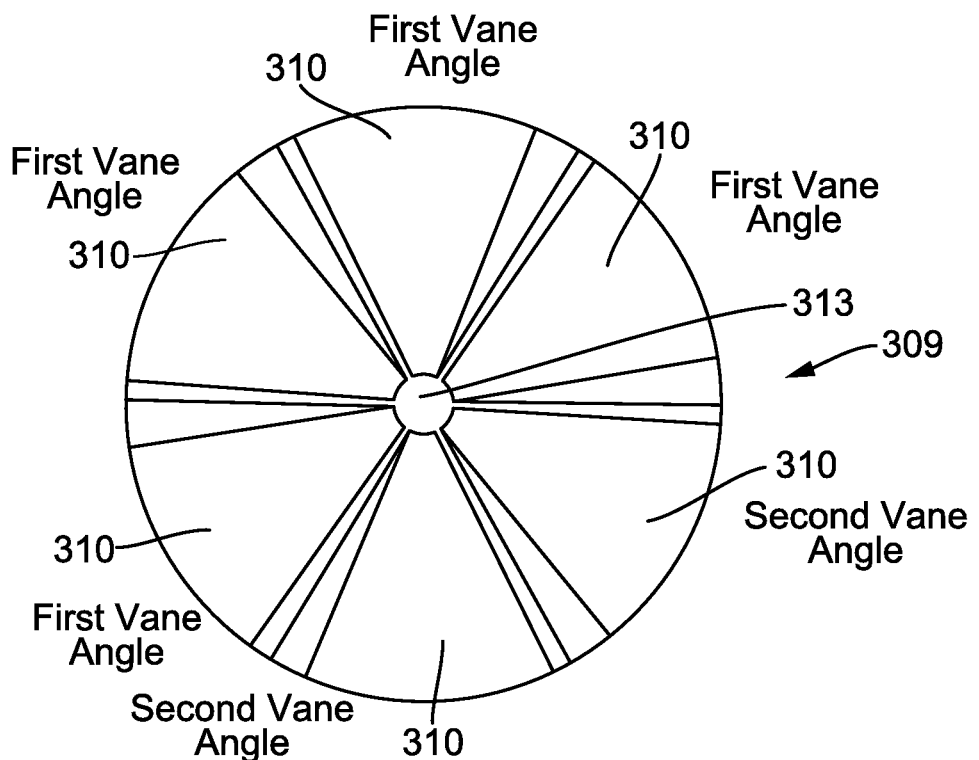
FIG. 16 is front view of a mixer for a multi-stage mixer.

FIG. 15 illustrates the first flow device 206 with a main mixer 309 having six of the main vanes 310, where four of the main vanes 310 each have a first vane angle and two of the main vanes 310 have a second vane angle that is larger than the first vane angle. FIG. 16 illustrates the main vanes 310 of the first flow device 206 shown in FIG. 15.

Figure 17:
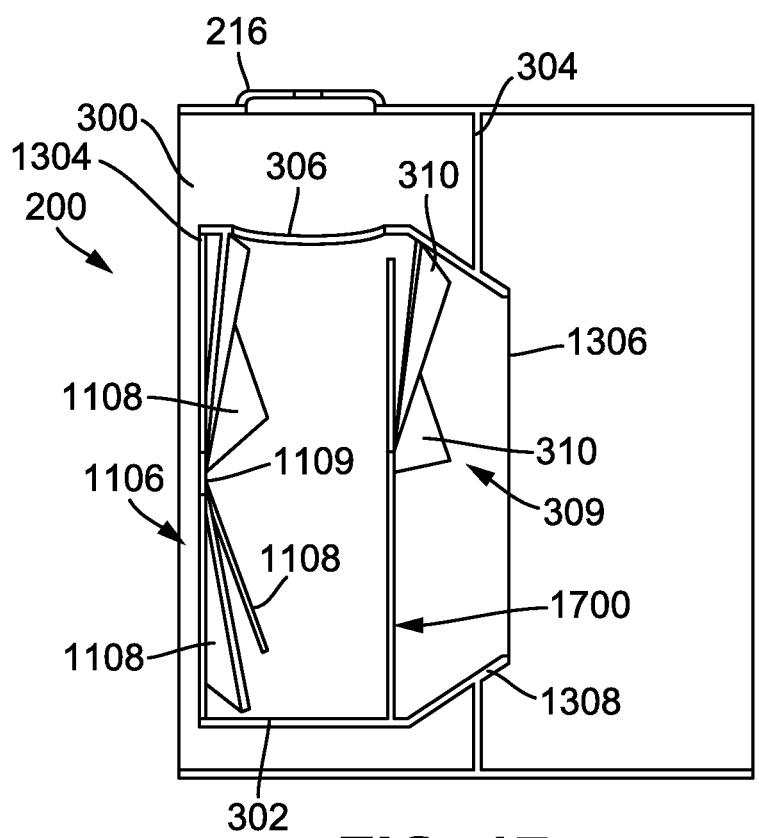
FIG. 17 is a cross-sectional view of yet another multi-stage mixer.

FIG. 17 illustrates the first flow device 206 with a main mixer 309 having six of the main vanes 310, where four of the main vanes 310 each have a first vane angle that is not equal to forty five degrees such that the four main vanes 310 are open and two of the main vanes 310 have a second vane angle that is equal to ninety degrees such that the two main vanes 310 are closed, thereby forming a combined main vane 1700 which includes three of the main vanes 310. Rather than referring to the main vanes 310 as having forty five degree vane angles, the main mixer 309 may simply be referred to as having three main vanes 310 and one combined main vane 1700.

Figure 18A:
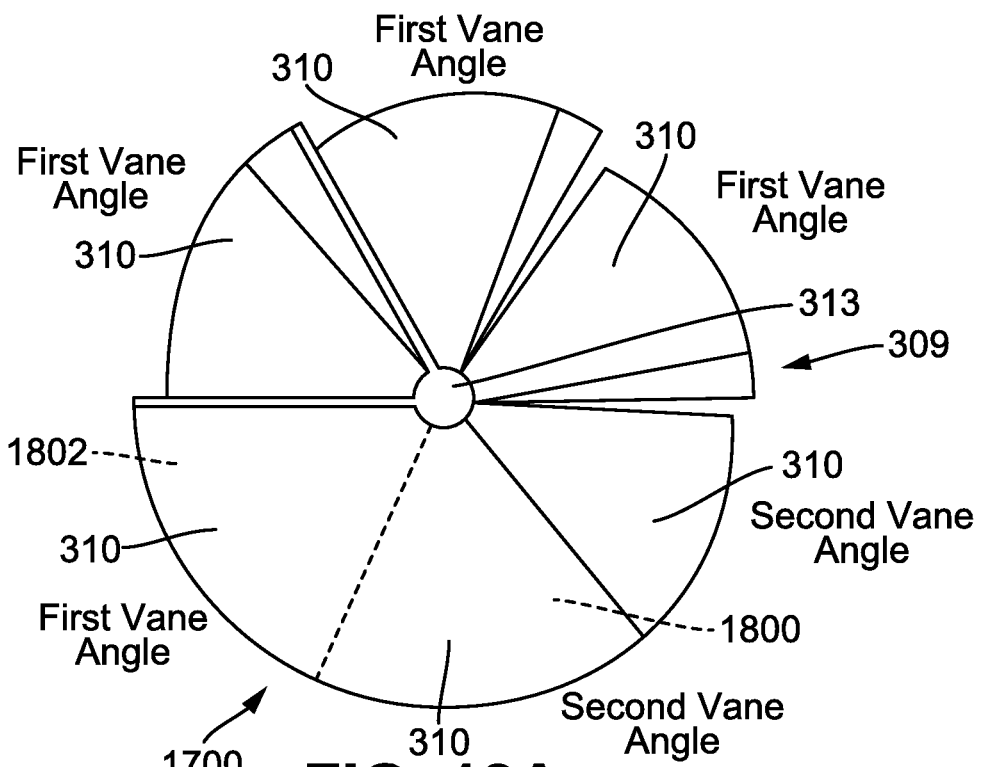
FIG. 18A is a front view of another mixer for a multi-stage mixer.

FIG. 18A illustrates the combined main vane 1700 in one embodiment. The combined main vane 1700 may be formed in a variety of manners. In various embodiments, the combined main vane 1700 is formed from a large main vane 310 which is folded flat (e.g., to ninety degrees, etc.). In these embodiments, the large main vane 310 may be twice the size of the other main vanes 310. In other embodiments, the combined main vane 1700 is formed from a first adjacent main vane 1800 and a second adjacent main vane 1802. In these embodiments, the first adjacent main vane 1800 and the second adjacent main vane 1802 are each folded flat and then the first adjacent main vane 1800 and the second adjacent main vane 1802 are either joined directly (e.g., adjacent edges of each of the first adjacent main vane 1800 and the second adjacent main vane 1802 are attached together, etc.) or indirectly (e.g., a spanning member is attached to each of the first adjacent main vane 1800 and the second adjacent main vane 1802, etc.).

Figure 18B:
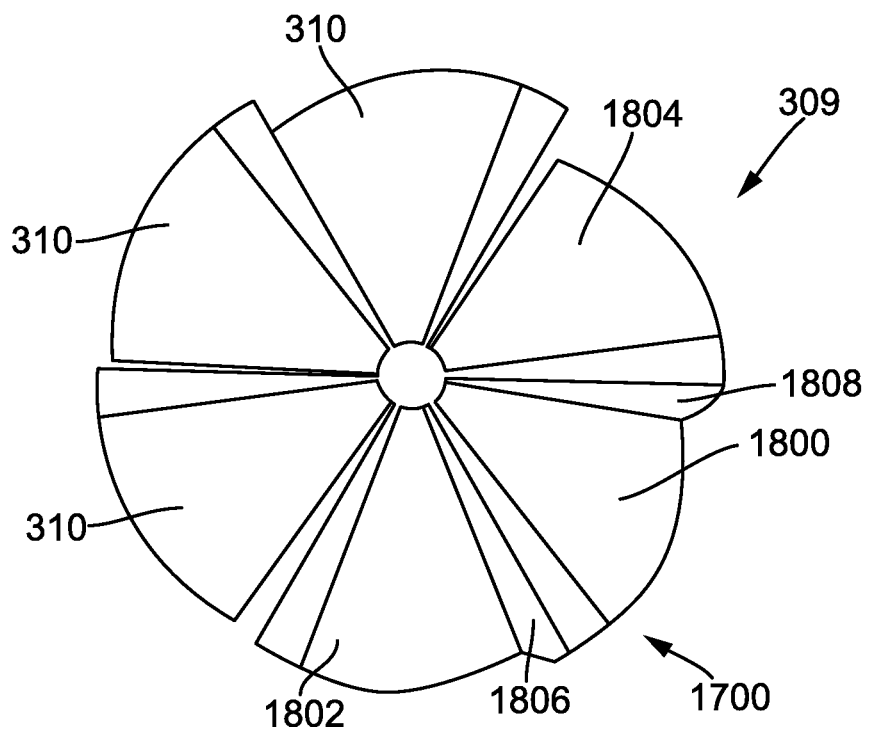
FIG. 18B is a front view of another mixer for a multi-stage mixer.
Figure 18C:
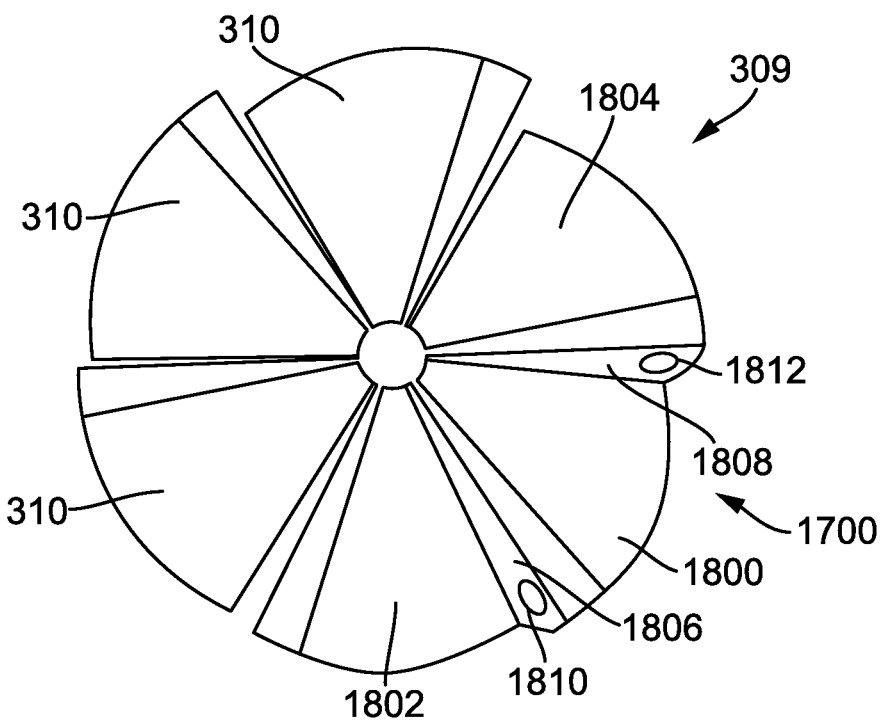
FIG. 18C is a front view of another mixer for a multi-stage mixer.

FIGS. 18B and 18C illustrate the combined main vane 1700 as being formed from the first adjacent main vane 1800, the second adjacent main vane 1802, and a third adjacent main vane 1804. In these embodiments, the first adjacent main vane 1800, the second adjacent main vane 1802, and the third adjacent main vane 1804 do not need to be bent flat and may have vane angles.

In FIG. 18B, the first adjacent main vane 1800 is coupled to a first spanning member 1806 which is coupled to the second adjacent main vane 1802. The first spanning member 1806 may be attached to the first adjacent main vane 1800 so as to be closed and prevent the passage of exhaust gases therebetween. Similarly, the first spanning member 1806 may be attached to the second adjacent main vane 1802 so as to be closed and prevent the passage of exhaust gases therebetween. The first adjacent main vane 1800 is also coupled to a second spanning member 1808 which is coupled to the third adjacent main vane 1804. The second spanning member 1808 may be attached to the first adjacent main vane 1800 so as to be closed and prevent the passage of exhaust gases therebetween. Similarly, the second spanning member 1808 may be attached to the third adjacent main vane 1804 so as to be closed and prevent the passage of exhaust gases therebetween.

In FIG. 18C, a first hole 1810 is incorporated into the first spanning member 1806 and a second hole 1812 is incorporated into the second spanning member 1808. The first hole 1810 and the second hole 1812 are configured to facilitate the passage of exhaust gases therethrough. In this way, the first hole 1810 and the second hole 1812 may mitigate the formation of a relatively high pressure area upstream of the main mixer 309. It is understood that the combined main vane 1700 as shown and described with reference to FIGS. 17-18C may be included in any of the embodiments of the multi-stage mixer 200 discussed herein.

Figure 19:
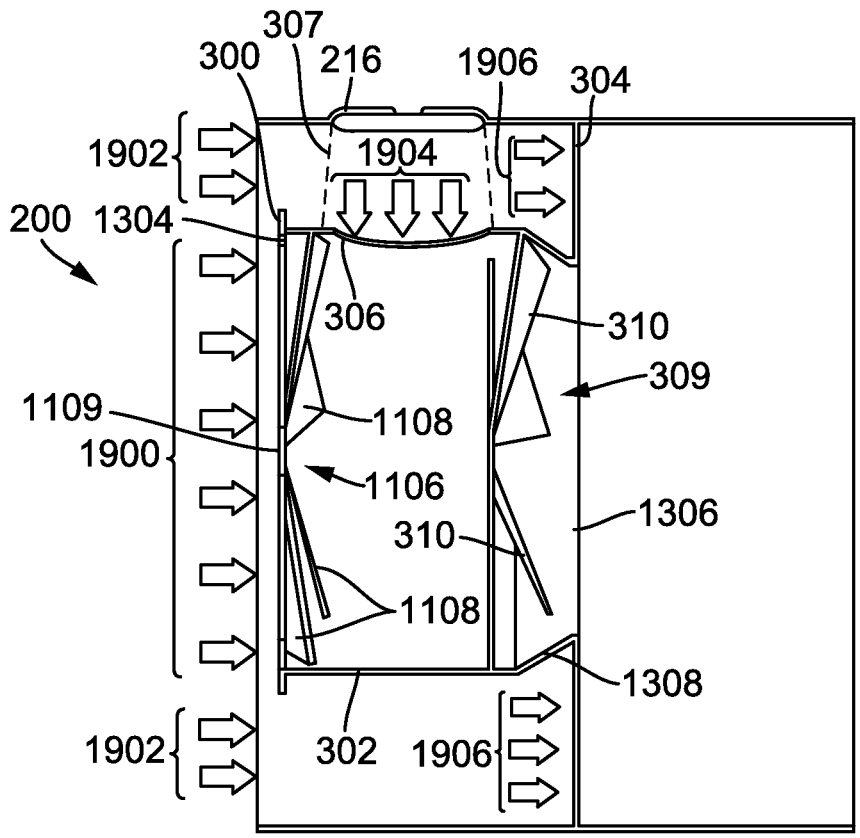
FIG. 19 is a cross-sectional view of yet another multi-stage mixer.

FIG. 19 illustrates the flow of exhaust gases within the multi-stage mixer 200 and illustrates how the exhaust gases behave when encountering the first flow device 206. The exhaust gases upstream of the first flow device 206 are divided into a main flow 1900 (e.g., Venturi flow, swirl flow, etc.) and a circumvented flow 1902 (e.g., exhaust assist flow, etc.). The main flow 1900 is provided into the first flow device 206 (e.g., the main flow 1900 is funneled into the Venturi body 302 by the funneling edge 300, etc.).

In some embodiments, the circumvented flow 1902 is 5-40%, inclusive, of the sum of the circumvented flow 1902 and the main flow 1900 (e.g., the total flow, etc.). In these embodiments, the main flow 1900 is 60-95%, inclusive, of the sum of the circumvented flow 1902 and the main flow 1900 (e.g., the total flow, etc.). Accordingly, where the multi-stage mixer 200 includes six auxiliary vanes 1108, each gap between adjacent auxiliary vanes 1108 receives 6-16%, inclusive, of the sum of the circumvented flow 1902 and the main flow 1900 (e.g., the total flow, etc.). Similarly, where the multi-stage mixer 200 does not include the auxiliary mixer 1106 and includes six main vanes 310, each gap between adjacent main vanes 310 receives 6-16%, inclusive, of the sum of the circumvented flow 1902 and the main flow 1900 (e.g., the total flow, etc.).

The main flow 1900 and the circumvented flow 1902 define a flow split. The flow split is a ratio of the circumvented flow 1902 to the main flow 1900, represented as a percentage of the main flow 1900. The flow split is a function of the diameter $d_v$, the diameter $d_e$, and the distance $h_i$. By varying the flow split, an optimization of target mixing performance (e.g., based on a computational fluid dynamics analysis, etc.) of the first flow device 206, target deposit formation (e.g., a target amount of deposits formed over a target period of time, etc.), and target pressure drop (e.g., a comparison of the pressure of the exhaust gases upstream of the first flow device 206 and a pressure of the pressure of the exhaust gases downstream of the first flow device 206, etc.), can be performed such that the first flow device 206 can be tailored for a target application. In various embodiments, the flow split ratio is between five percent and seventy percent, inclusive. That is, the circumvented flow 1902 is between five percent and seventy percent, inclusive, of the main flow 1900.

The circumvented flow 1902 is not immediately provided to the first flow device 206 through the body inlet 1304. Instead, the circumvented flow 1902 flows around the funneling edge 300 into the space between the first flow device 206 and the body of the multi-stage mixer 200. The circumvented flow 1902 is divided into a diverted flow 1904 and an isolated flow 1906. The diverted flow 1904 is mixed with the reductant provided to the first flow device 206 through the port 216. For example, if the first flow device 206 includes the exhaust gas guide 307, then a portion of the circumvented flow 1902 enters the exhaust gas guide 307 and flows from the exhaust gas guide 307 into the Venturi body 302 as the diverted flow 1904. The diverted flow 1904 enters the first flow device 206 through the exhaust gas guide aperture 306. In embodiments where the first flow device 206 does not include the exhaust gas guide 307, the circumvented flow 1902 may enter the Venturi body 302 as the diverted flow 1904 directly through the exhaust gas guide aperture 306.

The isolated flow 1906 does not enter the first flow device 206 immediately and instead encounters the first support flange 304. In various embodiments, the first support flange 304 is sealed against the multi-stage mixer 200 and the Venturi body 302, and does not permit the passage of the isolated flow 1906 through or around the first support flange 304. In these embodiments, the isolated flow 1906 flows back towards the body inlet 1304. As the isolated flow 1906 flows back towards the body inlet 1304, a portion of the isolated flow 1906 may enter the exhaust gas guide 307 and flow into the Venturi body 302 as the diverted flow 1904. Other portions of the isolated flow 1906 may flow past the exhaust gas guide 307 and enter the Venturi body 302 through the body inlet 1304 as the main flow 1900. In other embodiments, the first support flange 304 includes at least one aperture permitting the passage of the exhaust gases therethrough, thereby allowing at least a portion of the isolated flow 1906 to bypass the body entirely. This portion of the isolated flow 1906 would mix with the main flow 1900 downstream of the body outlet 1306 (e.g., after the main flow 1900 has combined with the diverted flow 1904 and the reductant within the Venturi body 302, etc.).

According to the embodiment shown in FIG. 19, the main flow 1900 is passed through the auxiliary vanes 1108, mixed with reductant and the diverted flow 1904, and then passed through the main vanes 310, through the shroud 1308, and out of the body outlet 1306.

Figure 20:
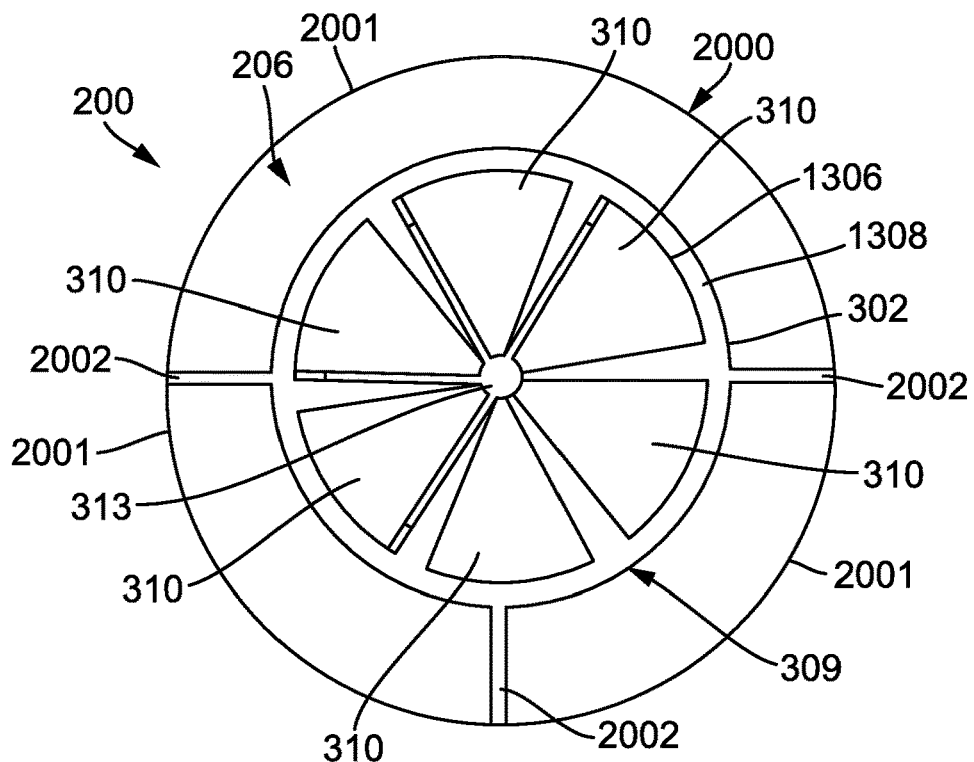
FIG. 20 is a view of a downstream face of a multi-stage mixer.

As shown in FIG. 20, which illustrates a view of an upstream face of the first flow device 206, the first flow device 206 includes a second support flange 2000 (e.g., upstream support flange, etc.). It is understood that the second support flange 2000 as shown and described with reference to FIG. 20 may be included in any of the embodiments of the multi-stage mixer 200 discussed herein.

The second support flange 2000 is coupled to the first flow device 206 and to the multi-stage mixer 200. The second support flange 2000 is disposed upstream of the first support flange 304. In various embodiments, the second support flange 200 is disposed upstream of the exhaust gas guide 307. The second support flange 2000 facilitates passage of the exhaust gases through the second support flange 2000. In FIG. 20, the first support flange 304 is hidden to facilitate viewing of the second support flange 2000.

The second support flange 2000 includes a plurality of second support flange apertures 2001 (e.g., holes, passages, pathways, etc.). The circumvented flow 1902 traverses the second support flange 2000 through the second support flange apertures 2001. Additionally, the isolated flow 1906 may, after being redirected upstream by the first support flange 304, traverse the second support flange 2000 through the second support flange apertures 2001, and enter the Venturi body 302 through the body inlet 1304. In various embodiments, the second support flange 2000 may include one, two, three, four, five, six, or more second support flange apertures 2001.

Each of the second support flange apertures 2001 is separated from an adjacent one of the second support flange apertures 2001 by a second support flange connector 2002 (e.g., arm, rod, etc.). The second support flange connector 2002 is integrated with the second support flange 2000 and is coupled to the multi-stage mixer 200 and to the first flow device 206. In one example, the second support flange connector 2002 is coupled to the Venturi body 302 while the first support flange 304 is coupled to the shroud 1308. In some embodiments, the second support flange 2000 is coupled to the funneling edge 300 (e.g., the funneling edge 300 is a part of the second support flange 2000, etc.).

The second support flange 2000 does not protrude into the body inlet 1304 (e.g., the second support flange 2000 defines an aperture contiguous with the Venturi body 302 and having a diameter equal to the diameter $d_v$, etc.). In various embodiments, the second support flange 2000 includes one, two, three, four, five, six, or more second support flange connectors 2002. In some embodiments, the number of second support flange apertures 2001 is equal to the number of second support flange connectors 2002.

Figure 21:
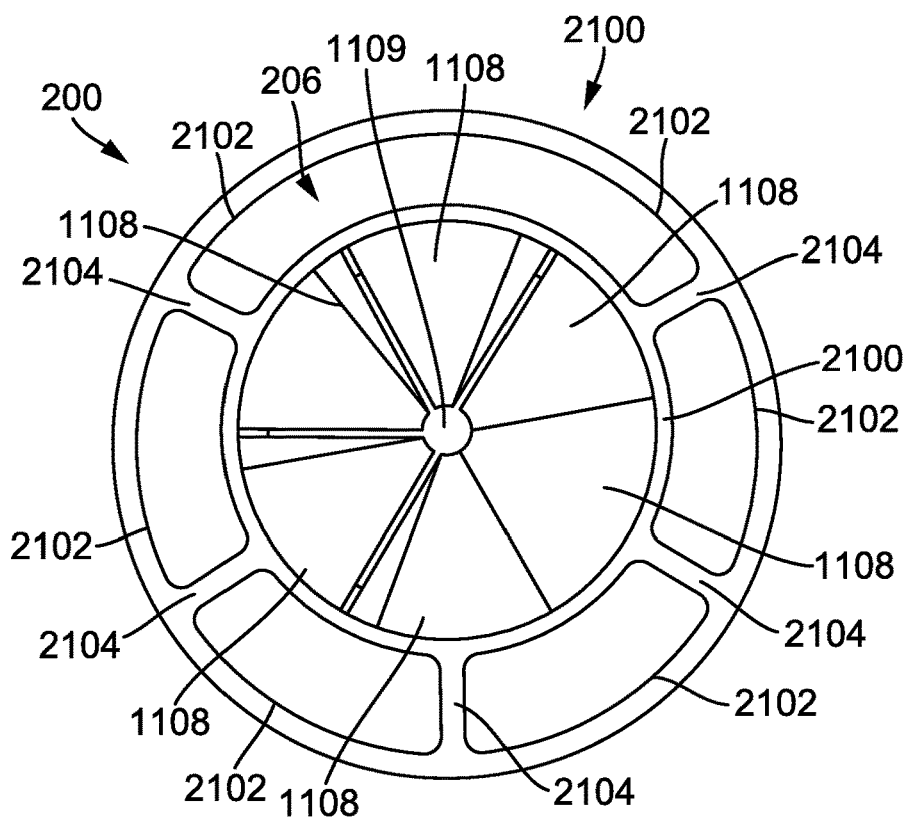
FIG. 21 is a view of an upstream face of a multi-stage mixer.

FIG. 21 illustrates a third support flange 2100 (e.g., upstream support flange, etc.) according to an example embodiment. It is understood that the third support flange 2100 as shown and described with reference to FIG. 21 may be included in any of the embodiments of the multi-stage mixer 200 discussed herein.

The third support flange 2100 functions as the second support flange 2000 already described. In various embodiments, the first flow device 206 includes the third support flange 2100 or the second support flange 2000. In some embodiments, the first flow device 206 includes both the second support flange 2000 and the third support flange 2100.

The third support flange 2100 may be coupled to the Venturi body 302 upstream of the exhaust gas guide aperture 306, as shown in FIG. 21, which illustrates a view of an upstream face of the first flow device 206. The third support flange 2100 may also be coupled to the Venturi body 302 downstream of the exhaust gas guide aperture 306 but upstream of the first support flange 304. The third support flange 2100 may also be coupled to the Venturi body 302 upstream of the exhaust gas guide aperture 306. In some embodiments, the third support flange 2100 is contiguous with the funneling edge 300 (e.g., the funneling edge 300 is a part of the third support flange 2100, etc.).

The third support flange 2100 includes a plurality of third support flange apertures 2102 (e.g., holes, passages, pathways, etc.). The circumvented flow 1902 traverses the third support flange 2100 through the third support flange apertures 2102. In various embodiments, the third support flange 2100 may include one, two, three, four, five, six, or more third support flange apertures 2102.

Each of the third support flange apertures 2102 is separated from an adjacent one of the third support flange apertures 2102 by a third support flange connector 2104 (e.g., arm, rod, etc.). The third support flange connector 2104 is integrated with the third support flange 2100 and is coupled to the multi-stage mixer 200 and to the first flow device 206. In one example, the third support flange connector 2104 is coupled to the Venturi body 302 while the first support flange 304 is coupled to the shroud 1308. In some embodiments, the third support flange 2100 is coupled to the funneling edge 300 (e.g., the funneling edge 300 is a part of the third support flange 2100, etc.).

The third support flange 2100 does not protrude into the body inlet 1304 (e.g., the third support flange 2100 defines an aperture contiguous with the Venturi body 302 and having a diameter equal to the diameter $d_v$, etc.). In various embodiments, the third support flange 2100 includes one, two, three, four, five, six, or more third support flange connectors 2104. In some embodiments, the number of third support flange apertures 2102 is equal to the number of third support flange connectors 2104.

Figure 22A:
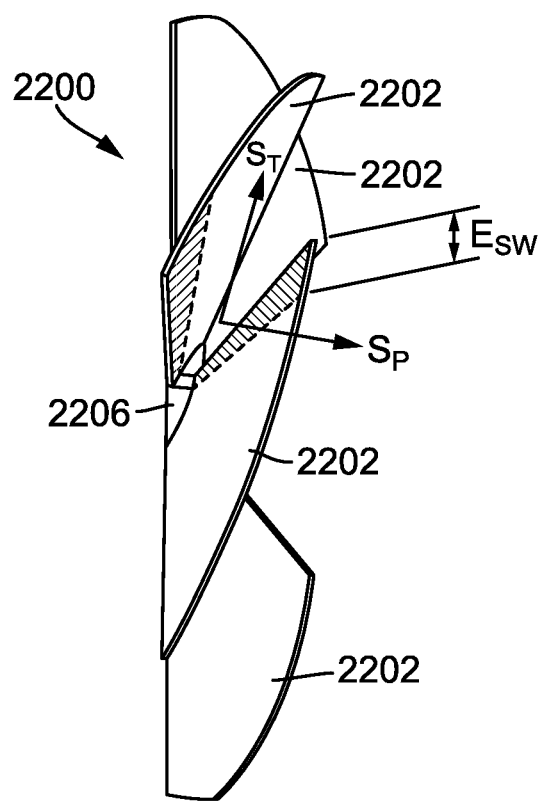
FIG. 22A is side view of yet another mixer for a multi-stage mixer.
Figure 22B:
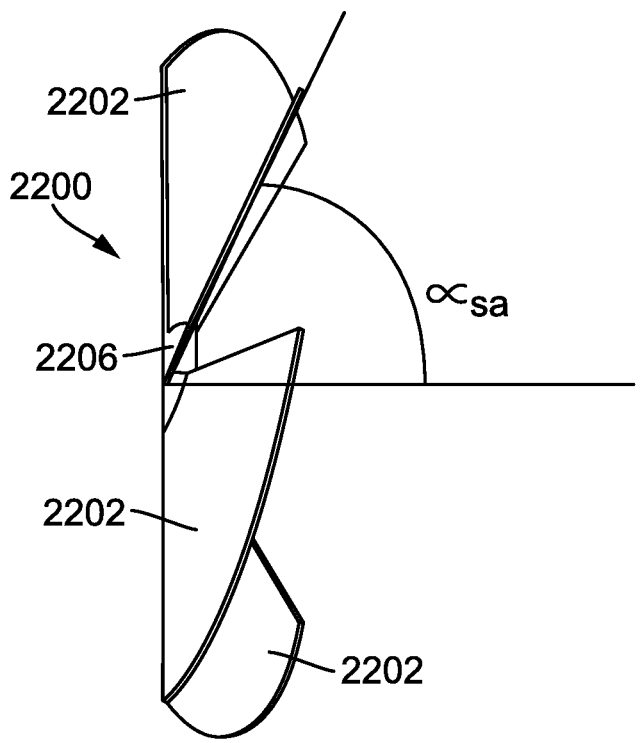
FIG. 22B is another side view the mixer shown in FIG. 22A.

FIGS. 22A and 22B illustrate a conduit straight vane mixer 2200 according to an example embodiment. It is understood that the conduit straight vane mixer 2200 as shown and described with reference to FIGS. 22A and 22B may be included in any of the embodiments of the multi-stage mixer 200 discussed herein.

The conduit straight vane mixer 2200 includes a plurality of conduit straight vanes 2202 each coupled to and conforming with a conduit straight vane central hub 2206. Rather than forming apertures between any of the conduit straight vanes 2202, as are formed between adjacent main vanes 310, any of the conduit straight vanes 2202 and any combined conduit straight vanes form conduits therebetween. As explained herein, a conduit is a closed pathway with a single inlet and a single outlet (e.g., is bounded on four out of six sides, etc.).

While not shown, tips (e.g., outermost edges, etc.) of each of the conduit straight vanes 2202 is coupled to and conforms with the shroud 1308 or Venturi body 302. The trailing edge of one of the conduit straight vanes 2202 or combined conduit straight vanes extends beyond the leading edge of an adjacent one of the conduit straight vanes 2202 or combined conduit straight vanes in a streamwise direction $S_t$ and thereby confines a flow of exhaust gases in a spanwise direction $S_p$. The streamwise direction $S_t$ is tangential to a tip of the leading edge while the spanwise $S_p$ is normal to (e.g., orthogonal to, etc.) the streamwise direction $S_t$. This spanwise confinement combined with the conforming coupling of the conduit straight vanes 2202 to the conduit straight vane central hub 2206 and to the shroud 1308 (both of which confine flow in wall normal directions) create a conduit for each of the conduit straight vanes 2202. Each conduit has four sides: a first defined by one conduit straight vane 2202 or combined conduit straight vane, a second defined by the conduit straight vane central hub 2206, a third defined by the shroud 1308 or Venturi body 302, and a fourth defined by another conduit straight vane 2202 or combined conduit straight vane. Each conduit efficiently directs the exhaust gases. In various embodiments, the conduit straight vane mixer 2200 is utilized in the first flow device 206 in place of the main mixer 309. In other embodiments, the conduit straight vanes 2202 are not coupled to the shroud 1308 and instead are coupled to and conform with the Venturi body 302. In these embodiments, the conduit straight vanes 2202 are instead coupled to and conform with the Venturi body 302. In such embodiments, the conduit straight vane mixer 2200 may be utilized in place of or in addition to the auxiliary mixer 1106.

In some embodiments, the conduit straight vane mixer 2200 includes two, three, four, five, six, seven, eight, or more conduit straight vanes 2202. Like the main vanes 310, each of the conduit straight vanes 2202 is defined by a blade angle. These blade angles may be varied such that a combined conduit straight vane (not shown) may be formed as described with regard to the combined main vane 1700 above. In some embodiments, the conduit straight vane mixer 2200 includes one, two, three or more of the combined conduit vanes. In other embodiments, the conduit straight vane mixer 2200 does not include the combined conduit vane. In an example embodiment, the conduit straight vane mixer 2200 includes three of the conduit straight vanes 2202 and one combined conduit straight vane.

The conduit straight vane central hub 2206 may be centered on, or offset from, the mixer center axis 1302. For example, the conduit straight vane central hub 2206 may be centered on the body center axis 1300, and therefore offset the radial offset $h_r$ from the mixer center axis 1302. The conduit straight vanes 2202 and/or the combined conduit straight vane may be arranged symmetrically or asymmetrically about the conduit straight vane central hub 2206.

Each of the conduit straight vanes 2202 and combined conduit straight vane extend over an adjacent conduit straight vane 2202 or combined conduit straight vane. This distance is shown in FIG. 22A as extension distance $E_{sw}$. The extension distance $E_{sw}$ is expressed as a percentage of the width in the streamwise direction $S_t$ of a single conduit straight vane 2202 at a given distance from the axis (e.g., the body center axis 1300, the mixer center axis 1302, etc.) upon which the conduit straight vane central hub 2206 is centered. In various embodiments, this extension distance $E_{sw}$ is between 0% and 75%, inclusive, of the width in the streamwise direction $S_t$ of a single conduit straight vane 2202 at a given distance from the axis upon which the conduit straight vane central hub 2206 is centered.

The conduit straight vane mixer 2200 provides relatively high swirl velocities even at lower blade angles for each of the conduit straight vanes 2202, thereby providing enhanced mixing of reductant with a lower pressure drop. Another benefit of the high swirl velocities provided by the conduit straight vanes 2202 and the combined conduit straight vane is that high swirl velocities mitigate accumulation of deposits downstream of the conduit straight vane mixer 2200 (e.g., along the Venturi body 302, along the shroud 1308, etc.).

Each of the conduit straight vanes 2202 and the combined conduit straight vane is defined by a streamwise angle $\alpha_{sa}$ relative to an axis upon which the conduit straight vane central hub 2206 is centered (e.g., the body center axis 1300, the mixer center axis 1302, etc.). In various embodiments, the streamwise angle $\alpha_{sa}$ is between thirty degrees and ninety degrees, inclusive. The streamwise angle $\alpha_{sa}$ for each of the conduit straight vanes 2202 and the combined conduit straight vanes may be selected such that the first flow device 206 is tailored for a target application.

The streamwise angle $\alpha_{sa}$ and the streamwise extension distance $E_{sw}$ may be different for each of the conduit straight vanes 2202 and/or the combined conduit straight vanes. Selection of streamwise angle $\alpha_{sa}$ and streamwise extension distance $E_{sw}$ for each of the conduit straight vanes 2202 and/or the combined conduit straight vanes may be made so as to create asymmetric swirl of the exhaust gases, to direct flow of the exhaust gases (e.g., towards a target location in the multi-stage mixer 200, etc.), to more uniformly distribute reductant within the exhaust gases, and/or to reduce deposits within the first flow device 206 (e.g., on the Venturi body 302, etc.) and/or the multi-stage mixer 200.

The conduit straight vanes 2202 and/or the combined conduit straight vanes may be constructed using casting (e.g., investment casting, lost foam casting, sand casting, etc.) and/or 3D printing. For example, the conduit straight vane mixer 2200 may be printed using a 3D printer by using a file which specifies the number of the conduit straight vanes 2202, the number of the combined conduit straight vanes, the streamline angle $\alpha_{sa}$ for each of the conduit straight vanes 2202 and combined conduit straight vanes, and the streamwise extension $E_{sw}$ for each of the conduit straight vanes 2202 and combined conduit straight vanes.

Figure 23:
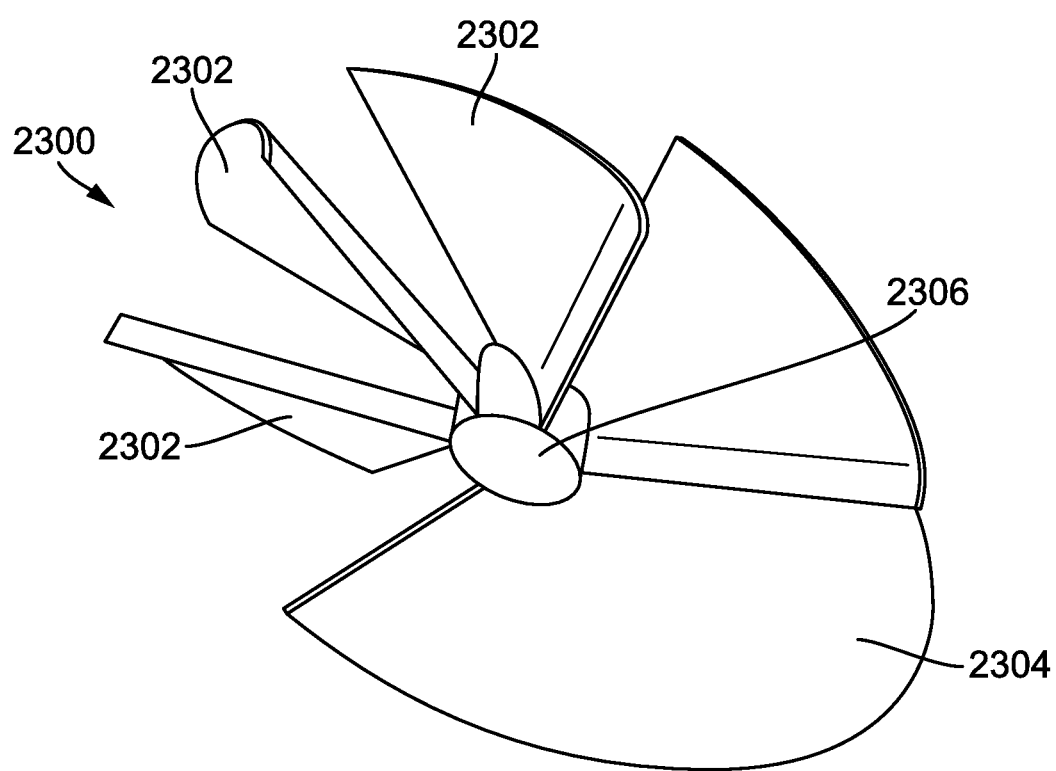
FIG. 23 is bottom perspective view of yet another mixer for a multi-stage mixer.

FIG. 23 illustrates a curved vane mixer 2300 according to an example embodiment. It is understood that the curved vane mixer 2300 as shown and described with reference to FIG. 23 may be included in any of the embodiments of the multi-stage mixer 200 discussed herein.

In various embodiments, the curved vane mixer 2300 is utilized in the first flow device 206 in place of the auxiliary mixer 1106 or in place of the main mixer 309. However, the curved vane mixer 2300 may additionally or alternatively be utilized in other flow devices (e.g., the second flow device 208, the third flow device 210, the fourth flow device 212, etc.).

The curved vane mixer 2300 includes a plurality of curved vanes 2302 and a combined curved vane 2304. In some embodiments, the curved vane mixer 2300 includes two, three, four, five, six, seven, eight, or more of the curved vanes 2302. In some embodiments, the curved vane mixer 2300 includes one, two, three or more of the combined curved vanes 2304. In other embodiments, the curved vane mixer 2300 does not include the combined curved vane 2304. In an example embodiment, the curved vane mixer 2300 includes three of the curved vanes 2302 and one combined curved vane 2304.

Each of the curved vanes 2302 and the combined curved vane 2304 is attached to a curved vane central hub 2306 that is centered about the center axis of the multi-stage mixer 200. The curved vanes 2302 and/or the combined curved vane 2304 may be arranged symmetrically or asymmetrically about the curved vane central hub 2306. Like the conduit straight vanes 2202, each of the curved vanes 2302 and the combined curved vane 2304 may overlap. Each of the curved vanes 2302 and the combined curved vane 2304 extend over an adjacent curved vane 2302 or combined curved vane 2304 the extension distance $E_{sw}$ described herein.

The curved vanes 2302 and the combined curved vane 2304 have a curved or aerodynamic shape which reduces pressure drop of the exhaust gases and facilitates more even distribution of the flow downstream of the curved vane mixer 2300, such as along a center axis of the curved vane mixer 2300.

Each of the curved vanes 2302 is defined by a curved vane angle $\alpha_{cv}$ relative to a curved vane central hub center axis of the curved vane central hub 2306. Similarly, the combined curved vane 2304 may be defined by the curved vane angle $\alpha_{cv}$ relative to a curved vane central hub center axis of the curved vane central hub 2306. Due to the curved nature of the curved vanes 2302 and the combined curved vane 2304, the curved vane angle $\alpha_{cv}$ is variable. The curved vane angle $\alpha_{cv}$ for each of the curved vanes 2302 and combined curved vanes 2304 may be different from the curved vane angle $\alpha_{cv}$ for the others of the curved vanes 2302 and the others of the combined curved vanes 2304.

The curved vanes 2302 and/or the combined curved vane 2304 may be constructed using casting and/or 3D printing. For example, the curved vane mixer 2300 may be printed using a 3D printer by using a file which specifies the number of the curved vanes 2302, the number of the combined curved vanes 2304, and the curved vane angle $\alpha_{cv}$ for each of the curved vanes 2302 and the combined curved vanes 2304. In various embodiments, the curved vanes 2302 and/or the combined curved vane 2304 can be design to keep a tangential angle constant at each point along the curved vane 2302 or combined curved vane 2304, or to minimize an aerodynamic drag force on each curved vane 2302 or combined curved vane 2304. In one embodiment, 3D printed or cast curved vanes 2303 may be inserted into the Venturi body 302 and welded to the first support flange 304.

Figure 24:
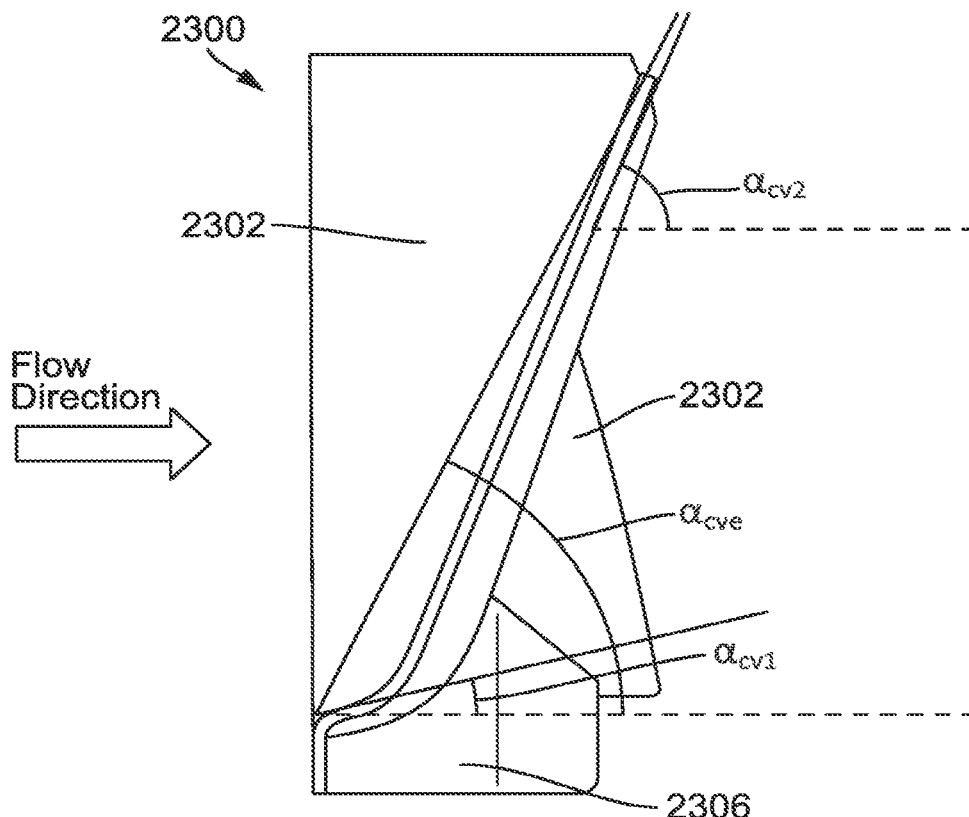
FIG. 24 is side view of a portion of the mixer shown in FIG. 23.

FIG. 24 illustrates a cross-sectional view of the curved vane mixer 2300. The curved vane angle $\alpha_{cv}$ at a first location proximate the curved vane central hub 2306 relative to a hub center axis of the curved vane central hub 2306 is shown as angle $\alpha_{cv1}$ and the curved vane angle $\alpha_{cv}$ at a second location proximate a terminal edge of the curved vane 2302 relative to the hub center axis of the curved vane central hub 2306 is shown as angle $\alpha_{cv2}$. The angle $\alpha_{cv1}$ is different from (e.g., smaller than, etc.) the angle $\alpha_{cv2}$. An effective curved vane angle $\alpha_{cve}$ relative to the hub center axis of the curved vane central hub 2306 is calculated based on the curved vane angle $\alpha_{cv}$ along the curved vane 2302 (e.g., the angle $\alpha_{cv1}$, the angle $\alpha_{cv2}$, etc.). By using a smaller curved vane angle $\alpha_{cv}$ near the curved vane central hub 2306, pressure drop of the exhaust gases and the probability of deposit formation are reduced. Similarly, by using a larger curved vane angle $\alpha_{cv}$, the swirl of the exhaust gases downstream of the curved vane mixer 2300 is increased. In this way, the curved vanes 2302 and/or the combined curved vane 2304 can be optimized to produce a swirl flow that balances a target pressure drop with a target uniformity index.

Figure 25:
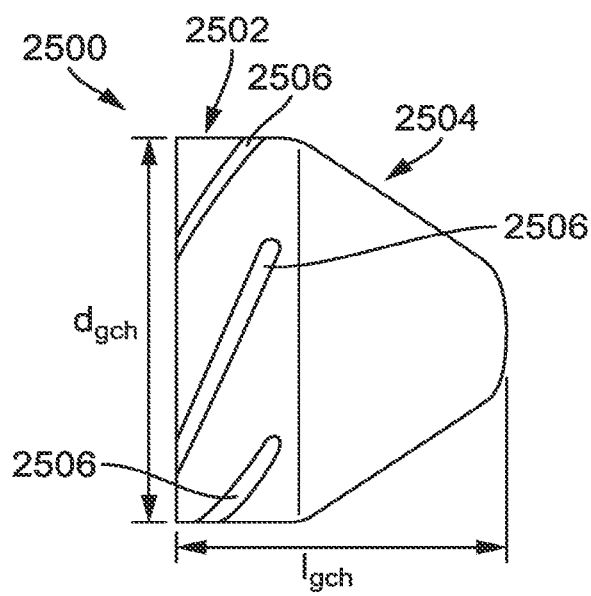
FIG. 25 is side view of a central hub for a multi-stage mixer.
Figure 26:
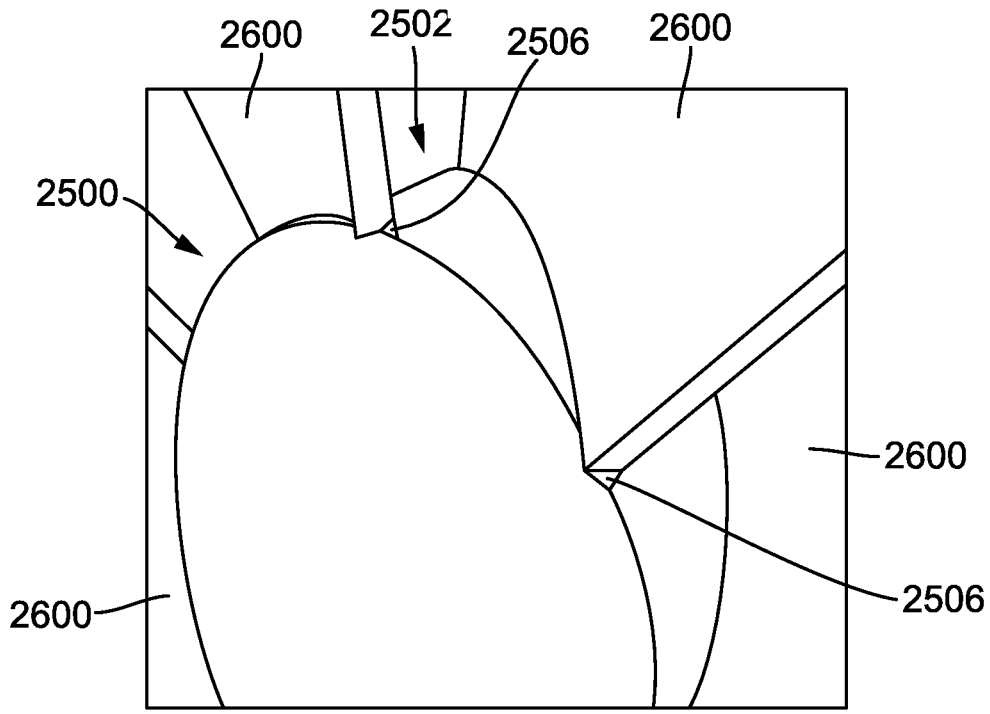
FIG. 26 is side view of the central hub shown in FIG. 25 with a plurality of vanes.

FIGS. 25 and 26 illustrate a common central hub 2500. It is understood that the common central hub 2500 as shown and described with reference to FIGS. 25 and 26 may be included in any of the embodiments of the multi-stage mixer 200 discussed herein.

The common central hub 2500 may be implemented as any of the other central hubs described herein (e.g., the main vane central hub 313, the auxiliary vane central hub 1109, the conduit straight vane central hub 2206, the curved vane central hub 2306, etc.). The common central hub 2500 is defined by a diameter $d_{gch}$ and a length $l_{gch}$. In various embodiments, the diameter $d_{gch}$ is selected such that $$0.05d_v \leq d_{gch} \leq 0.5d_v \qquad (21)$$

and the length $l_{gch}$ is selected such that $$0.02d_v \leq l_{gch} \leq 0.5d_v \qquad (22)$$

The common central hub 2500 includes a cylindrical portion 2502 and a conical portion 2504. By incorporating the conical portion 2504, the common central hub 2500 may facilitate a reduction in pressure drop of the exhaust gases by allowing additional flow to flow towards the core of the swirl flow (e.g., downstream of the common central hub 2500, etc.). The conical portion 2504 is defined by a cone angle. In various embodiments, the cone angle is between ten degrees and fifty degrees, inclusive. In various embodiments, the common central hub 2500 is conical or another similar aerodynamic shape.

In various embodiments, the common central hub 2500 includes a plurality of grooves 2506. The grooves 2506 are recessions (e.g., grooves, cuts, channels, engravings, etc.) in the common central hub 2500. In an example embodiment, the grooves 2506 are contained within the cylindrical portion 2502 and do not extend onto the conical portion 2504. In other embodiments, the grooves are not contained within the cylindrical portion 2502 and are located on the conical portion 2504.

Each of the grooves 2506 receives a common vane 2600. The grooves 2506 receive a common vane 2600 in a conforming manner such that a flow of exhaust gases follows the geometry of the common vane 2600, thereby mitigating leakage of the exhaust gases between the common central hub 2500 and the common vane 2600 and providing a relatively high degree of structural durability.

The common vane 2600 may be implemented as any of the other vanes described herein (e.g., the main vanes 310, the complementary vanes 1100, the auxiliary vanes 1108, the conduit straight vanes 2202, the combined conduit straight vane, the curved vanes 2302, the combined curved vane 2304, etc.), and any of the other vanes described herein. Each of the common vanes 2600 may be attached to the common central hub 2500 within the grooves 2506. For example, the common vanes 2600 may be welded to the grooves 2506.

The grooves 2506 enable quicker and more consistent manufacturing of the multi-stage mixer device 200. Specifically, locating the common vanes 2600 in the grooves 2506 and then attaching the common vanes 2600 to the grooves 2506 is much easier (e.g., because such control can be implemented via precise tooling, etc.) for a manufacturer to control than would be possible without the grooves 2506. Furthermore, the grooves 2506 may facilitate low cost or rapid manufacturing techniques, such as laser welding, for coupling the common vanes 2600 to the common central hub 2500.

Figure 27:
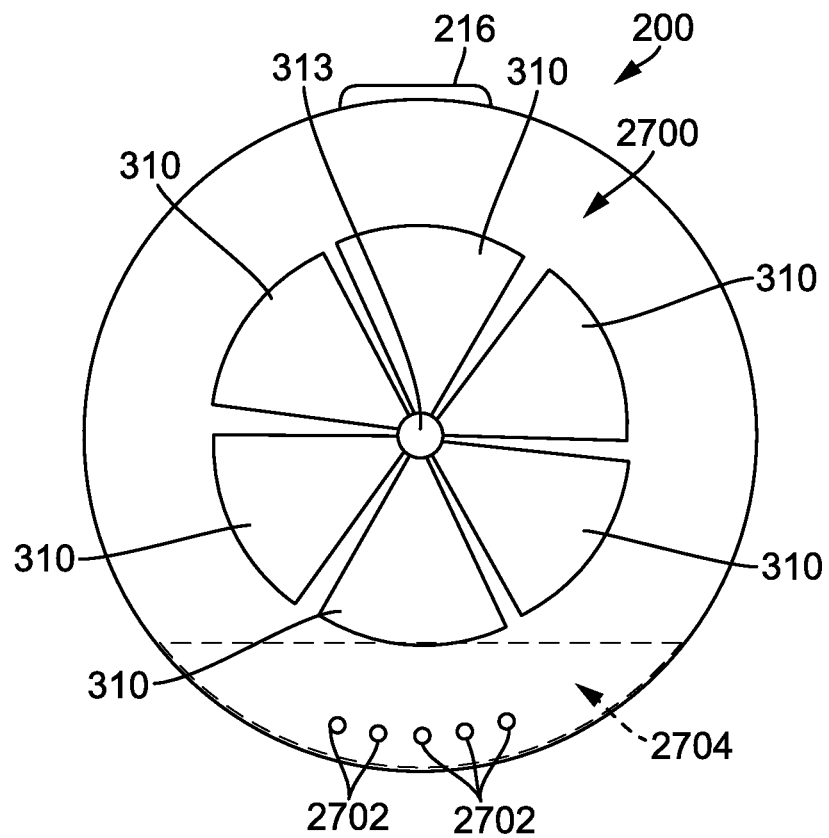
FIG. 27 is rear view of yet another flow device for a multi-stage mixer.

FIG. 27 illustrates a first perforated support flange 2700. It is understood that the first perforated support flange 2700 as shown and described with reference to FIG. 27 may be included in any of the embodiments of the multi-stage mixer 200 discussed herein.

In various embodiments, the first perforated support flange 2700 is utilized in the first flow device 206 in place of the first support flange 304. However, the first perforated support flange 2700 may additionally or alternatively be utilized in other flow devices (e.g., the second flow device 208, the third flow device 210, the fourth flow device 212, etc.). Unlike the first support flange 304, the first perforated support flange 2700 is configured to facilitate the passage of exhaust gases through the first perforated support flange 2700, thereby facilitating the bypass of some of the exhaust gases around the Venturi body 302.

The first perforated support flange 2700 is illustrated in FIG. 27 in place of the first support flange 304. Accordingly, the first perforated support flange 2700 is coupled to the Venturi body 302 proximate the main mixer 309. The first perforated support flange 2700 includes at least one of a first perforation 2702 (e.g., aperture, hole, etc.). Each first perforation 2702 extends through first perforated support flange 2700 such that exhaust gases may pass through the first perforated support flange 2700 via the first perforation 2702.

The first perforation 2702 functions to reduce pressure drop of the exhaust gases and facilitate more even distribution of the flow downstream of the main mixer 309, such as along a center axis of the main mixer 309. The first perforation 2702 also functions to create a relatively high shear of the exhaust gases on the body of the multi-stage mixer 200 such that accumulation of deposits near the multi-stage mixer outlet 204 of the multi-stage mixer 200 is mitigated.

In various embodiments, the first perforated support flange 2700 includes between one and twenty-five, inclusive, of the first perforations 2702. The first perforation 2702 may be circular, square, hexagonal, pentagonal, or otherwise similarly shaped. In various embodiments, each of the first perforations 2702 has a diameter of between 0.1 inches to 1 inch, inclusive.

The first perforation 2702 is disposed on a lower periphery 2704 of the first perforated support flange 2700. The lower periphery 2704 may be a region of the first perforated support flange 2700 which is below the main mixer 309 (e.g., relative to the port 216, etc.). However, the first perforations 2702 may additionally or alternatively be located on other regions of the first perforated support flange 2700 such as a top periphery above the main mixer 309 or a side periphery to one side of the main mixer 309. In various embodiments, the first perforations 2702 are aligned in a concentric arc about the main mixer 309 (e.g., such that each of the first perforations 2702 are equally spaced from the multi-stage mixer 200, etc.).

By varying size (e.g., diameter, etc.), the location, and the number of the first perforations 2702, an optimization of target mixing performance (e.g., based on a computational fluid dynamics analysis, etc.) of the first flow device 206, target deposit formation (e.g., a target amount of deposits formed over a target period of time, etc.), target uniformity index, and target pressure drop (e.g., a comparison of the pressure of the exhaust gases upstream of the first flow device 206 and a pressure of the pressure of the exhaust gases downstream of the first flow device 206, etc.), can be performed such that the first flow device 206 can be tailored for a target application.

Figure 28:
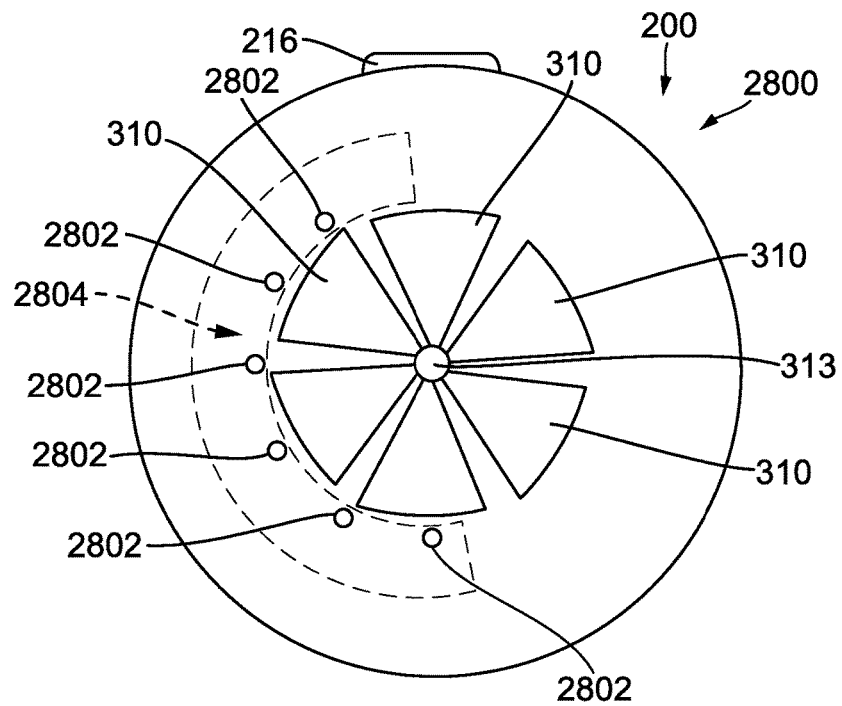
FIG. 28 is rear view of yet another flow device for a multi-stage mixer.

FIG. 28 illustrates a second perforated support flange 2800. It is understood that the second perforated support flange 2800 as shown and described with reference to FIG. 28 may be included in any of the embodiments of the multi-stage mixer 200 discussed herein.

In various embodiments, the second perforated support flange 2800 is utilized in the first flow device 206 in place of the first support flange 304. However, the second perforated support flange 2800 may additionally or alternatively be utilized in other flow devices (e.g., the second flow device 208, the third flow device 210, the fourth flow device 212, etc.).

The second perforated support flange 2800 is illustrated in FIG. 28 in place of the first support flange 304. Accordingly, the second perforated support flange 2800 is coupled to the Venturi body 302 proximate the main mixer 309. The second perforated support flange 2800 includes at least one of a second perforation 2802 (e.g., aperture, hole, etc.). Each second perforation 2802 extends through second perforated support flange 2800 such that exhaust gases may pass through the second perforated support flange 2800 via the second perforation 2802.

The second perforation 2802 functions to reduce pressure drop of the exhaust gases and facilitate more even distribution of the flow downstream of the main mixer 309, such as along a center axis of the main mixer 309. The second perforation 2802 also functions to create a relatively high shear of the exhaust gases on the Venturi body 302 such that accumulation of deposits on the Venturi body 302 is mitigated in areas where shear force and swirl could otherwise lead to deposit formation. Additionally, the location of the second perforation 2802 proximate the Venturi body 302 causes the Venturi body 302 to receive additional heat from the exhaust gases.

In various embodiments, the second perforated support flange 2800 includes between one and twenty-five, inclusive, of the second perforations 2802. The second perforation 2802 may be circular, square, hexagonal, pentagonal, or otherwise similarly shaped. In various embodiments, each of the second perforations 2802 has a diameter of between 0.1 inches to 1 inch, inclusive. At least some (e.g., all, etc.) of the second perforations 2802 may be formed via a punching operation. This punching operation provides each of the second perforations 2802 with a contoured inlet and a flared outlet. While not shown in FIG. 28, each of the second perforations 2802 may include a flap, similar to the sixth flow device vane 908.

The second perforation 2802 is disposed on an edge periphery 2804 of the second perforated support flange 2800. The edge periphery 2804 may be a region of the second perforated support flange 2800 which is to the side of the main mixer 309 (e.g., relative to the port 216, etc.). However, the second perforations 2802 may additionally or alternatively be located on other regions of the second perforated support flange 2800 such as a top periphery above the main mixer 309 or a bottom periphery to below the main mixer 309. In various embodiments, the second perforations 2802 are aligned in a concentric arc about the main mixer 309 (e.g., such that each of the second perforations 2802 are equally spaced from the multi-stage mixer 200, etc.).

Figure 29:
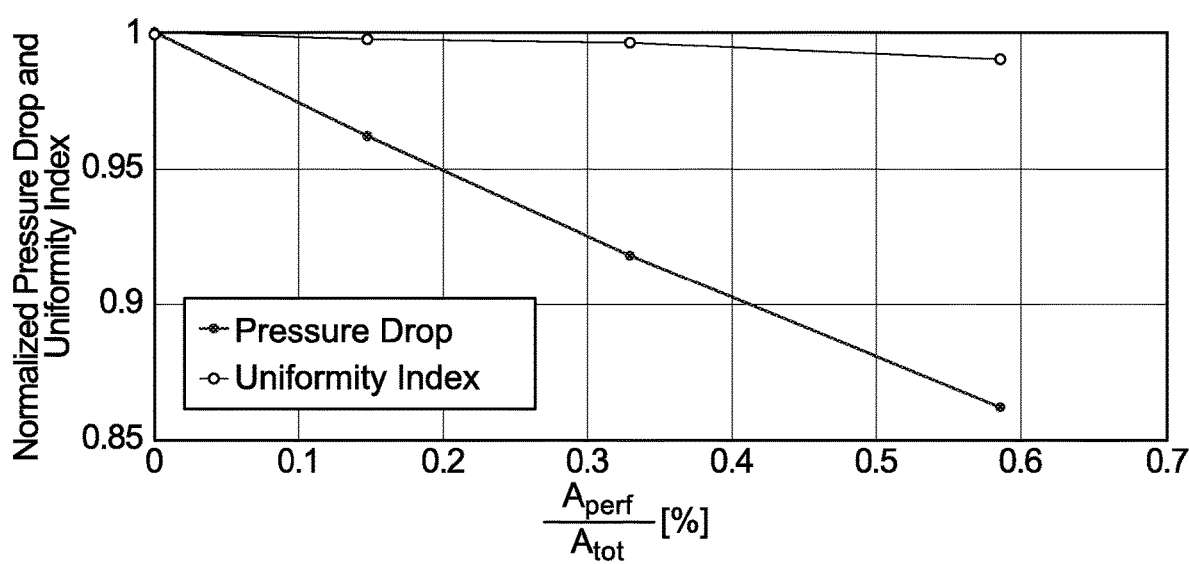
FIG. 29 is a plot for analyzing the normalized pressure drop and/or uniformity index associated with a flow device for a multi-stage mixer.

By varying the location, size (e.g., diameter, etc.) and the number of the second perforations 2802, an optimization of target mixing performance (e.g., based on a computational fluid dynamics analysis, etc.) of the first flow device 206, target deposit formation (e.g., a target amount of deposits formed over a target period of time, etc.), target uniformity index, and target pressure drop (e.g., a comparison of the pressure of the exhaust gases upstream of the first flow device 206 and a pressure of the pressure of the exhaust gases downstream of the first flow device 206, etc.), can be performed such that the first flow device 206 can be tailored for a target application. In various embodiments, the open area of all of the second perforations 2802 is $$A_{perf} = \frac{\pi}{4} n_{perf} d_{perf}^2 \qquad (23)$$

where $n_{perf}$ is the number of the second perforations 2802 and $d_{perf}$ is the diameter of each of the second perforations 2802. The relationship between $A_{perf}$ and pressure drop, and the relationship between $A_{perf}$ and uniformity index, are shown in FIG. 29, where $A_{tot}$ is the total area of the second perforated support flange 2800.

Figure 30:
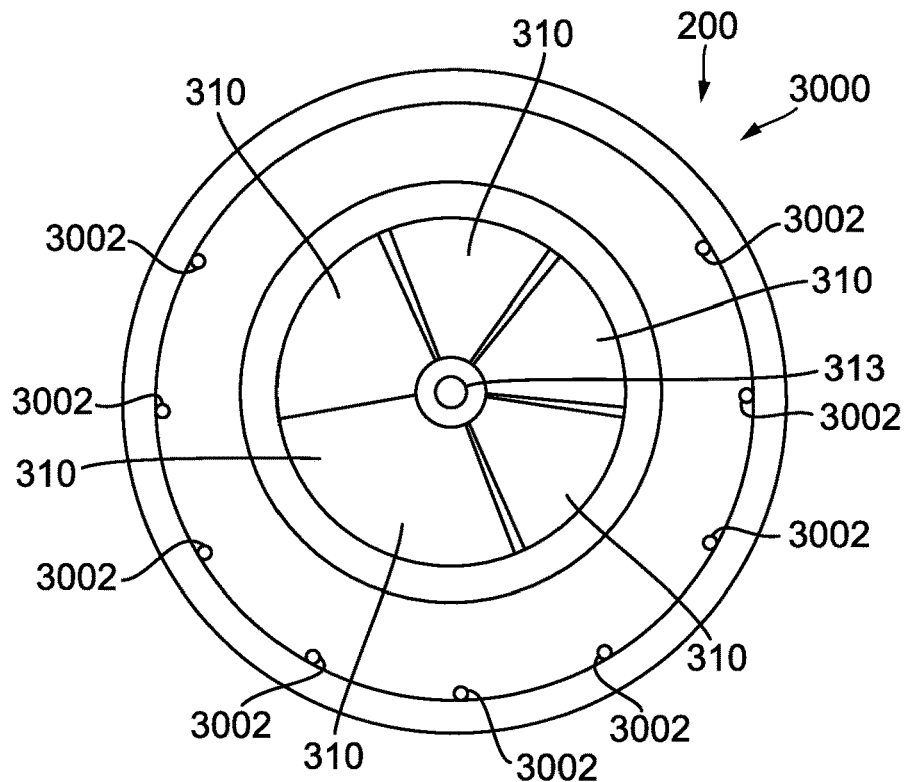
FIG. 30 is rear view of yet another flow device for a multi-stage mixer.

FIG. 30 illustrates a third perforated support flange 3000. It is understood that the third perforated support flange 3000 as shown and described with reference to FIG. 28 may be included in any of the embodiments of the multi-stage mixer 200 discussed herein.

The third perforated support flange 3000 is similar to the second perforated support flange 2800 described herein. In various embodiments, the third perforated support flange 3000 is utilized in the first flow device 206 in place of the first support flange 304. However, the third perforated support flange 3000 may additionally or alternatively be utilized in other flow devices (e.g., the second flow device 208, the third flow device 210, the fourth flow device 212, etc.). Unlike the first support flange 304, the third perforated support flange 3000 is configured to facilitate the passage of exhaust gases through the third perforated support flange 3000, thereby facilitating the bypass of some of the exhaust gases around the Venturi body 302.

The third perforated support flange 3000 is illustrated in FIG. 30 in place of the first support flange 304. Accordingly, the third perforated support flange 3000 is coupled to the Venturi body 302 proximate the main mixer 309. The third perforated support flange 3000 includes at least one of a third perforation 3002 (e.g., aperture, hole, etc.). Each third perforation 3002 extends through third perforated support flange 3000 such that exhaust gases may pass through the third perforated support flange 3000 via the second perforation 2802. The aforementioned description of the second perforations 2802 similarly applies to the third perforations 3002 and the first perforations 2702. In various embodiments, the third perforations 3002 are equally spaced across an arc spanning from sixty degrees to three-hundred degrees relative to a center axis of the first flow device 206 and/or the multistage mixer 200.

Figure 31:
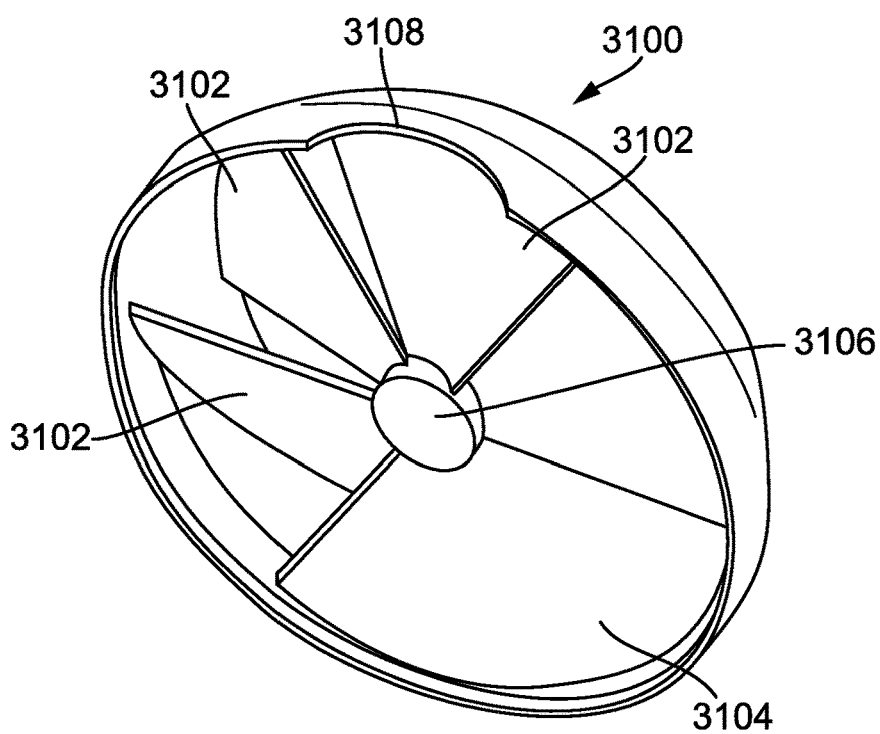
FIG. 31 is top perspective view of yet another mixer for a multi-stage mixer.
Figure 32:
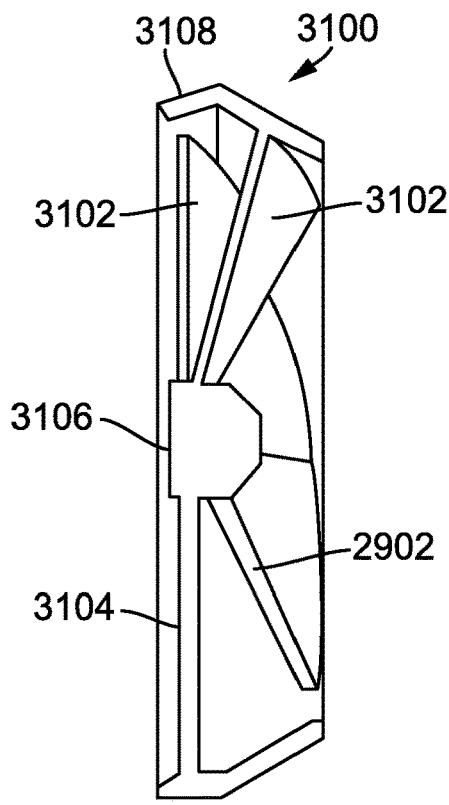
FIG. 32 is side cross-sectional view of the mixer shown in FIG. 31.

FIGS. 31 and 32 illustrate a shrouded vane mixer 3100 according to an example embodiment. It is understood that the shrouded vane mixer 3100 as shown and described with reference to FIGS. 31-33 may be included in any of the embodiments of the multi-stage mixer 200 discussed herein.

FIG. 31 is a cross-sectional view of the shrouded vane mixer 3100. In various embodiments, the shrouded vane mixer 3100 is utilized in the first flow device 206 in place of the auxiliary mixer 1106 or in place of the main mixer 309. However, the shrouded vane mixer 3100 may additionally or alternatively be utilized in other flow devices (e.g., the second flow device 208, the third flow device 210, the fourth flow device 212, etc.).

The shrouded vane mixer 3100 includes a plurality of shrouded vanes 3102 and a combined shrouded vane 3104. In some embodiments, the shrouded vane mixer 3100 includes two, three, four, five, six, seven, eight, or more of the shrouded vanes 3102. In some embodiments, the shrouded vane mixer 3100 includes one, two, three or more of the combined shrouded vanes 3104. In other embodiments, the shrouded vane mixer 3100 does not include the combined shrouded vane 3104. In an example embodiment, the shrouded vane mixer 3100 includes three of the shrouded vanes 3102 and one combined shrouded vane 3104.

Each of the shrouded vanes 3102 and the combined shrouded vane 3104 is attached to a shrouded vane central hub 3106 that is centered about the center axis of the multi-stage mixer 200. The shrouded vanes 3102 and/or the combined shrouded vane 3104 may be arranged symmetrically or asymmetrically about the shrouded vane central hub 3106. Like the conduit straight vanes 2202, each of the shrouded vanes 3102 and the combined shrouded vane 3104 may overlap.

The shrouded vane mixer 3100 includes a recess 2908. The recess 2908 is configured to fit around the exhaust gas guide aperture 306 when the shrouded vane mixer 3100 is installed in the multi-stage mixer 200.

The shrouded vane mixer 3100 combines the functions of a mixer (e.g., the auxiliary mixer 1106, the main mixer 309, etc.) with the functions of a shroud (e.g., the shroud 1308, etc.) in a single component. In this way, the shrouded vane mixer 3100 may reduce the cost (e.g., manufacturing cost, etc.) and manufacturing complexity of the multi-stage mixer 200. Additionally, combining the mixer and the shroud in a single component, the shrouded vane mixer 3100, reduces manufacturing tolerances on vane angles of the shrouded vanes 3102, thereby reducing variability between different shrouded vane mixers 3100. The thickness of each of the shrouded vanes 3102 may be constant or variable throughout the shrouded vane 3102, such as vertically along the shrouded vane 3102 or horizontally along the shrouded vane 3102. In various embodiments, the shrouded vane 3102 has a thickness of between 1.5 mm and 6 mm, inclusive. Similarly, in various embodiments, the edges of each of the shrouded vanes 3102 has a radius of between 0.5 mm and 3 mm, inclusive. This radius may reduce flow separation of the exhaust gases, mitigate accumulation of reductant deposits, and reduce stress concentrations on the shrouded vanes 3102 and/or the shroud 1318.

Figure 33:
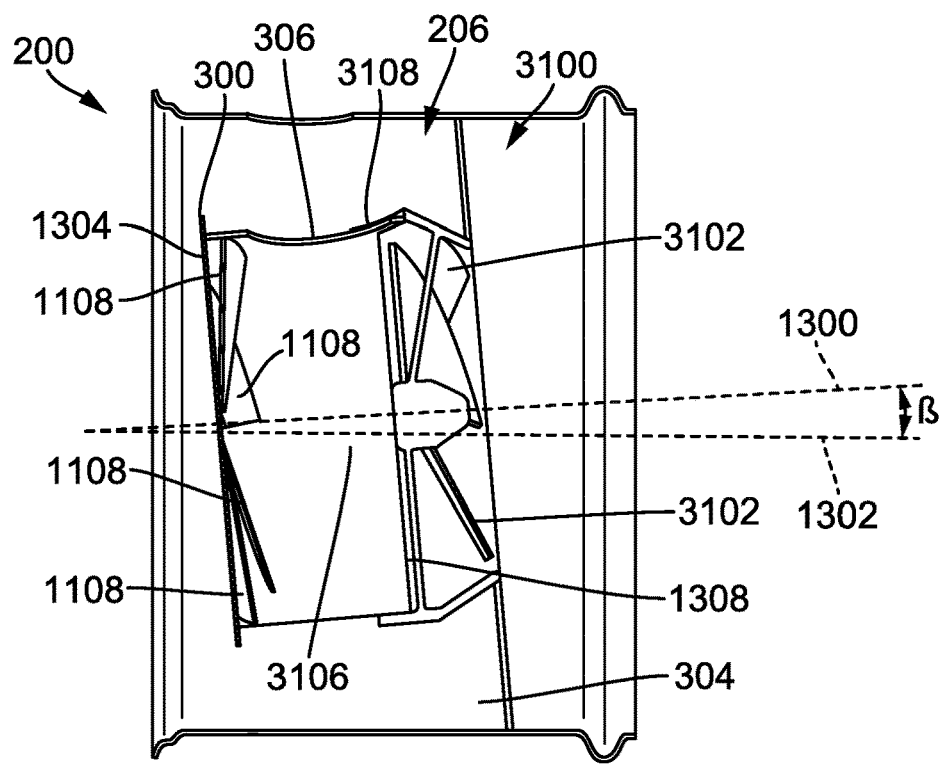
FIG. 33 is side cross-sectional view of a multi-stage mixer including the mixer shown in FIG. 31.

FIG. 33 illustrates the shrouded vane mixer 3100 installed in the multi-stage mixer device 200 according to an example embodiment. In this embodiment, the shrouded vane central hub 3106 is centered on the body center axis 1300, and the body center axis 1300 is offset an angle β from the mixer center axis 1302. As shown in FIG. 33, the angle β is a positive angle such that the shrouded vane mixer 3100 is tilted upwards within the multi-stage mixer 200. In various embodiments, the angle β is between zero degrees and fifteen degrees, inclusive. In other embodiments, the angle β is negative such that the shrouded vane mixer 3100 is tilted downwards within the multi-stage mixer 200. In these embodiments, the angle β may be between zero degrees and negative fifteen degrees, inclusive. In still other embodiments, the shrouded vane mixer 3100 may be tilted to either side, or some combination of the aforementioned directions.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid, such as exhaust, water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another. As described herein, "preventing" should be interpreted as potentially allowing for de minimus circumvention (e.g., less than 1%) of the exhaust gases.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A multi-stage mixer, comprising:
a multi-stage mixer inlet configured to receive exhaust gas, the multi-stage mixer inlet centered on a first axis;
a multi-stage mixer outlet configured to provide the exhaust gas to a catalyst, the multi-stage mixer outlet centered on the first axis;
a first flow device configured to receive the exhaust gas from the multi-stage mixer inlet and to receive reductant such that the reductant is partially mixed with the exhaust gas within the first flow device, the first flow device comprising:
a plurality of main vanes;
a plurality of main vane apertures interspaced between the plurality of main vanes, the plurality of main vane apertures being configured to receive the exhaust gas and to cooperate with the plurality of main vanes to provide the exhaust gas from the first flow device with a first swirl flow that facilitates mixing of the reductant and the exhaust gas;
a body inlet having a first diameter;
a body outlet having a second diameter less than the first diameter; and
a frustoconical shroud contiguous with the body outlet; and
a second flow device configured to receive the exhaust gas and the reductant from the first flow device, the second flow device comprising a plurality of second flow device apertures configured to provide the exhaust gas and the reductant from the second flow device to the catalyst via the multi-stage mixer outlet.

2. The multi-stage mixer of claim 1, wherein:
the plurality of main vane apertures collectively define a first open area;
wherein the plurality of second flow device apertures collectively define a second open area; and
wherein the first open area is equal to the second open area.

3. The multi-stage mixer of claim 1, further comprising an exhaust gas guide coupled to the first flow device, the exhaust gas guide configured to receive the exhaust gas from the multi-stage mixer inlet and configured to cause the exhaust gas to contact the reductant such that the reductant is propelled into the first flow device by the exhaust gas.

4. The multi-stage mixer of claim 1, wherein the first flow device further comprises:
a plurality of auxiliary vanes; and
a plurality of auxiliary vane apertures interspaced between the plurality of auxiliary vanes, the plurality of auxiliary vane apertures configured to receive the exhaust gas and cooperate with the plurality of auxiliary vanes to provide the exhaust gas into the first flow device with a second swirl flow that facilitates mixing of the reductant and the exhaust gas.

5. The multi-stage mixer of claim 4, wherein the second swirl flow is counter-swirl flow with respect to the first swirl flow.

6. The multi-stage mixer of claim 4, wherein the second swirl flow is co-swirl flow with respect to the first swirl flow.

7. The multi-stage mixer of claim 4, wherein
the plurality of auxiliary vanes is located proximate the body inlet and the plurality of main vanes is located proximate the body outlet.

8. The multi-stage mixer of claim 4, wherein:
the multi-stage mixer is centered on a mixer center axis;
the first flow device is centered on a body center axis; and
the body center axis is offset from or angled relative to the mixer center axis.

9. The multi-stage mixer of claim 4, wherein the first flow device further comprises a first support flange configured to secure the first flow device within the multi-stage mixer, the first support flange configured to establish a seal between the first flow device and the multi-stage mixer.

10. The multi-stage mixer of claim 9, wherein the first flow device further comprises a second support flange comprising:
a plurality of second support flange apertures configured to facilitate the passage of exhaust gas therethrough; and
a plurality of second support flange connectors configured to secure the first flow device within the multi-stage mixer.

11. The multi-stage mixer of claim 10, wherein
the second support flange is located proximate the body inlet and the first support flange is located proximate the body outlet.

12. The multi-stage mixer of claim 9, wherein the first support flange comprises a plurality of first perforations configured to facilitate the passage of exhaust gas therethrough.

13. The multi-stage mixer of claim 12, wherein the first flow device further comprises a second support flange comprising:
a plurality of second support flange apertures configured to facilitate the passage of exhaust gas therethrough; and
a plurality of second support flange connectors configured to secure the first flow device within the multi-stage mixer.

14. The multi-stage mixer of claim 13, wherein
the second support flange is located proximate the body inlet and the first support flange is located proximate the body outlet.

15. A multi-stage mixer, comprising:
a multi-stage mixer inlet configured to receive exhaust gas, the multi-stage mixer inlet centered on a first axis;
a multi-stage mixer outlet configured to provide the exhaust gas to a catalyst, the multi-stage mixer outlet centered on the first axis;
a first flow device configured to receive the exhaust gas from the multi-stage mixer inlet and to receive reductant such that the reductant is partially mixed with the exhaust gas within the first flow device, the first flow device comprising:
a first mixer comprising:
a plurality of main vanes, and
a plurality of main vane apertures interspaced between the plurality of main vanes, the plurality of main vane apertures being configured to receive the exhaust gas and to cooperate with the plurality of main vanes to provide the exhaust gas from the first flow device with a first swirl flow that facilitates mixing of the reductant and the exhaust gas, and
a second mixer upstream of the first mixer, the second mixer comprising:
a plurality of auxiliary vanes, and
a plurality of auxiliary vane apertures interspaced between the plurality of auxiliary vanes, the plurality of auxiliary vane apertures configured to receive the exhaust gas and cooperate with the plurality of auxiliary vanes to provide the exhaust gas into the first flow device with a second swirl flow that facilitates mixing of the reductant and the exhaust gas, the second swirl flow being counter-swirl flow with respect to the first swirl flow; and
a second flow device configured to receive the exhaust gas and the reductant from the first flow device, the second flow device comprising a plurality of second flow device apertures configured to provide the exhaust gas and the reductant from the second flow device to the catalyst via the multi-stage mixer outlet.

16. A multi-stage mixer, comprising:
a multi-stage mixer inlet configured to receive exhaust gas, the multi-stage mixer inlet centered on a first axis;
a multi-stage mixer outlet configured to provide the exhaust gas to a catalyst, the multi-stage mixer outlet centered on the first axis;
a first flow device configured to receive the exhaust gas from the multi-stage mixer inlet and to receive reductant such that the reductant is partially mixed with the exhaust gas within the first flow device, the first flow device comprising:
a plurality of main vanes;
a plurality of main vane apertures interspaced between the plurality of main vanes, the plurality of main vane apertures being configured to receive the exhaust gas and to cooperate with the plurality of main vanes to provide the exhaust gas from the first flow device with a first swirl flow that facilitates mixing of the reductant and the exhaust gas;
a plurality of auxiliary vanes; and
a plurality of auxiliary vane apertures interspaced between the plurality of auxiliary vanes, the plurality of auxiliary vane apertures configured to receive the exhaust gas and cooperate with the plurality of auxiliary vanes to provide the exhaust gas into the first flow device with a second swirl flow that facilitates mixing of the reductant and the exhaust gas; and
a second flow device configured to receive the exhaust gas and the reductant from the first flow device, the second flow device comprising a plurality of second flow device apertures configured to provide the exhaust gas and the reductant from the second flow device to the catalyst via the multi-stage mixer outlet;
wherein the multi-stage mixer is centered on a mixer center axis;
wherein the first flow device is centered on a body center axis; and
wherein the body center axis is offset from or angled relative to the mixer center axis.

17. A multi-stage mixer, comprising:
a multi-stage mixer inlet configured to receive exhaust gas, the multi-stage mixer inlet centered on a first axis;
a multi-stage mixer outlet configured to provide the exhaust gas to a catalyst, the multi-stage mixer outlet centered on the first axis;
a first flow device configured to receive the exhaust gas from the multi-stage mixer inlet and to receive reductant such that the reductant is partially mixed with the exhaust gas within the first flow device, the first flow device comprising:
a plurality of main vanes;
a plurality of main vane apertures interspaced between the plurality of main vanes, the plurality of main vane apertures being configured to receive the exhaust gas and to cooperate with the plurality of main vanes to provide the exhaust gas from the first flow device with a first swirl flow that facilitates mixing of the reductant and the exhaust gas;
a plurality of auxiliary vanes;
a plurality of auxiliary vane apertures interspaced between the plurality of auxiliary vanes, the plurality of auxiliary vane apertures configured to receive the exhaust gas and cooperate with the plurality of auxiliary vanes to provide the exhaust gas into the first flow device with a second swirl flow that facilitates mixing of the reductant and the exhaust gas;

a first support flange configured to secure the first flow device within the multi-stage mixer, the first support flange configured to establish a seal between the first flow device and the multi-stage mixer; and a second support flange comprising:
  a plurality of second support flange apertures configured to facilitate the passage of exhaust gas therethrough, and
  a plurality of second support flange connectors configured to secure the first flow device within the multi-stage mixer; and a second flow device configured to receive the exhaust gas and the reductant from the first flow device, the second flow device comprising a plurality of second flow device apertures configured to provide the exhaust gas and the reductant.

18. The multi-stage mixer of claim 17, wherein:
the first flow device further comprises:
  a body inlet; and
  a body outlet; and
the second support flange is located proximate the body inlet and the first support flange is located proximate the body outlet.

19. A multi-stage mixer, comprising:
a multi-stage mixer inlet configured to receive exhaust gas, the multi-stage mixer inlet centered on a first axis;
a multi-stage mixer outlet configured to provide the exhaust gas to a catalyst, the multi-stage mixer outlet centered on the first axis;
a first flow device configured to receive the exhaust gas from the multi-stage mixer inlet and to receive reductant such that the reductant is partially mixed with the exhaust gas within the first flow device, the first flow device comprising:
  a plurality of main vanes;
  a plurality of main vane apertures interspaced between the plurality of main vanes, the plurality of main vane apertures being configured to receive the exhaust gas and to cooperate with the plurality of main vanes to provide the exhaust gas from the first flow device with a first swirl flow that facilitates mixing of the reductant and the exhaust gas;
  a plurality of auxiliary vanes;
  a plurality of auxiliary vane apertures interspaced between the plurality of auxiliary vanes, the plurality of auxiliary vane apertures configured to receive the exhaust gas and cooperate with the plurality of auxiliary vanes to provide the exhaust gas into the first flow device with a second swirl flow that facilitates mixing of the reductant and the exhaust gas;

a first support flange configured to secure the first flow device within the multi-stage mixer, the first support flange configured to establish a seal between the first flow device and the multi-stage mixer, the first support flange comprising a plurality of first perforations configured to facilitate the passage of exhaust gas therethrough; and a second support flange comprising:
  a plurality of second support flange apertures configured to facilitate the passage of exhaust gas therethrough; and
  a plurality of second support flange connectors configured to secure the first flow device within the multi-stage mixer; and a second flow device configured to receive the exhaust gas and the reductant from the first flow device, the second flow device comprising a plurality of second flow device apertures configured to provide the exhaust gas and the reductant.

20. The multi-stage mixer of claim 19, wherein:
the first flow device further comprises:
  a body inlet; and
  a body outlet; and
the second support flange is located proximate the body inlet and the first support flange is located proximate the body outlet.

\* \* \* \* \*